US012714019B2

(12) United States Patent
Wong et al.

(10) Patent No.: US 12,714,019 B2
(45) Date of Patent: Aug. 25, 2026

(54) ROBOTIC GARDEN TOOL WITH QUICK CHANGE MECHANISM

(71) Applicant: TECHTRONIC CORDLESS GP, Anderson, SC (US)

(72) Inventors: Tsz Kin Wong, Hong Kong (CN); Koon For Chung, Hong Kong (CN)

(73) Assignee: TECHTRONIC CORDLESS GP, Anderson, SC (US)

(*) Notice: Subject to any disclaimer, the term of this patent is extended or adjusted under 35 U.S.C. 154(b) by 686 days.

(21) Appl. No.: 18/178,243

(22) Filed: Mar. 3, 2023

(65) Prior Publication Data

US 2023/0276733 A1 Sep. 7, 2023

Related U.S. Application Data

(60) Provisional application No. 63/316,866, filed on Mar. 4, 2022, provisional application No. 63/316,870, filed on Mar. 4, 2022.

(51) Int. Cl.

| | |
|---|---|
| ***A01D 34/82*** | (2006.01) |
| ***A01D 34/00*** | (2006.01) |
| ***A01D 34/66*** | (2006.01) |
| ***A01D 101/00*** | (2006.01) |

(52) U.S. Cl.

CPC ........... *A01D 34/82* (2013.01); *A01D 34/008* (2013.01); *A01D 34/661* (2013.01); *A01D 34/668* (2013.01); *A01D 2101/00* (2013.01)

(58) Field of Classification Search

CPC .... A01D 34/82; A01D 34/008; A01D 34/661; A01D 34/668; A01D 2101/00

See application file for complete search history.

(56) References Cited

U.S. PATENT DOCUMENTS

| | | | |
|---|---|---|---|
| 923,312 | A | 6/1909 | Alexanderson |
| 2,511,124 | A | 6/1950 | Phelps |
| 2,539,779 | A | 1/1951 | Grosso |
| 2,701,942 | A | 2/1955 | Caldwell, Jr. et al. |
| 2,751,030 | A | 6/1956 | Null |
| 2,914,902 | A | 12/1959 | Beymer |
| 3,057,140 | A | 10/1962 | Amos et al. |
| 3,147,662 | A | 9/1964 | Snook |
| 3,157,978 | A | 11/1964 | McMullen |
| 3,304,107 | A | 2/1967 | Bahmuller |

(Continued)

FOREIGN PATENT DOCUMENTS

| | | | |
|---|---|---|---|
| AU | 2006100911 | A4 | 11/2006 |
| AU | 2011239326 | A1 | 11/2011 |

(Continued)

OTHER PUBLICATIONS

US 8,272,092 B2, 09/2012, Schnittman et al. (withdrawn)

(Continued)

*Primary Examiner* — Joseph M Rocca

(74) *Attorney, Agent, or Firm* — Michael Best & Friedrich LLP

(57) ABSTRACT

A garden tool includes a drive shaft, a driven implement, and a locking cap configured to removably secure the drive shaft and the driven implement relative to each other. The locking cap is self-locking to inhibit loosening. The locking cap may include a ratchet mechanism. The garden tool may include a vegetation cutter.

16 Claims, 22 Drawing Sheets

(56) References Cited

U.S. PATENT DOCUMENTS 3,311,738 A 3/1967 Makow
3,393,598 A 7/1968 Bettinger
3,500,622 A 3/1970 Bowen
3,570,227 A 3/1971 Bellinger
3,612,574 A 10/1971 Klopfer et al.
3,680,295 A 8/1972 Rutherford
3,776,327 A 12/1973 Klopfer et al.
3,886,811 A * 6/1975 Hillyer .................. B62M 11/18 475/299
4,065,913 A 1/1978 Fisher et al.
4,126,990 A 11/1978 Fisher et al.
4,126,991 A 11/1978 Gobin et al.
4,165,597 A 8/1979 Scanland et al.
4,205,510 A 6/1980 Raniero
4,268,964 A 5/1981 Moore
4,306,375 A 12/1981 Goldfarb et al.
4,333,202 A 6/1982 Block
4,351,132 A 9/1982 Molin
4,468,884 A 9/1984 Goldfarb et al.
4,492,058 A 1/1985 Goldfarb et al.
4,511,343 A 4/1985 Goldfarb et al.
4,522,606 A 6/1985 Goldfarb et al.
4,527,406 A * 7/1985 Baker ................ B60K 15/0409 220/210
4,547,166 A 10/1985 Goldfarb et al.
4,591,347 A 5/1986 Goldfarb et al.
4,596,412 A 6/1986 Everett et al.
4,627,563 A 12/1986 Meyer
4,652,247 A 3/1987 Goldfarb et al.
4,673,370 A 6/1987 Goldfarb et al.
4,693,656 A 9/1987 Guthrie
4,787,794 A 11/1988 Guthrie
4,826,066 A 5/1989 Koester et al.
4,902,260 A 2/1990 Im
4,916,813 A 4/1990 Elia
4,951,985 A 8/1990 Pong et al.
4,958,068 A 9/1990 Pong et al.
4,962,453 A 10/1990 Pong et al.
4,964,265 A 10/1990 Young
4,968,878 A 11/1990 Pong et al.
5,024,728 A 6/1991 Morita et al.
5,025,969 A 6/1991 Koester et al.
5,323,593 A 6/1994 Cline et al.
5,363,633 A 11/1994 Masaru
5,402,110 A 3/1995 Oliver et al.
5,406,778 A 4/1995 Lamb et al.
5,485,963 A * 1/1996 Walto ..................... A01C 15/02 56/16.8
5,507,137 A 4/1996 Norris
5,540,037 A 7/1996 Lamb et al.
5,548,278 A 8/1996 Oliver et al.
5,553,445 A 9/1996 Lamb et al.
5,561,972 A 10/1996 Rolfe
5,572,856 A 11/1996 Ku
5,577,868 A 11/1996 Chen
5,703,569 A 12/1997 Oliver et al.
5,785,480 A 7/1998 Difeo
5,821,731 A 10/1998 Kuki et al.
5,850,135 A 12/1998 Kuki et al.
5,916,111 A 6/1999 Colens
5,942,869 A 8/1999 Katou et al.
6,076,025 A 6/2000 Ueno et al.
6,101,795 A 8/2000 Diekhans
6,119,350 A 9/2000 Sutliff et al.
6,212,917 B1 4/2001 Rathbun
6,255,793 B1 7/2001 Peless et al.
6,300,737 B1 10/2001 Bergvall et al.
6,321,515 B1 11/2001 Colens
D451,931 S 12/2001 Abramson et al.
6,338,013 B1 1/2002 Ruffner
6,339,735 B1 1/2002 Peless et al.
6,417,641 B2 7/2002 Peless et al.
6,442,845 B2 9/2002 Wheeler et al.
6,443,509 B1 9/2002 Levin et al.
6,460,253 B1 10/2002 Wheeler et al.
6,465,982 B1 10/2002 Bergvall et al.
6,481,515 B1 11/2002 Kirkpatrick et al.
6,493,613 B2 12/2002 Peless et al.
6,502,017 B2 12/2002 Ruffner
6,525,509 B1 2/2003 Petersson et al.
6,586,908 B2 7/2003 Petersson et al.
6,594,844 B2 7/2003 Jones
6,600,981 B2 7/2003 Ruffner
6,604,348 B2 8/2003 Hunt
6,611,738 B2 8/2003 Ruffner
6,615,108 B1 9/2003 Peless et al.
6,636,847 B1 10/2003 Spires
6,650,975 B2 11/2003 Ruffner
6,662,889 B2 12/2003 De Fazio et al.
6,728,607 B1 4/2004 Anderson
6,763,282 B2 7/2004 Glenn et al.
6,779,217 B2 8/2004 Fisher
6,809,490 B2 10/2004 Jones et al.
6,813,557 B2 11/2004 Schmidt et al.
6,843,627 B2 * 1/2005 Childs ....................... B27B 5/32 411/408
6,850,024 B2 2/2005 Peless et al.
6,870,792 B2 3/2005 Chiappetta
6,879,878 B2 4/2005 Glenn et al.
6,885,912 B2 4/2005 Peless et al.
6,907,336 B2 6/2005 Gray et al.
6,934,615 B2 8/2005 Flann et al.
6,984,952 B2 1/2006 Peless et al.
7,010,425 B2 3/2006 Gray et al.
7,024,842 B2 4/2006 Hunt et al.
7,024,843 B2 4/2006 Hunt et al.
7,047,712 B1 5/2006 Hunt et al.
7,053,580 B2 5/2006 Aldred
7,069,111 B2 6/2006 Glenn et al.
7,076,348 B2 7/2006 Bucher et al.
7,079,923 B2 7/2006 Abramson et al.
7,079,943 B2 7/2006 Flann et al.
7,085,624 B2 8/2006 Aldred et al.
7,103,457 B2 9/2006 Dean
7,110,881 B2 9/2006 Gray et al.
7,114,318 B2 10/2006 Poulson et al.
7,117,660 B1 10/2006 Colens
7,133,746 B2 11/2006 Abramson et al.
7,146,786 B2 12/2006 Brandon
7,155,308 B2 12/2006 Jones
7,155,309 B2 12/2006 Peless et al.
7,166,983 B2 1/2007 Jung
7,167,775 B2 1/2007 Abramson et al.
7,173,391 B2 2/2007 Jones et al.
7,174,157 B2 2/2007 Gassho et al.
7,211,980 B1 5/2007 Bruemmer et al.
7,216,033 B2 5/2007 Flann et al.
7,227,334 B2 6/2007 Yang et al.
7,228,214 B2 6/2007 Flann et al.
7,233,683 B2 6/2007 Han et al.
7,242,791 B2 7/2007 Han et al.
7,286,902 B2 10/2007 Kim et al.
D559,867 S 1/2008 Abramson
7,332,890 B2 2/2008 Cohen et al.
7,349,759 B2 3/2008 Peless et al.
7,363,994 B1 4/2008 Defazio et al.
7,369,460 B2 5/2008 Chiappetta et al.
7,369,924 B2 5/2008 Han et al.
7,388,343 B2 6/2008 Jones et al.
D573,610 S 7/2008 Abramson
7,395,648 B1 7/2008 Silbernagel et al.
7,418,328 B2 8/2008 Romig
7,429,843 B2 9/2008 Jones et al.
7,430,455 B2 9/2008 Casey et al.
7,444,214 B2 10/2008 Cho et al.
7,469,525 B2 12/2008 Zeigler et al.
7,474,941 B2 1/2009 Kim et al.
7,480,958 B2 1/2009 Song et al.
7,480,960 B2 1/2009 Kim
7,497,053 B2 3/2009 Nicolet
7,499,774 B2 3/2009 Barrett et al.
7,499,775 B2 3/2009 Filippov et al.
7,499,776 B2 3/2009 Allard et al.
7,499,804 B2 3/2009 Svendsen et al.

(56) References Cited

U.S. PATENT DOCUMENTS 7,505,848 B2 3/2009 Flann et al.
7,539,557 B2 5/2009 Yamauchi
7,568,873 B1 8/2009 Rambo
7,574,282 B2 8/2009 Petersson et al.
7,577,499 B2 8/2009 Sun et al.
7,587,260 B2 9/2009 Bruemmer et al.
7,590,413 B2 9/2009 May
7,596,934 B2 10/2009 Waesche et al.
7,610,122 B2 10/2009 Anderson
7,610,123 B2 10/2009 Han et al.
7,613,543 B2 11/2009 Petersson et al.
7,614,835 B2 11/2009 Kitamura
7,617,890 B2 11/2009 Romig
7,647,144 B2 1/2010 Haegermarck
D610,072 S 2/2010 Wallet et al.
7,663,333 B2 2/2010 Jones et al.
7,688,676 B2 3/2010 Chiappetta et al.
7,690,066 B2 4/2010 Stoltz et al.
D615,920 S 5/2010 Kline et al.
7,707,812 B2 5/2010 Cheung
7,720,572 B2 5/2010 Ziegler et al.
7,729,801 B2 6/2010 Abramson
7,730,705 B2 6/2010 Kubinski
7,769,490 B2 8/2010 Abramson et al.
7,787,989 B2 8/2010 Colens
7,792,607 B2 9/2010 Han et al.
7,801,645 B2 9/2010 Taylor et al.
7,805,220 B2 9/2010 Taylor et al.
7,805,676 B2 9/2010 Schemers et al.
7,805,918 B2 10/2010 Silbernagel et al.
D628,145 S 11/2010 Vaidya
7,840,210 B2 11/2010 May
7,843,431 B2 11/2010 Robbins et al.
7,844,396 B2 11/2010 Zeitzew
7,853,373 B2 12/2010 Traster et al.
7,876,927 B2 1/2011 Han et al.
7,885,738 B2 2/2011 Park et al.
7,908,834 B2 3/2011 Keski-Luopa
7,929,504 B2 4/2011 Wentink et al.
7,953,526 B2 5/2011 Durkos et al.
7,957,837 B2 6/2011 Ziegler et al.
7,957,850 B2 6/2011 Anderson
7,958,709 B2 6/2011 Coleman et al.
7,958,712 B2 6/2011 Cheung
7,979,175 B2 7/2011 Allard et al.
7,992,251 B2 8/2011 Chung et al.
8,020,657 B2 9/2011 Allard et al.
8,022,667 B2 9/2011 Anderson
8,031,086 B2 10/2011 Thacher et al.
8,046,103 B2 10/2011 Abramson et al.
8,065,866 B2 11/2011 Tamas et al.
8,078,338 B2 12/2011 Pack et al.
8,079,433 B2 12/2011 Teague et al.
D652,431 S 1/2012 Näslund
8,091,105 B2 1/2012 Lee
8,106,626 B2 1/2012 Li et al.
8,107,318 B2 1/2012 Chiappetta et al.
8,108,092 B2 1/2012 Phillips et al.
8,121,730 B2 2/2012 Sung et al.
D656,163 S 3/2012 Johansson et al.
8,135,498 B2 3/2012 Hyung et al.
8,150,574 B2 4/2012 Han et al.
8,195,333 B2 6/2012 Ziegler et al.
8,195,342 B2 6/2012 Anderson
8,195,358 B2 6/2012 Anderson
8,199,109 B2 6/2012 Robbins et al.
8,200,428 B2 6/2012 Anderson
8,208,907 B2 6/2012 May
8,209,053 B2 6/2012 Kim et al.
8,224,500 B2 7/2012 Anderson
8,224,516 B2 7/2012 Anderson
8,229,618 B2 7/2012 Tolstedt et al.
8,234,010 B2 7/2012 Thompson et al.
8,234,848 B2 8/2012 Messina et al.
8,237,389 B2 8/2012 Fitch et al.
8,239,992 B2 8/2012 Schnittman et al.
8,255,092 B2 8/2012 Phillips et al.
8,271,132 B2 9/2012 Nielsen et al.
8,292,007 B2 10/2012 Defazio et al.
8,295,125 B2 10/2012 Chiappetta et al.
8,295,979 B2 10/2012 Thacher et al.
8,297,032 B2 10/2012 Ninomiya et al.
8,297,903 B2 10/2012 Hohmann et al.
8,306,659 B2 11/2012 Abramson et al.
8,311,674 B2 11/2012 Abramson
8,326,469 B2 12/2012 Phillips et al.
8,336,282 B2 12/2012 Messina et al.
8,340,438 B2 12/2012 Anderson
8,347,444 B2 1/2013 Schnittman et al.
8,350,810 B2 1/2013 Robbins et al.
8,352,113 B2 1/2013 Johnson et al.
8,370,985 B2 2/2013 Schnittman et al.
8,390,251 B2 3/2013 Cohen et al.
8,392,044 B2 3/2013 Thompson et al.
8,392,065 B2 3/2013 Tolstedt et al.
8,396,592 B2 3/2013 Jones et al.
8,396,597 B2 3/2013 Anderson
8,396,611 B2 3/2013 Phillips et al.
D679,294 S 4/2013 Tajik et al.
D679,295 S 4/2013 Tajik et al.
8,412,377 B2 4/2013 Casey et al.
8,428,776 B2 4/2013 Letsky
8,433,468 B2 4/2013 Johnson et al.
8,438,695 B2 5/2013 Gilbert, Jr. et al.
8,442,700 B2 5/2013 Anderson
8,447,440 B2 5/2013 Phillips et al.
8,447,454 B2 5/2013 Biber et al.
8,461,803 B2 6/2013 Cohen et al.
8,463,438 B2 6/2013 Jones et al.
8,467,928 B2 6/2013 Anderson
8,471,133 B1 6/2013 Lin
8,473,187 B2 6/2013 Kammel et al.
8,476,867 B2 7/2013 Li et al.
8,478,442 B2 7/2013 Casey et al.
8,498,788 B2 7/2013 Kondekar
D688,276 S 8/2013 Näslund
8,508,329 B2 8/2013 Veenstra
8,521,329 B2 8/2013 Park et al.
8,532,821 B2 9/2013 Ko
8,532,822 B2 9/2013 Abramson et al.
8,560,145 B2 10/2013 Anderson
8,565,920 B2 10/2013 Casey et al.
8,572,266 B2 10/2013 Larocca
8,577,517 B2 11/2013 Phillips et al.
8,577,538 B2 11/2013 Lenser et al.
8,594,842 B2 11/2013 Abramson
8,599,645 B2 12/2013 Chiappetta et al.
8,619,141 B2 12/2013 Anderson
8,634,960 B2 1/2014 Sandin et al.
8,635,015 B2 1/2014 Anderson
8,655,539 B2 2/2014 Yoo et al.
8,660,879 B2 2/2014 Machtelinck
8,666,550 B2 3/2014 Anderson et al.
8,666,554 B2 3/2014 Anderson
8,666,587 B2 3/2014 Anderson
8,671,656 B2 3/2014 Paden
8,676,378 B2 3/2014 Tian et al.
8,706,339 B2 4/2014 Thompson et al.
8,712,623 B2 4/2014 Sato et al.
8,725,316 B2 5/2014 Thompson et al.
8,726,454 B2 5/2014 Gilbert, Jr. et al.
8,731,295 B2 5/2014 Schepelmann et al.
8,739,057 B2 5/2014 Cheong et al.
8,744,626 B2 6/2014 Johnson et al.
8,744,663 B2 6/2014 Sato et al.
8,749,196 B2 6/2014 Cohen et al.
8,760,397 B2 6/2014 Robbins et al.
8,761,935 B2 6/2014 Casey et al.
8,781,627 B2 7/2014 Sandin et al.
8,788,092 B2 7/2014 Casey et al.
8,818,567 B2 8/2014 Anderson
8,818,602 B2 8/2014 Yamamura et al.
8,838,274 B2 9/2014 Jones et al.
8,838,291 B2 9/2014 Jägenstedt et al.

(56) References Cited

U.S. PATENT DOCUMENTS 8,839,477 B2 9/2014 Schnittman et al.
8,843,244 B2 9/2014 Phillips et al.
8,854,001 B2 10/2014 Cohen et al.
8,856,150 B2 10/2014 Machtelinck
8,868,237 B2 10/2014 Sandin et al.
8,869,337 B2 10/2014 Sumonthee
8,869,369 B1 10/2014 Roach
8,874,269 B2 10/2014 Biber et al.
8,874,300 B2 10/2014 Allard et al.
D718,339 S 11/2014 Damshak et al.
D718,340 S 11/2014 Damshak et al.
D718,341 S 11/2014 Gur et al.
8,892,352 B2 11/2014 Petereit et al.
D718,793 S 12/2014 Gur et al.
8,911,192 B2 12/2014 Hohmann et al.
8,918,241 B2 12/2014 Chen et al.
8,925,667 B2 1/2015 Chen
8,930,023 B2 1/2015 Gutmann et al.
8,930,024 B2 1/2015 Abramson
8,938,318 B2 1/2015 Bergström et al.
8,942,862 B2 1/2015 Markusson et al.
8,954,193 B2 2/2015 Sandin et al.
8,958,911 B2 2/2015 Wong et al.
8,958,939 B2 2/2015 Einecke et al.
8,965,578 B2 2/2015 Versteeg et al.
8,989,946 B2 3/2015 Anderson
8,989,972 B2 3/2015 Anderson
8,996,171 B2 3/2015 Anderson et al.
8,996,177 B2 3/2015 Coenen
D729,280 S 5/2015 Näslund et al.
9,021,777 B2 5/2015 Johnson et al.
9,026,299 B2 5/2015 Johnson et al.
9,026,302 B2 5/2015 Stout et al.
9,031,050 B2 5/2015 Cherian et al.
9,037,294 B2 5/2015 Chung et al.
9,043,016 B2 5/2015 Filippov et al.
9,043,129 B2 5/2015 Bonefas et al.
D731,402 S 6/2015 Tedesco et al.
9,043,952 B2 6/2015 Sandin et al.
9,043,953 B2 6/2015 Sandin et al.
9,072,218 B2 7/2015 Johnson et al.
9,072,219 B2 7/2015 Da Rocha et al.
9,079,303 B2 7/2015 Abramson et al.
9,093,868 B2 7/2015 Baxter
9,104,204 B2 8/2015 Jones et al.
9,104,206 B2 8/2015 Biber et al.
9,110,471 B2 8/2015 Pack et al.
9,113,595 B2 8/2015 Roth et al.
9,119,341 B2 9/2015 Jägenstedt
9,137,943 B2 9/2015 Einecke et al.
9,144,193 B2 9/2015 Paden
9,182,763 B2 11/2015 Park et al.
9,186,800 B2 11/2015 Shin et al.
9,188,980 B2 11/2015 Anderson
9,188,983 B2 11/2015 Stout et al.
9,195,256 B2 11/2015 Robbins et al.
D745,897 S 12/2015 Mehra et al.
9,213,934 B1 12/2015 Versteeg et al.
9,215,957 B2 12/2015 Cohen et al.
9,223,312 B2 12/2015 Goel et al.
9,232,692 B2 1/2016 Björn et al.
9,235,214 B2 1/2016 Anderson
9,236,637 B2 1/2016 Anderson
9,241,441 B2 1/2016 Björn et al.
D748,568 S 2/2016 Helin et al.
9,258,942 B2 2/2016 Biber et al.
9,268,331 B2 2/2016 Abramson et al.
9,276,419 B2 3/2016 Borinato et al.
9,278,690 B2 3/2016 Smith
9,301,444 B2 4/2016 Campbell et al.
D757,637 S 5/2016 Horowitz
9,327,407 B2 5/2016 Jones et al.
9,335,767 B2 5/2016 Jang et al.
9,338,130 B2 5/2016 Von Huben et al.
9,348,897 B2 5/2016 Shoham et al.
9,349,187 B2 5/2016 Schepelmann et al.
D758,455 S 6/2016 Maibach et al.
D759,577 S 6/2016 Wang et al.
9,357,699 B2 6/2016 Elonsson
9,363,945 B2 6/2016 Jägenstedt et al.
9,375,842 B2 6/2016 Shamlian et al.
9,376,027 B2 6/2016 Harris
D760,806 S 7/2016 Cmich et al.
9,380,742 B2 7/2016 Biber et al.
9,405,294 B2 8/2016 Jägenstedt et al.
9,412,515 B2 8/2016 Hyde et al.
9,419,453 B2 8/2016 Andersson et al.
9,420,741 B2 8/2016 Balutis et al.
9,421,879 B2 8/2016 Pastoor et al.
9,426,946 B2 8/2016 Fisher
9,429,950 B2 8/2016 Sjöholm
9,436,185 B2 9/2016 Schnittman
9,439,348 B2 9/2016 Biber et al.
9,439,367 B2 9/2016 Abhyanker
9,440,350 B2 9/2016 Mou et al.
9,440,354 B2 9/2016 Gutmann et al.
9,446,521 B2 9/2016 Casey et al.
9,452,525 B2 9/2016 Ziegler et al.
9,452,685 B2 9/2016 Hyde et al.
D769,180 S 10/2016 Wang et al.
9,456,545 B2 10/2016 Biber
9,457,677 B2 10/2016 Hyde et al.
9,463,704 B2 10/2016 Hyde et al.
9,471,063 B2 10/2016 Ouyang
9,480,201 B2 11/2016 Maruyama et al.
9,483,055 B2 11/2016 Johnson et al.
9,491,904 B2 11/2016 Jägenstedt et al.
9,497,901 B2 11/2016 Willgert
9,505,140 B1 11/2016 Fay et al.
9,510,505 B2 12/2016 Halloran et al.
9,516,806 B2 12/2016 Yamauchi et al.
D776,169 S 1/2017 Cmich et al.
9,532,688 B1 1/2017 Ebrahimi Afrouzi et al.
9,538,702 B2 1/2017 Balutis et al.
9,543,680 B2 1/2017 Elonsson
9,545,032 B2 1/2017 Baer et al.
9,550,294 B2 1/2017 Cohen et al.
9,554,508 B2 1/2017 Balutis et al.
9,559,461 B1 1/2017 Diehr
9,560,800 B2 2/2017 Reichen et al.
9,563,204 B2 2/2017 Willgert
9,573,275 B2 2/2017 Reigo et al.
D781,349 S 3/2017 Cmich
D781,926 S 3/2017 Al-Hashimi et al.
9,586,563 B2 3/2017 Kanai et al.
9,590,862 B2 3/2017 Larocca
9,606,541 B2 3/2017 Abramson
9,622,399 B2 4/2017 Kremmer et al.
9,623,557 B2 4/2017 Gutmann et al.
9,630,319 B2 4/2017 Vicenti
9,632,489 B2 4/2017 Biber et al.
9,699,964 B2 7/2017 Roth et al.
9,701,020 B1 7/2017 Ebrahimi Afrouzi
9,711,767 B2 7/2017 Juenger et al.
9,713,302 B2 7/2017 Sandin et al.
9,713,303 B2 7/2017 Jägenstedt et al.
D794,089 S 8/2017 Maibach et al.
9,717,175 B2 8/2017 Il et al.
9,720,417 B2 8/2017 Reigo et al.
9,723,782 B2 8/2017 Roth et al.
9,736,981 B2 8/2017 Roth et al.
9,740,210 B2 8/2017 Sjöholm
D796,555 S 9/2017 Landberg et al.
D797,530 S 9/2017 Cmich
9,750,183 B2 9/2017 Haun
9,766,627 B2 9/2017 Jägenstedt et al.
D799,555 S 10/2017 Cmich
9,785,148 B2 10/2017 Yun
9,788,481 B2 10/2017 Das et al.
9,788,483 B2 10/2017 Roth et al.
9,791,860 B2 10/2017 Phillips et al.
9,804,604 B2 10/2017 Mattsson et al.
9,807,925 B2 11/2017 Johnson
9,807,930 B1 11/2017 Lydon et al.

(56) References Cited

U.S. PATENT DOCUMENTS 9,817,398 B2 11/2017 Yamamura et al.
9,820,433 B2 11/2017 Borinato
9,826,678 B2 11/2017 Balutis et al.
9,829,891 B2 11/2017 Smith et al.
9,841,768 B2 12/2017 Hiramatsu et al.
9,844,876 B2 12/2017 Chung et al.
9,848,529 B2 12/2017 Franzius et al.
9,848,532 B2 12/2017 Keski-Luopa et al.
9,851,718 B2 12/2017 Booher
9,853,468 B2 12/2017 Ireland
D807,281 S 1/2018 Irwin et al.
D807,811 S 1/2018 Wang et al.
9,854,737 B2 1/2018 Yamauchi et al.
9,854,956 B2 1/2018 Song et al.
9,857,025 B2 1/2018 Gottinger et al.
9,861,035 B2 1/2018 Kruckeberg et al.
9,872,437 B2 1/2018 Markusson et al.
9,874,876 B2 1/2018 Shimamura
9,876,370 B2 1/2018 Yamamura et al.
D810,664 S 2/2018 Sgreccia et al.
D810,665 S 2/2018 Sgreccia et al.
9,884,423 B2 2/2018 Cohen et al.
9,894,836 B2 2/2018 Garton
9,895,808 B2 2/2018 Stout et al.
9,901,028 B2 2/2018 Hans
9,903,947 B2 2/2018 Das et al.
9,924,632 B2 3/2018 Chenevert et al.
9,924,847 B2 3/2018 Gottinger et al.
9,931,007 B2 4/2018 Morin et al.
9,931,008 B2 4/2018 Yoo et al.
9,931,750 B2 4/2018 Cohen et al.
9,936,635 B2 4/2018 Gottinger et al.
9,968,024 B2 5/2018 Haneda et al.
9,972,098 B1 5/2018 Ebrahimi Afrouzi et al.
9,983,586 B2 5/2018 Borinato
10,011,180 B2 7/2018 Hyde et al.
10,021,830 B2 7/2018 Doughty
10,024,964 B2 7/2018 Pierce et al.
10,029,368 B2 7/2018 Wolowelsky et al.
10,031,527 B2 7/2018 Björn
10,034,421 B2 7/2018 Doughty et al.
10,035,270 B2 7/2018 Fay et al.
10,037,038 B2 7/2018 Sandin et al.
10,046,130 B2 8/2018 Molden et al.
10,054,924 B2 8/2018 Willgert
10,057,813 B1 8/2018 Likar et al.
10,067,232 B2 9/2018 Halloran et al.
10,070,764 B2 9/2018 Schnittman et al.
10,071,475 B2 9/2018 Lin et al.
10,078,336 B2 9/2018 Reigo et al.
10,080,326 B2 9/2018 Yamamura et al.
D830,418 S 10/2018 Näslund et al.
10,091,930 B2 10/2018 Balutis et al.
10,093,194 B2 10/2018 Hyde et al.
10,093,259 B2 10/2018 Pan
10,098,277 B2 10/2018 Ouyang
10,104,835 B2 10/2018 Köhler et al.
10,105,838 B2 10/2018 Mou et al.
10,108,198 B2 10/2018 Björn et al.
D834,185 S 11/2018 Molden et al.
D834,504 S 11/2018 Ropars
D834,505 S 11/2018 Wang et al.
10,117,379 B2 11/2018 Guiet et al.
10,123,479 B2 11/2018 Ladd, Jr. et al.
10,124,494 B2 11/2018 Outa et al.
10,131,057 B2 11/2018 Patel et al.
10,136,576 B2 11/2018 Reigo
10,149,430 B2 12/2018 Bergström et al.
10,152,062 B2 12/2018 Schnittman
10,157,334 B2 12/2018 Schepelmann et al.
10,159,180 B2 12/2018 Balutis et al.
10,162,359 B2 12/2018 Johnson et al.
D837,150 S 1/2019 Näslund et al.
10,165,725 B2 1/2019 Sugumaran et al.
10,172,282 B2 1/2019 Svensson et al.
10,178,826 B2 1/2019 Jägenstedt et al.
10,183,400 B2 1/2019 Trigui et al.
10,183,701 B2 1/2019 Ebrahimi Afrouzi et al.
10,185,325 B2 1/2019 Reigo et al.
10,201,261 B2 2/2019 Tanaka et al.
10,207,557 B2 2/2019 Björn et al.
10,212,880 B2 2/2019 Cmich et al.
10,238,026 B2 3/2019 Köhler et al.
D845,877 S 4/2019 Geng et al.
10,244,678 B2 4/2019 Lydon et al.
10,246,907 B2 4/2019 Shen
10,257,976 B2 4/2019 Ladd, Jr. et al.
10,259,498 B2 4/2019 Jägenstedt et al.
10,268,206 B2 4/2019 Yamamura
10,274,954 B2 4/2019 Balutis et al.
D848,488 S 5/2019 Cmich
10,281,912 B2 5/2019 Hollister
10,281,922 B2 5/2019 Smith et al.
10,299,431 B2 5/2019 Ladd, Jr. et al.
10,299,652 B2 5/2019 Gilbert, Jr. et al.
D852,232 S 6/2019 Eidson et al.
10,310,510 B2 6/2019 Mannefred et al.
10,315,306 B2 6/2019 Abramson
10,321,625 B2 6/2019 Einecke et al.
10,327,384 B2 6/2019 Johansson et al.
D853,447 S 7/2019 Mehra et al.
D853,448 S 7/2019 Mehra et al.
D853,449 S 7/2019 Mehra et al.
10,338,602 B2 7/2019 Grufman et al.
10,343,280 B1 7/2019 Ebrahimi Afrouzi
10,346,995 B1 7/2019 Ebrahimi Afrouzi
10,353,399 B2 7/2019 Ebrahimi Afrouzi
10,362,730 B2 7/2019 Ladd, Jr. et al.
10,365,661 B2 7/2019 Jägenstedt et al.
10,369,705 B2 8/2019 Trigui et al.
10,372,140 B2 8/2019 Sun et al.
10,375,880 B2 8/2019 Morin et al.
10,377,035 B2 8/2019 He et al.
10,379,172 B2 8/2019 Kleiner et al.
10,384,346 B2 8/2019 Hickman et al.
10,386,844 B2 8/2019 Wilcox et al.
10,390,483 B2 8/2019 Balutis et al.
D858,424 S 9/2019 Chattopadhyay
10,405,488 B2 9/2019 Kamfors et al.
10,425,488 B2 9/2019 Larsén et al.
D864,256 S 10/2019 Eidson et al.
10,426,083 B2 10/2019 Doughty
10,440,879 B2 10/2019 Björn et al.
10,442,083 B2 10/2019 Wolowelsky et al.
10,444,756 B2 10/2019 Kamfors et al.
10,444,757 B2 10/2019 Dong et al.
10,444,760 B2 10/2019 Grufman et al.
10,448,565 B2 10/2019 Mannefred et al.
10,454,287 B2 10/2019 Yamamura et al.
10,456,924 B2 10/2019 Outa et al.
10,459,452 B2 10/2019 Eagling et al.
10,462,961 B2 11/2019 Tjernberg et al.
10,463,215 B2 11/2019 Morin et al.
10,464,206 B2 11/2019 Frisby et al.
10,466,710 B2 11/2019 Biber et al.
10,485,164 B2 11/2019 Letsky
10,488,865 B2 11/2019 Afrouzi et al.
10,496,262 B1 12/2019 Ebrahimi Afrouzi et al.
10,500,722 B2 12/2019 Vicenti
10,514,701 B2 12/2019 Windorfer
10,517,211 B2 12/2019 Öhrlund et al.
10,518,651 B2 12/2019 Svensson et al.
10,520,113 B1 12/2019 Thompson
10,542,667 B2 1/2020 Song et al.
10,542,670 B2 1/2020 Cmich et al.
10,549,646 B2 2/2020 Reynolds et al.
10,551,844 B2 2/2020 Biber et al.
10,552,770 B2 2/2020 Brough et al.
10,555,456 B2 2/2020 Borinato
10,555,457 B2 2/2020 Song et al.
10,561,063 B2 2/2020 Hasegawa et al.
10,568,258 B2 2/2020 Wahlgren
10,571,905 B2 2/2020 Yamamura
10,571,928 B2 2/2020 Sun et al.

(56) References Cited

U.S. PATENT DOCUMENTS 10,575,465 B2 3/2020 Ran et al.
10,575,696 B2 3/2020 O'Brien et al.
10,583,562 B2 3/2020 Stout et al.
10,588,255 B2 3/2020 Song et al.
10,589,418 B2 3/2020 Gordon-Carroll et al.
10,589,432 B2 3/2020 Al Nahwi et al.
10,589,433 B2 3/2020 Al Nahwi et al.
10,592,998 B2 3/2020 Eijdenberg et al.
10,594,117 B2 3/2020 Song et al.
10,595,459 B2 3/2020 Aposhian et al.
10,595,692 B2 3/2020 Morin et al.
10,598,793 B2 3/2020 Öhrlund et al.
10,599,154 B2 3/2020 Dean et al.
10,606,275 B2 3/2020 Dean et al.
10,606,279 B2 3/2020 Grufman et al.
D880,532 S 4/2020 Gunnarsson et al.
D881,252 S 4/2020 Vestberg et al.
D882,640 S 4/2020 Estey
10,609,862 B2 4/2020 Wu et al.
10,611,028 B1 4/2020 Zhou et al.
10,612,929 B2 4/2020 Afrouzi et al.
10,613,541 B1 4/2020 Ebrahimi Afrouzi et al.
10,621,537 B2 4/2020 Ben-Alexander
D884,762 S 5/2020 Gunnarsson et al.
D884,763 S 5/2020 Gunnarsson et al.
10,643,377 B2 5/2020 Grufman et al.
10,646,997 B2 5/2020 Reigo et al.
10,649,466 B2 5/2020 Holmström et al.
10,651,594 B1 5/2020 Tsai et al.
10,653,057 B2 5/2020 Choi et al.
10,653,058 B2 5/2020 Yamanaka et al.
10,653,282 B2 5/2020 Song et al.
10,656,652 B2 5/2020 Dean et al.
D887,464 S 6/2020 Gunnarsson et al.
D887,465 S 6/2020 Gunnarsson et al.
D887,466 S 6/2020 Gunnarsson et al.
10,670,406 B2 6/2020 Eguchi et al.
10,673,630 B2 6/2020 Pakkan et al.
10,674,659 B2 6/2020 Ladd, Jr. et al.
10,674,660 B2 6/2020 Matsuzawa et al.
10,681,863 B2 6/2020 Hans et al.
10,681,864 B2 6/2020 Matt et al.
10,691,000 B2 6/2020 Du et al.
10,698,417 B2 6/2020 Churavy et al.
D889,517 S 7/2020 Prybor et al.
10,716,258 B2 7/2020 Pellenc et al.
10,721,860 B2 7/2020 Liljedahl
D892,187 S 8/2020 Maggard
10,737,369 B2 8/2020 Steinhauser et al.
10,737,395 B2 8/2020 Wolff et al.
10,738,495 B2 8/2020 Durvasula et al.
10,739,769 B2 8/2020 Dean et al.
10,747,413 B2 8/2020 Schneider et al.
10,750,667 B2 8/2020 Yamauchi et al.
10,750,918 B2 8/2020 Jung et al.
D896,737 S 9/2020 Phely
10,758,100 B2 9/2020 Cohen et al.
10,765,284 B2 9/2020 Song et al.
10,766,147 B2 9/2020 Trigui et al.
10,777,000 B2 9/2020 Grufman et al.
10,782,705 B2 9/2020 Reigo et al.
10,785,907 B2 9/2020 Doughty et al.
10,788,832 B2 9/2020 Nykamp
10,791,684 B2 10/2020 He et al.
10,795,377 B2 10/2020 Afrouzi et al.
10,806,075 B2 10/2020 Grufman et al.
10,809,071 B2 10/2020 Afrouzi et al.
10,809,740 B2 10/2020 Reinert et al.
10,814,495 B2 10/2020 Patel et al.
10,820,493 B2 11/2020 Ritzer et al.
10,824,163 B2 11/2020 Einecke et al.
10,842,074 B2 11/2020 Jägenstedt et al.
10,843,734 B1 11/2020 Ebrahimi Afrouzi et al.
10,843,735 B1 11/2020 Ebrahimi Afrouzi et al.
10,845,481 B2 11/2020 Pierce et al.
10,845,804 B2 11/2020 Holgersson et al.
D906,373 S 12/2020 Morin et al.
10,849,267 B2 12/2020 Strandberg et al.
10,849,270 B2 12/2020 Johansson et al.
10,850,400 B2 12/2020 Park
10,852,735 B2 12/2020 Tan et al.
10,852,738 B2 12/2020 Mannefred et al.
10,856,467 B2 12/2020 Maggard
10,858,041 B2 12/2020 Jägenstedt et al.
10,869,432 B2 12/2020 Wykman et al.
10,873,194 B2 12/2020 Lydon et al.
10,874,045 B2 12/2020 Balutis et al.
10,874,049 B2 12/2020 Ladd, Jr. et al.
10,874,051 B2 12/2020 Kasai et al.
10,874,278 B2 12/2020 Matt et al.
D908,597 S 1/2021 Meng et al.
D908,598 S 1/2021 Meng et al.
10,882,187 B2 1/2021 Li et al.
10,888,046 B2 1/2021 Gorenflo et al.
10,890,921 B2 1/2021 Gillett
10,895,876 B2 1/2021 Arenz et al.
10,899,171 B2 1/2021 Cmich
10,912,253 B2 2/2021 Einecke et al.
10,928,833 B2 2/2021 Reigo
10,932,409 B2 3/2021 Ingvalson et al.
10,935,383 B1 3/2021 Ebrahimi Afrouzi et al.
10,939,611 B2 3/2021 Liljedahl
10,952,578 B2 3/2021 Gill et al.
10,959,371 B2 3/2021 Zhou et al.
10,966,368 B2 4/2021 Desai et al.
10,967,752 B2 4/2021 Liu et al.
10,973,168 B2 4/2021 Hans et al.
10,986,775 B2 4/2021 Matt et al.
10,986,971 B1 4/2021 Ebrahimi Afrouzi
10,993,598 B2 5/2021 Park et al.
11,003,192 B2 5/2021 Dalfra et al.
11,009,869 B2 5/2021 Moroi et al.
11,013,655 B1 5/2021 Ebrahimi Afrouzi et al.
11,014,460 B2 5/2021 Schnittman et al.
11,016,481 B2 5/2021 Gustavsson et al.
D922,444 S 6/2021 Morin et al.
11,019,975 B2 6/2021 Jang et al.
11,020,857 B2 6/2021 Xiong et al.
11,039,582 B2 6/2021 Gilliam et al.
11,039,583 B2 6/2021 Gilliam et al.
11,044,844 B2 6/2021 Keski-Luopa et al.
11,048,268 B2 6/2021 Ouyang
11,051,449 B2 7/2021 Bergh et al.
11,051,671 B2 7/2021 Jang et al.
11,052,535 B2 7/2021 Parks et al.
11,052,540 B2 7/2021 Stout et al.
11,054,822 B2 7/2021 Özmen
11,054,836 B2 7/2021 Wang et al.
11,058,053 B2 7/2021 Patel et al.
11,064,652 B2 7/2021 Matt et al.
11,065,762 B2 7/2021 Sakai et al.
11,069,082 B1 7/2021 Ebrahimi Afrouzi et al.
11,071,429 B2 7/2021 Jang et al.
11,072,250 B2 7/2021 Gilbert, Jr. et al.
11,072,255 B2 7/2021 Svensson et al.
11,075,910 B2 7/2021 Dean et al.
11,076,529 B2 8/2021 Chen et al.
11,079,755 B2 8/2021 Schlacks, IV et al.
11,084,172 B2 8/2021 Casey et al.
11,089,732 B2 8/2021 Jägenstedt et al.
11,097,428 B2 8/2021 Al Nahwi et al.
11,099,572 B2 8/2021 Cestonaro et al.
11,104,006 B2 8/2021 Fay et al.
11,105,109 B2 8/2021 Durvasula et al.
11,106,215 B2 8/2021 Dalfra
11,109,528 B2 9/2021 Strang
11,109,731 B2 9/2021 Jang et al.
11,112,505 B2 9/2021 Öhrlund et al.
11,112,532 B2 9/2021 Jägenstedt et al.
11,115,798 B2 9/2021 Beaulieu et al.
11,117,264 B2 9/2021 Tsai et al.
11,119,496 B1 9/2021 Ebrahimi Afrouzi et al.
11,126,193 B2 9/2021 Mannefred et al.
11,134,609 B2 10/2021 Willgert et al.

(56) References Cited

U.S. PATENT DOCUMENTS 11,140,815 B2 10/2021 Matt et al.
11,140,819 B2 10/2021 Chen et al.
11,141,034 B2 10/2021 Jang et al.
11,154,006 B2 10/2021 Liljedahl
11,154,442 B1 10/2021 Dean et al.
11,157,015 B2 10/2021 Schnittman
D937,181 S 11/2021 Guidry
11,161,235 B2 11/2021 He et al.
11,161,381 B2 11/2021 Svensson et al.
11,161,422 B2 11/2021 Andriolo et al.
11,161,578 B2 11/2021 Wu et al.
11,163,292 B2 11/2021 Adler et al.
11,166,411 B2 11/2021 Fuse et al.
11,169,527 B2 11/2021 Dalfra
11,169,530 B1 11/2021 Ärlig et al.
11,171,497 B2 11/2021 Jiao et al.
11,173,594 B2 11/2021 Kim
11,175,374 B2 11/2021 Kameyama et al.
11,191,403 B2 12/2021 Gill et al.
11,197,414 B2 12/2021 Zeiler et al.
11,199,853 B1 12/2021 Afrouzi et al.
11,202,547 B2 12/2021 Jang et al.
11,215,461 B1 1/2022 Ebrahimi Afrouzi et al.
11,221,628 B2 1/2022 Holgersson et al.
11,225,228 B2 1/2022 Liu et al.
11,229,154 B2 1/2022 Hershbarger
11,231,708 B2 1/2022 Hyakusawa
D943,638 S 2/2022 Rauch et al.
11,235,451 B2 2/2022 Bombulie
11,235,472 B2 2/2022 Al Nahwi et al.
11,253,126 B2 2/2022 Jang et al.
11,260,765 B2 3/2022 Namiki et al.
11,269,349 B2 3/2022 Shao et al.
11,274,929 B1 3/2022 Afrouzi et al.
11,278,176 B2 3/2022 Huang et al.
11,278,177 B2 3/2022 Lin et al.
11,284,766 B2 3/2022 Jang et al.
11,287,821 B2 3/2022 Borinato
11,287,832 B2 3/2022 Ebrahimi Afrouzi
11,291,343 B2 4/2022 Jang et al.
11,292,136 B2 4/2022 Wolff et al.
11,298,831 B2 4/2022 Tsai et al.
11,300,975 B2 4/2022 Dalfra et al.
11,320,828 B1 5/2022 Ebrahimi Afrouzi et al.
11,325,590 B2 5/2022 Han et al.
11,340,079 B1 5/2022 Ebrahimi Afrouzi et al.
11,347,230 B2 5/2022 Wang et al.
11,351,670 B2 6/2022 Wolowelsky et al.
11,357,166 B2 6/2022 Hahn et al.
11,357,167 B2 6/2022 Aposhian et al.
11,378,979 B2 7/2022 Zhou et al.
11,380,320 B2 7/2022 Duncan
11,393,114 B1 7/2022 Ebrahimi Afrouzi et al.
11,415,998 B2 8/2022 Strandberg
11,464,164 B2 10/2022 Cmich et al.
11,596,117 B2 3/2023 Koehler et al.
11,614,744 B2 3/2023 Ran et al.
11,654,574 B2 5/2023 Zhang et al.
11,662,723 B2 5/2023 Schlacks, IV et al.
2002/0005237 A1 1/2002 Musat et al.
2003/0144774 A1 7/2003 Trissel et al.
2003/0218046 A1 11/2003 Peter, Jr.
2003/0236590 A1 12/2003 Park et al.
2004/0000823 A1 1/2004 Patridge
2004/0158358 A1 8/2004 Anezaki et al.
2004/0187457 A1 9/2004 Colens
2004/0190376 A1 9/2004 Hulden et al.
2004/0200505 A1 10/2004 Taylor et al.
2004/0204792 A1 10/2004 Taylor et al.
2004/0211444 A1 10/2004 Taylor et al.
2004/0236468 A1 11/2004 Taylor et al.
2004/0244138 A1 12/2004 Taylor et al.
2005/0010331 A1 1/2005 Taylor et al.
2005/0028346 A1 2/2005 Mangone
2005/0034437 A1 2/2005 McMurtry et al.
2005/0039428 A1 2/2005 McMurtry et al.
2005/0042059 A1 2/2005 Bremer
2005/0060975 A1 3/2005 McClymonds
2005/0171637 A1 8/2005 Tani et al.
2005/0171644 A1 8/2005 Tani
2005/0273967 A1 12/2005 Taylor et al.
2006/0010844 A1 1/2006 Angott
2006/0020369 A1 1/2006 Taylor et al.
2006/0020370 A1 1/2006 Abramson
2006/0191096 A1 8/2006 Sudo et al.
2006/0212191 A1 9/2006 Saeki
2006/0217854 A1 9/2006 Takenaka et al.
2006/0219838 A1 10/2006 Audet
2007/0100496 A1 5/2007 Forell
2007/0119137 A1 5/2007 Brandon
2007/0142972 A1 6/2007 Abramson et al.
2007/0143949 A1 6/2007 Chiu
2007/0145943 A1 6/2007 Sudo
2007/0150109 A1 6/2007 Peless et al.
2007/0234698 A1 10/2007 Silbernagel et al.
2007/0276541 A1 11/2007 Sawasaki
2008/0143065 A1 6/2008 Defazio et al.
2008/0163117 A1 7/2008 Machtelinck et al.
2008/0167753 A1 7/2008 Peless et al.
2008/0281470 A1 11/2008 Gilbert, Jr. et al.
2008/0294288 A1 11/2008 Yamauchi
2009/0112679 A1 4/2009 Machtelinck
2009/0157259 A1 6/2009 Han et al.
2009/0182464 A1 7/2009 Myeong et al.
2009/0276277 A1 11/2009 Vansteenkiste et al.
2009/0313038 A1 12/2009 Machtelinck
2010/0057286 A1 3/2010 Kerchner
2010/0063652 A1 3/2010 Anderson
2010/0066587 A1 3/2010 Yamauchi et al.
2010/0299016 A1 11/2010 Benzler et al.
2010/0326034 A1* 12/2010 Gilpatrick ............ A01D 34/733 56/11.8
2011/0046784 A1 2/2011 Anderson
2011/0046836 A1 2/2011 Anderson
2011/0112713 A1 5/2011 Teng et al.
2011/0153172 A1 6/2011 Anderson
2011/0153338 A1 6/2011 Anderson
2011/0202307 A1 8/2011 Petereit et al.
2011/0208357 A1 8/2011 Yamauchi
2011/0295423 A1 12/2011 Anderson
2012/0012635 A1 1/2012 Jaffe et al.
2012/0029752 A1 2/2012 Johnson et al.
2012/0101679 A1 4/2012 Anderson et al.
2012/0143429 A1 6/2012 Anderson
2012/0215380 A1 8/2012 Fouillade et al.
2012/0226381 A1 9/2012 Abramson et al.
2012/0253581 A1 10/2012 Anderson
2012/0265346 A1 10/2012 Gilbert, Jr. et al.
2012/0303160 A1 11/2012 Ziegler et al.
2013/0000677 A1 1/2013 Sumonthee
2013/0031787 A1 2/2013 Kamiya et al.
2013/0031788 A1 2/2013 Ohno
2013/0098402 A1 4/2013 Yoon et al.
2013/0167495 A1 7/2013 Borinato
2013/0214498 A1 8/2013 Defazio et al.
2014/0000231 A1 1/2014 Bernini
2014/0126952 A1 5/2014 Fay, II
2014/0163733 A1 6/2014 Sadowski et al.
2014/0197222 A1 7/2014 Howe
2014/0203776 A1 7/2014 Ireland et al.
2014/0204510 A1 7/2014 Ireland
2014/0330496 A1 11/2014 Crouse et al.
2015/0012164 A1 1/2015 Yu et al.
2015/0045992 A1 2/2015 Ashby et al.
2015/0120057 A1 4/2015 Wong et al.
2015/0128547 A1 5/2015 Einecke et al.
2015/0163993 A1 6/2015 Pettersson
2015/0181806 A1 7/2015 Lim et al.
2015/0270729 A1 9/2015 Isobe
2015/0301532 A1 10/2015 Norris et al.
2015/0379785 A1 12/2015 Brown, Jr. et al.
2016/0014957 A1 1/2016 Johansson et al.
2016/0075032 A1 3/2016 Goel et al.
2016/0100523 A1 4/2016 Anderson

(56) References Cited

U.S. PATENT DOCUMENTS

2016/0128275 A1 5/2016 Johnson
2016/0146611 A1 5/2016 Matthews
2016/0157275 A1 6/2016 Matthews
2016/0174140 A1 6/2016 Wu et al.
2016/0179095 A1 6/2016 Sarid et al.
2016/0187885 A1 6/2016 Pack et al.
2016/0198644 A1 7/2016 Lameli et al.
2016/0311076 A1 10/2016 Matsumoto et al.
2016/0316619 A1 11/2016 Johanek et al.
2016/0338262 A1 11/2016 Liu et al.
2016/0354931 A1 12/2016 Jones et al.
2016/0360695 A1 12/2016 Klackensjö
2016/0378111 A1 12/2016 Lenser et al.
2017/0046663 A1 2/2017 Wong et al.
2017/0088010 A1 3/2017 Tonks et al.
2017/0269595 A1 9/2017 Chen
2017/0303466 A1 10/2017 Grufman et al.
2017/0308092 A1 10/2017 Altinger et al.
2017/0325648 A1 11/2017 Huang
2017/0351260 A1 12/2017 Willgert et al.
2017/0361468 A1 12/2017 Cheuvront et al.
2018/0103583 A1 4/2018 Stridh
2018/0120852 A1 5/2018 Cho
2018/0184585 A1 7/2018 Song et al.
2018/0184591 A1 7/2018 Song et al.
2018/0232134 A1 8/2018 Ebrahimi Afrouzi et al.
2018/0246516 A1 8/2018 Franzius et al.
2018/0263182 A1 9/2018 Albinger et al.
2018/0267552 A1 9/2018 Artes et al.
2018/0317368 A1 11/2018 Du et al.
2018/0344116 A1 12/2018 Schriesheim et al.
2018/0348787 A1 12/2018 Sandin et al.
2019/0041869 A1 2/2019 Shao et al.
2019/0049593 A1 2/2019 He et al.
2019/0049968 A1 2/2019 Dean et al.
2019/0049984 A1 2/2019 Wong et al.
2019/0053423 A1 2/2019 Guiet et al.
2019/0069330 A1 2/2019 Ebrahimi Afrouzi et al.
2019/0113931 A1 4/2019 Zha et al.
2019/0118877 A1 4/2019 Ran et al.
2019/0141886 A1 5/2019 Liu et al.
2019/0141888 A1 5/2019 Balutis et al.
2019/0166487 A1 5/2019 Russ et al.
2019/0176321 A1 6/2019 Afrouzi et al.
2019/0187714 A1 6/2019 He et al.
2019/0227574 A1 7/2019 Du et al.
2019/0239428 A1 8/2019 Levin et al.
2019/0246862 A1 8/2019 Gilbert, Jr. et al.
2019/0248007 A1 8/2019 Duffy et al.
2019/0250604 A1 8/2019 Balutis et al.
2019/0265724 A1 8/2019 Sheng et al.
2019/0270124 A1 9/2019 Jang et al.
2019/0275666 A1 9/2019 Abramson
2019/0278269 A1 9/2019 He et al.
2019/0297869 A1 10/2019 Michaels et al.
2019/0299398 A1 10/2019 Svensson
2019/0313576 A1 10/2019 Haneda et al.
2019/0320580 A1 10/2019 Haneda et al.
2019/0339719 A1 11/2019 Wang et al.
2019/0343040 A1 11/2019 Testolin et al.
2019/0343041 A1* 11/2019 Ladd, Jr. ................ A01D 34/64
2019/0346848 A1 11/2019 Zhou et al.
2019/0357430 A1 11/2019 Kraft
2019/0357431 A1 11/2019 Kamfors et al.
2019/0369620 A1 12/2019 Zhou et al.
2019/0369629 A1 12/2019 Dalfra
2019/0369640 A1 12/2019 He et al.
2019/0378360 A1 12/2019 Bergenholm et al.
2019/0380266 A1 12/2019 Liljedahl
2019/0383887 A1 12/2019 Kleiner et al.
2019/0384306 A1 12/2019 Jang et al.
2019/0391589 A1 12/2019 Komorida et al.
2020/0000023 A1 1/2020 Chung
2020/0019156 A1 1/2020 Drew et al.
2020/0022553 A1 1/2020 Gill et al.
2020/0033386 A1 1/2020 Abramson
2020/0037498 A1 2/2020 Ko et al.
2020/0039079 A1 2/2020 Brouwers et al.
2020/0042011 A1 2/2020 Ärlig et al.
2020/0050208 A1 2/2020 Frick et al.
2020/0073403 A1 3/2020 Abramson et al.
2020/0093058 A1 3/2020 Ritzer et al.
2020/0100425 A1 4/2020 Li
2020/0108499 A1 4/2020 Vicenti
2020/0120863 A1 4/2020 Liu et al.
2020/0128750 A1 4/2020 Svensson et al.
2020/0129029 A1 4/2020 Kim et al.
2020/0139536 A1 5/2020 Frisby et al.
2020/0146211 A1 5/2020 Wahlgren
2020/0154637 A1 5/2020 Doughty
2020/0170180 A1 6/2020 Kong et al.
2020/0172166 A1 6/2020 Chang et al.
2020/0173784 A1 6/2020 Chang
2020/0193071 A1 6/2020 Yu et al.
2020/0196523 A1 6/2020 Ran et al.
2020/0198488 A1 6/2020 Liljedahl
2020/0201328 A1 6/2020 Abramson
2020/0201347 A1 6/2020 Dalfra et al.
2020/0206896 A1 7/2020 Wong et al.
2020/0221633 A1 7/2020 Einecke et al.
2020/0229344 A1 7/2020 Du et al.
2020/0233658 A1 7/2020 Yang et al.
2020/0236846 A1 7/2020 Choi et al.
2020/0237169 A1 7/2020 Song et al.
2020/0239090 A1 7/2020 Kong et al.
2020/0245550 A1 8/2020 Smith et al.
2020/0253116 A1 8/2020 Ladd, Jr. et al.
2020/0256369 A1 8/2020 Gao
2020/0260638 A1 8/2020 Rotole
2020/0267903 A1 8/2020 Gao et al.
2020/0278680 A1 9/2020 Schulz et al.
2020/0278683 A1 9/2020 Dean et al.
2020/0281114 A1 9/2020 Jägenstedt et al.
2020/0281430 A1 9/2020 Morin et al.
2020/0285963 A1 9/2020 Velkey et al.
2020/0287397 A1 9/2020 Jiao et al.
2020/0297180 A1 9/2020 Kang et al.
2020/0315087 A1 10/2020 Svensson et al.
2020/0323191 A1 10/2020 Duncan et al.
2020/0323408 A1 10/2020 Cohen et al.
2020/0326725 A1 10/2020 Churavy et al.
2020/0337201 A1 10/2020 Siekmann
2020/0352082 A1 11/2020 Maeder et al.
2020/0352091 A1 11/2020 Ambros et al.
2020/0356093 A1 11/2020 Shimamura et al.
2020/0362536 A1 11/2020 Shimamura et al.
2020/0363810 A1 11/2020 Arras et al.
2020/0366481 A1 11/2020 Pakkan et al.
2020/0367429 A1 11/2020 Yuan
2020/0369080 A1 11/2020 Cmich
2020/0375096 A1 12/2020 Coleman
2020/0375097 A1 12/2020 Coleman
2020/0375098 A1 12/2020 Muro et al.
2020/0383265 A1 12/2020 Holgersson
2020/0393844 A1 12/2020 Ritzer et al.
2020/0396916 A1 12/2020 He et al.
2020/0401146 A1 12/2020 Strandberg
2021/0000005 A1 1/2021 Robinson
2021/0000008 A1 1/2021 Svensson et al.
2021/0003405 A1 1/2021 Choi
2021/0004895 A1 1/2021 Kuriyagawa et al.
2021/0016453 A1 1/2021 Patel et al.
2021/0018927 A1 1/2021 Ackerman et al.
2021/0029873 A1 2/2021 Yamauchi et al.
2021/0029874 A1 2/2021 Robertsson
2021/0031367 A1 2/2021 Mirzaei et al.
2021/0037703 A1 2/2021 Holgersson
2021/0041871 A1 2/2021 Lai et al.
2021/0048831 A1 2/2021 Yun et al.
2021/0059112 A1 3/2021 Kim
2021/0064036 A1 3/2021 Muro et al.
2021/0064050 A1 3/2021 Pickett et al.
2021/0070356 A1 3/2021 Lyzen et al.
2021/0072764 A1 3/2021 Kean

(56) References Cited

U.S. PATENT DOCUMENTS

2021/0076562 A1 3/2021 Doughty et al.
2021/0076563 A1 3/2021 Andriolo et al.
2021/0076892 A1 3/2021 Schriesheim et al.
2021/0083492 A1 3/2021 Towner et al.
2021/0083493 A1 3/2021 Towner et al.
2021/0083494 A1 3/2021 Towner et al.
2021/0084815 A1 3/2021 Li et al.
2021/0089034 A1 3/2021 Hjelmaker
2021/0092912 A1 4/2021 Wykman et al.
2021/0094346 A1 4/2021 Cmich
2021/0100160 A1 4/2021 Kang et al.
2021/0100161 A1 4/2021 Balutis et al.
2021/0107363 A1 4/2021 Han et al.
2021/0114810 A1 4/2021 Matsuoka et al.
2021/0116933 A1 4/2021 Ouyang
2021/0125366 A1 4/2021 Hasberg et al.
2021/0127569 A1 5/2021 Gruhler et al.
2021/0132604 A1 5/2021 Gillett
2021/0132624 A1 5/2021 Andriolo et al.
2021/0132625 A1 5/2021 Gillett
2021/0132626 A1 5/2021 Gillett
2021/0153428 A1 5/2021 Mittmann et al.
2021/0153710 A1 5/2021 Mosebach et al.
2021/0157331 A1 5/2021 He
2021/0161065 A1 6/2021 Holgersson
2021/0165109 A1 6/2021 Yang et al.
2021/0165411 A1 6/2021 Andriolo et al.
2021/0168999 A1 6/2021 Xu
2021/0176915 A1 6/2021 Vines et al.
2021/0179137 A1 6/2021 Gillett
2021/0185911 A1 6/2021 Agerhall
2021/0191764 A1 6/2021 Dalfra
2021/0200226 A1 7/2021 Wang et al.
2021/0200228 A1 7/2021 Grufman et al.
2021/0204473 A1 7/2021 Andriolo et al.
2021/0206367 A1 7/2021 Liu et al.
2021/0216070 A1 7/2021 Vankampen et al.
2021/0219488 A1 7/2021 Zhao et al.
2021/0221246 A1 7/2021 Liu et al.
2021/0223787 A1 7/2021 Pellisari
2021/0227744 A1 7/2021 Zhou et al.
2021/0228043 A1 7/2021 Jang et al.
2021/0230622 A1 7/2021 Crow et al.
2021/0235616 A1 8/2021 Stark et al.
2021/0255638 A1 8/2021 Ma et al.
2021/0259497 A1 8/2021 Park et al.
2021/0263131 A1 8/2021 Dalfra
2021/0263529 A1 8/2021 Takahashi et al.
2021/0270338 A1 9/2021 Ederfors
2021/0272438 A1 9/2021 Askenmalm
2021/0274705 A1 9/2021 Mårtensson et al.
2021/0282322 A1 9/2021 Yoon et al.
2021/0289695 A1 9/2021 Grufman et al.
2021/0294348 A1 9/2021 Lan et al.
2021/0298232 A1 9/2021 Wolf et al.
2021/0302999 A1 9/2021 Yokoyama et al.
2021/0311484 A1 10/2021 Lee et al.
2021/0315155 A1 10/2021 Lee et al.
2021/0321854 A1 10/2021 Zhang et al.
2021/0325872 A1 10/2021 Schlacks, IV et al.
2021/0325874 A1 10/2021 Schlacks, IV et al.
2021/0325875 A1 10/2021 Schlacks, IV et al.
2021/0325876 A1 10/2021 Schlacks, IV et al.
2021/0325877 A1 10/2021 Schlacks, IV et al.
2021/0325878 A1 10/2021 Schlacks, IV et al.
2021/0328991 A1 10/2021 Dean et al.
2021/0329841 A1 10/2021 Cuong et al.
2021/0331594 A1 10/2021 Svensson et al.
2021/0337726 A1 11/2021 Keski-Luopa et al.
2021/0344299 A1 11/2021 Layne et al.
2021/0345544 A1 11/2021 Han et al.
2021/0345545 A1 11/2021 Zhao et al.
2021/0347204 A1 11/2021 Cmich
2021/0352841 A1 11/2021 Edfors et al.
2021/0352842 A1 11/2021 Pu et al.
2021/0352843 A1 11/2021 Zhao et al.
2021/0360853 A1 11/2021 Herrera
2021/0365044 A1 11/2021 Xue et al.
2021/0382476 A1 12/2021 Morrison et al.
2022/0009363 A1 1/2022 Gilbert, Jr. et al.
2022/0022371 A1 1/2022 Askenmalm et al.
2022/0022386 A1 1/2022 Danling
2022/0029477 A1 1/2022 He et al.
2022/0030766 A1 2/2022 Johansson
2022/0039313 A1 2/2022 Morrison et al.
2022/0061212 A1 3/2022 Zeiler et al.
2022/0066456 A1 3/2022 Ebrahimi Afrouzi et al.
2022/0071086 A1 3/2022 Levin et al.
2022/0071465 A1 3/2022 Kim et al.
2022/0083075 A1 3/2022 Heiss et al.
2022/0091257 A1 3/2022 Almers et al.
2022/0100197 A1 3/2022 Chao
2022/0124973 A1 4/2022 Juel
2022/0129000 A1 4/2022 Ingvalson et al.
2022/0142438 A1 5/2022 Chen et al.
2022/0151143 A1 5/2022 Liljedahl et al.
2022/0151147 A1 5/2022 Chen et al.
2022/0167552 A1 6/2022 Frick et al.
2022/0167553 A1 6/2022 Rogöet al.
2022/0174868 A1 6/2022 Flygare
2022/0180282 A1 6/2022 Powell et al.
2022/0183223 A1 6/2022 Svensson et al.
2022/0183226 A1 6/2022 Paolo Andriolo
2022/0217902 A1 7/2022 Chen et al.
2022/0217904 A1 7/2022 Svensson et al.
2022/0240444 A1 8/2022 Wang et al.
2022/0261006 A1 8/2022 Zaslavsky et al.
2022/0272897 A1 9/2022 Jiao et al.
2022/0295696 A1 9/2022 Holgersson et al.
2022/0295709 A1 9/2022 Wisse et al.
2022/0322603 A1 10/2022 Inaba et al.
2022/0322908 A1 10/2022 Cha et al.
2022/0324112 A1 10/2022 Wolowelsky et al.
2022/0326709 A1 10/2022 Andriolo
2022/0334244 A1 10/2022 Li et al.
2022/0342425 A1 10/2022 Glimberg et al.
2022/0354050 A1 11/2022 Du et al.
2022/0396969 A1 12/2022 Arvidsson et al.
2023/0008134 A1 1/2023 Olofsson et al.
2023/0008169 A1 1/2023 Cuong et al.
2023/0009964 A1 1/2023 Jonsson et al.
2023/0010420 A1 1/2023 Glimberg et al.
2023/0015812 A1 1/2023 Wikestad et al.
2023/0017821 A1 1/2023 Ma et al.
2023/0034100 A1 2/2023 Holgersson et al.
2023/0042864 A1 2/2023 Danling et al.
2023/0051150 A1 2/2023 Pu et al.
2023/0059610 A1 2/2023 Mei et al.
2023/0071262 A1 3/2023 Lundkvist et al.
2023/0074101 A1 3/2023 Mårtensson et al.
2023/0081732 A1 3/2023 Abramson
2023/0085538 A1 3/2023 Lundkvist et al.
2023/0092131 A1 3/2023 Lao et al.
2023/0117845 A1 4/2023 Holgersson et al.
2023/0119277 A1 4/2023 Leijonberger
2023/0138339 A1 5/2023 Wikestad
2023/0145580 A1 5/2023 Hong et al.
2023/0152817 A1 5/2023 Huang et al.
2023/0161357 A1 5/2023 Liljedahl et al.
2023/0176000 A1 6/2023 Abbott et al.
2023/0176225 A1 6/2023 Mårtensson et al.
2023/0185309 A1 6/2023 Glimberg et al.
2023/0189705 A1 6/2023 Svensson et al.

FOREIGN PATENT DOCUMENTS

AU 2011239328 A1 11/2011
AU 2012101338 A4 11/2012
AU 2014201952 A1 4/2014
AU 2015230722 A1 10/2015
CA 1079076 A 6/1980
CN 2382585 Y 6/2000
CN 2693167 Y 4/2005
CN 3512456 3/2006

(56) References Cited

FOREIGN PATENT DOCUMENTS

| | | | |
|---|---|---|---|
| CN | 3599999 | | 1/2007 |
| CN | 3626101 | | 3/2007 |
| CN | 101185088 | A | 5/2008 |
| CN | 300775531 | | 5/2008 |
| CN | 201127182 | Y | 10/2008 |
| CN | 101313319 | A | 11/2008 |
| CN | 201226676 | Y | 4/2009 |
| CN | 201226677 | Y | 4/2009 |
| CN | 100485567 | C | 5/2009 |
| CN | 100498602 | C | 6/2009 |
| CN | 201260303 | Y | 6/2009 |
| CN | 301144405 | | 2/2010 |
| CN | 301276003 | | 6/2010 |
| CN | 301290512 | | 7/2010 |
| CN | 201557392 | U | 8/2010 |
| CN | 301328063 | | 8/2010 |
| CN | 101292244 | B | 12/2010 |
| CN | 301444971 | | 1/2011 |
| CN | 101982037 | A | 3/2011 |
| CN | 201797741 | U | 4/2011 |
| CN | 301506267 | | 4/2011 |
| CN | 201846616 | U | 6/2011 |
| CN | 301573109 | | 6/2011 |
| CN | 301611305 | | 7/2011 |
| CN | 301653707 | | 8/2011 |
| CN | 301660006 | | 8/2011 |
| CN | 301742022 | | 11/2011 |
| CN | 202077380 | U | 12/2011 |
| CN | 102523841 | A | 7/2012 |
| CN | 302020661 | | 8/2012 |
| CN | 102687620 | A | 9/2012 |
| CN | 102687625 | A | 9/2012 |
| CN | 302080704 | | 9/2012 |
| CN | 102771246 | A | 11/2012 |
| CN | 102771259 | A | 11/2012 |
| CN | 302218376 | | 12/2012 |
| CN | 102880175 | A | 1/2013 |
| CN | 302299693 | | 1/2013 |
| CN | 302350176 | | 3/2013 |
| CN | 302456271 | | 6/2013 |
| CN | 302483861 | | 6/2013 |
| CN | 103294056 | A | 9/2013 |
| CN | 103324191 | A | 9/2013 |
| CN | 103324192 | A | 9/2013 |
| CN | 203233683 | U | 10/2013 |
| CN | 302629702 | | 11/2013 |
| CN | 103473497 | A | 12/2013 |
| CN | 302702748 | | 1/2014 |
| CN | 103578164 | A | 2/2014 |
| CN | 103676947 | A | 3/2014 |
| CN | 203575087 | U | 5/2014 |
| CN | 103858584 | A | 6/2014 |
| CN | 203691948 | U | 7/2014 |
| CN | 203735069 | U | 7/2014 |
| CN | 302881351 | | 7/2014 |
| CN | 104007765 | A | 8/2014 |
| CN | 104025796 | A | 9/2014 |
| CN | 203840762 | U | 9/2014 |
| CN | 302943247 | | 9/2014 |
| CN | 302943249 | | 9/2014 |
| CN | 104094727 | A | 10/2014 |
| CN | 104111460 | A | 10/2014 |
| CN | 104111651 | A | 10/2014 |
| CN | 104111652 | A | 10/2014 |
| CN | 104111653 | A | 10/2014 |
| CN | 203851480 | U | 10/2014 |
| CN | 302974154 | | 10/2014 |
| CN | 104126361 | A | 11/2014 |
| CN | 104160830 | A | 11/2014 |
| CN | 302993652 | | 11/2014 |
| CN | 204014494 | U | 12/2014 |
| CN | 204047176 | U | 12/2014 |
| CN | 303058887 | | 12/2014 |
| CN | 303075143 | | 1/2015 |
| CN | 104360684 | A | 2/2015 |
| CN | 204143255 | U | 2/2015 |
| CN | 104571102 | A | 4/2015 |
| CN | 104686050 | A | 6/2015 |
| CN | 104704979 | A | 6/2015 |
| CN | 104704980 | A | 6/2015 |
| CN | 204362599 | U | 6/2015 |
| CN | 303232131 | | 6/2015 |
| CN | 104737699 | A | 7/2015 |
| CN | 104750104 | A | 7/2015 |
| CN | 104782314 | A | 7/2015 |
| CN | 104793614 | A | 7/2015 |
| CN | 104793617 | A | 7/2015 |
| CN | 204443108 | U | 7/2015 |
| CN | 204462853 | U | 7/2015 |
| CN | 204495362 | U | 7/2015 |
| CN | 204515530 | U | 7/2015 |
| CN | 204539960 | U | 8/2015 |
| CN | 303318601 | | 8/2015 |
| CN | 104904403 | A | 9/2015 |
| CN | 104904404 | A | 9/2015 |
| CN | 204613789 | U | 9/2015 |
| CN | 204649212 | U | 9/2015 |
| CN | 303408640 | | 10/2015 |
| CN | 105082080 | A | 11/2015 |
| CN | 105096177 | A | 11/2015 |
| CN | 303452341 | | 11/2015 |
| CN | 303452355 | | 11/2015 |
| CN | 105163037 | A | 12/2015 |
| CN | 204810982 | U | 12/2015 |
| CN | 204858702 | U | 12/2015 |
| CN | 204925588 | U | 12/2015 |
| CN | 303478376 | | 12/2015 |
| CN | 303519781 | | 12/2015 |
| CN | 105230225 | A | 1/2016 |
| CN | 103621244 | B | 2/2016 |
| CN | 105353758 | A | 2/2016 |
| CN | 303579400 | | 2/2016 |
| CN | 105432212 | A | 3/2016 |
| CN | 105512689 | A | 4/2016 |
| CN | 303654613 | | 4/2016 |
| CN | 105557175 | A | 5/2016 |
| CN | 105573308 | A | 5/2016 |
| CN | 105573311 | A | 5/2016 |
| CN | 303670522 | | 5/2016 |
| CN | 105660039 | A | 6/2016 |
| CN | 105684630 | A | 6/2016 |
| CN | 105700521 | A | 6/2016 |
| CN | 205335882 | U | 6/2016 |
| CN | 205336853 | U | 6/2016 |
| CN | 303690781 | | 6/2016 |
| CN | 105759813 | A | 7/2016 |
| CN | 205431101 | U | 8/2016 |
| CN | 205489586 | U | 8/2016 |
| CN | 303778782 | | 8/2016 |
| CN | 303862286 | | 9/2016 |
| CN | 103283404 | B | 10/2016 |
| CN | 105988469 | A | 10/2016 |
| CN | 105988470 | A | 10/2016 |
| CN | 106020207 | A | 10/2016 |
| CN | 303888354 | | 10/2016 |
| CN | 303888360 | | 10/2016 |
| CN | 106142023 | A | 11/2016 |
| CN | 205694315 | U | 11/2016 |
| CN | 303933081 | | 11/2016 |
| CN | 103941600 | B | 12/2016 |
| CN | 106171248 | A | 12/2016 |
| CN | 205812811 | U | 12/2016 |
| CN | 205829192 | U | 12/2016 |
| CN | 205830138 | U | 12/2016 |
| CN | 303969591 | | 12/2016 |
| CN | 106258166 | A | 1/2017 |
| CN | 106325280 | A | 1/2017 |
| CN | 106355609 | A | 1/2017 |
| CN | 304004639 | | 1/2017 |
| CN | 106393094 | A | 2/2017 |
| CN | 106406301 | A | 2/2017 |
| CN | 304055132 | | 2/2017 |
| CN | 304055134 | | 2/2017 |
| CN | 304055136 | | 2/2017 |

(56) References Cited

FOREIGN PATENT DOCUMENTS

CN 106489412 A 3/2017
CN 205993268 U 3/2017
CN 103576681 B 4/2017
CN 206115269 U 4/2017
CN 304095129 4/2017
CN 106647727 A 5/2017
CN 106708033 A 5/2017
CN 206196372 U 5/2017
CN 304129527 5/2017
CN 304129534 5/2017
CN 106852225 A 6/2017
CN 106877420 A 6/2017
CN 206274765 U 6/2017
CN 206278169 U 6/2017
CN 304175254 6/2017
CN 304208974 7/2017
CN 107024910 A 8/2017
CN 304227934 8/2017
CN 304241160 8/2017
CN 206472500 U 9/2017
CN 304283754 9/2017
CN 206547328 U 10/2017
CN 206547363 U 10/2017
CN 206611777 U 11/2017
CN 206611791 U 11/2017
CN 206611812 U 11/2017
CN 206619022 U 11/2017
CN 107463166 A 12/2017
CN 107463168 A 12/2017
CN 107505939 A 12/2017
CN 107515603 A 12/2017
CN 107516226 A 12/2017
CN 107517642 A 12/2017
CN 206686605 U 12/2017
CN 206808075 U 12/2017
CN 107544483 A 1/2018
CN 107600209 A 1/2018
CN 107624368 A 1/2018
CN 207037461 U 2/2018
CN 107800200 A 3/2018
CN 207075257 U 3/2018
CN 304529661 3/2018
CN 304544247 3/2018
CN 107888751 A 4/2018
CN 107913034 A 4/2018
CN 107960191 A 4/2018
CN 207201326 U 4/2018
CN 304565875 4/2018
CN 108055906 A 5/2018
CN 108064539 A 5/2018
CN 108073179 A 5/2018
CN 108156957 A 6/2018
CN 108205313 A 6/2018
CN 207496811 U 6/2018
CN 108323326 A 7/2018
CN 108337987 A 7/2018
CN 108345297 A 7/2018
CN 108345298 A 7/2018
CN 207639110 U 7/2018
CN 207651536 U 7/2018
CN 207692389 U 8/2018
CN 304767946 8/2018
CN 304794944 8/2018
CN 207851614 U 9/2018
CN 304806495 9/2018
CN 304811825 9/2018
CN 108664014 A 10/2018
CN 108693873 A 10/2018
CN 207965652 U 10/2018
CN 108919814 A 11/2018
CN 208159284 U 11/2018
CN 108957512 A 12/2018
CN 109062225 A 12/2018
CN 109075284 A 12/2018
CN 208175354 U 12/2018
CN 208285831 U 12/2018
CN 304926953 12/2018
CN 304926955 12/2018
CN 109213123 A 1/2019
CN 208387297 U 1/2019
CN 304980236 1/2019
CN 305010344 1/2019
CN 305010365 1/2019
CN 305017366 1/2019
CN 105875063 B 2/2019
CN 208480301 U 2/2019
CN 208521989 U 2/2019
CN 305027640 2/2019
CN 109542092 A 3/2019
CN 208638993 U 3/2019
CN 109566065 A 4/2019
CN 109601114 A 4/2019
CN 109658937 A 4/2019
CN 109682368 A 4/2019
CN 109682371 A 4/2019
CN 109683604 A 4/2019
CN 109696888 A 4/2019
CN 208739598 U 4/2019
CN 208752461 U 4/2019
CN 109757189 A 5/2019
CN 106982585 B 6/2019
CN 109892096 A 6/2019
CN 209002355 U 6/2019
CN 209002393 U 6/2019
CN 305196413 6/2019
CN 305225230 6/2019
CN 305227797 6/2019
CN 305227798 6/2019
CN 305227800 6/2019
CN 305503785 6/2019
CN 109960253 A 7/2019
CN 109962512 A 7/2019
CN 109983907 A 7/2019
CN 109983908 A 7/2019
CN 110018686 A 7/2019
CN 209170907 U 7/2019
CN 305261165 7/2019
CN 305261166 7/2019
CN 305265564 7/2019
CN 209265268 U 8/2019
CN 209299766 U 8/2019
CN 106155056 B 9/2019
CN 110221594 A 9/2019
CN 110268858 A 9/2019
CN 209409782 U 9/2019
CN 305355791 9/2019
CN 305357008 9/2019
CN 110347144 A 10/2019
CN 110366368 A 10/2019
CN 305407445 10/2019
CN 110447372 A 11/2019
CN 209676901 U 11/2019
CN 305447400 11/2019
CN 305452583 11/2019
CN 110584551 A 12/2019
CN 110622680 A 12/2019
CN 209861609 U 12/2019
CN 305523640 12/2019
CN 209955654 U 1/2020
CN 209964645 U 1/2020
CN 305574602 1/2020
CN 110764495 A 2/2020
CN 110850858 A 2/2020
CN 110850860 A 2/2020
CN 110852133 A 2/2020
CN 210016305 U 2/2020
CN 210116329 U 2/2020
CN 305596393 2/2020
CN 105988472 B 3/2020
CN 107493797 B 3/2020
CN 110881903 A 3/2020
CN 110895411 A 3/2020
CN 110915409 A 3/2020
CN 110928280 A 3/2020

(56) References Cited

FOREIGN PATENT DOCUMENTS

| | | | |
|---|---|---|---|
| CN | 110928285 | A | 3/2020 |
| CN | 107643751 | B | 4/2020 |
| CN | 111034450 | A | 4/2020 |
| CN | 111045423 | A | 4/2020 |
| CN | 305716236 | | 4/2020 |
| CN | 107643750 | B | 5/2020 |
| CN | 108142070 | B | 5/2020 |
| CN | 111123910 | A | 5/2020 |
| CN | 111165158 | A | 5/2020 |
| CN | 210444878 | U | 5/2020 |
| CN | 210580043 | U | 5/2020 |
| CN | 305750432 | | 5/2020 |
| CN | 305757781 | | 5/2020 |
| CN | 305789888 | | 5/2020 |
| CN | 111226569 | A | 6/2020 |
| CN | 210782124 | U | 6/2020 |
| CN | 210808273 | U | 6/2020 |
| CN | 210821640 | U | 6/2020 |
| CN | 210839520 | U | 6/2020 |
| CN | 305827495 | | 6/2020 |
| CN | 305827496 | | 6/2020 |
| CN | 305827503 | | 6/2020 |
| CN | 305860595 | | 6/2020 |
| CN | 305860598 | | 6/2020 |
| CN | 305869411 | | 6/2020 |
| CN | 106717462 | B | 7/2020 |
| CN | 108811699 | B | 7/2020 |
| CN | 210900401 | U | 7/2020 |
| CN | 210987056 | U | 7/2020 |
| CN | 211015146 | U | 7/2020 |
| CN | 305946746 | | 7/2020 |
| CN | 305946760 | | 7/2020 |
| CN | 111487982 | A | 8/2020 |
| CN | 111512766 | A | 8/2020 |
| CN | 211212948 | U | 8/2020 |
| CN | 305989577 | | 8/2020 |
| CN | 306019404 | | 8/2020 |
| CN | 105988471 | B | 9/2020 |
| CN | 111685651 | A | 9/2020 |
| CN | 211531846 | U | 9/2020 |
| CN | 211580673 | U | 9/2020 |
| CN | 107637255 | B | 10/2020 |
| CN | 110754204 | B | 10/2020 |
| CN | 111742692 | A | 10/2020 |
| CN | 111766589 | A | 10/2020 |
| CN | 111819988 | A | 10/2020 |
| CN | 211721118 | U | 10/2020 |
| CN | 211721119 | U | 10/2020 |
| CN | 211741921 | U | 10/2020 |
| CN | 211741924 | U | 10/2020 |
| CN | 306085189 | | 10/2020 |
| CN | 306128197 | | 10/2020 |
| CN | 306140210 | | 10/2020 |
| CN | 306174630 | | 11/2020 |
| CN | 112009175 | A | 12/2020 |
| CN | 112119742 | A | 12/2020 |
| CN | 112120620 | A | 12/2020 |
| CN | 112134314 | A | 12/2020 |
| CN | 112147992 | A | 12/2020 |
| CN | 212061111 | U | 12/2020 |
| CN | 212116218 | U | 12/2020 |
| CN | 212116223 | U | 12/2020 |
| CN | 306223128 | | 12/2020 |
| CN | 306236075 | | 12/2020 |
| CN | 306236808 | | 12/2020 |
| CN | 112230636 | A | 1/2021 |
| CN | 112230637 | A | 1/2021 |
| CN | 112230644 | A | 1/2021 |
| CN | 112235760 | A | 1/2021 |
| CN | 112259866 | A | 1/2021 |
| CN | 112261631 | A | 1/2021 |
| CN | 212304892 | U | 1/2021 |
| CN | 212305863 | U | 1/2021 |
| CN | 306278588 | | 1/2021 |
| CN | 306303188 | | 1/2021 |
| CN | 106909140 | B | 2/2021 |
| CN | 109247117 | B | 2/2021 |
| CN | 109683556 | B | 2/2021 |
| CN | 112306049 | A | 2/2021 |
| CN | 112385401 | A | 2/2021 |
| CN | 112400453 | A | 2/2021 |
| CN | 212499740 | U | 2/2021 |
| CN | 212515710 | U | 2/2021 |
| CN | 212520009 | U | 2/2021 |
| CN | 212539202 | U | 2/2021 |
| CN | 212572469 | U | 2/2021 |
| CN | 212621511 | U | 2/2021 |
| CN | 306328112 | | 2/2021 |
| CN | 112435422 | A | 3/2021 |
| CN | 112438114 | A | 3/2021 |
| CN | 112445221 | A | 3/2021 |
| CN | 112449864 | A | 3/2021 |
| CN | 112492956 | A | 3/2021 |
| CN | 112514637 | A | 3/2021 |
| CN | 112567959 | A | 3/2021 |
| CN | 112567961 | A | 3/2021 |
| CN | 212696648 | U | 3/2021 |
| CN | 212696668 | U | 3/2021 |
| CN | 306358736 | | 3/2021 |
| CN | 112602441 | A | 4/2021 |
| CN | 112720451 | A | 4/2021 |
| CN | 112731935 | A | 4/2021 |
| CN | 212876733 | U | 4/2021 |
| CN | 212906002 | U | 4/2021 |
| CN | 212933333 | U | 4/2021 |
| CN | 212970834 | U | 4/2021 |
| CN | 213075541 | U | 4/2021 |
| CN | 213091901 | U | 4/2021 |
| CN | 112740889 | A | 5/2021 |
| CN | 112764419 | A | 5/2021 |
| CN | 112769424 | A | 5/2021 |
| CN | 112773264 | A | 5/2021 |
| CN | 112799395 | A | 5/2021 |
| CN | 112799399 | A | 5/2021 |
| CN | 112823584 | A | 5/2021 |
| CN | 112824993 | A | 5/2021 |
| CN | 112826376 | A | 5/2021 |
| CN | 112840828 | A | 5/2021 |
| CN | 112859828 | A | 5/2021 |
| CN | 213187216 | U | 5/2021 |
| CN | 213210764 | U | 5/2021 |
| CN | 213214364 | U | 5/2021 |
| CN | 213240579 | U | 5/2021 |
| CN | 306511371 | | 5/2021 |
| CN | 306530808 | | 5/2021 |
| CN | 306569554 | | 5/2021 |
| CN | 306569555 | | 5/2021 |
| CN | 306569560 | | 5/2021 |
| CN | 107976995 | B | 6/2021 |
| CN | 110122045 | B | 6/2021 |
| CN | 112947399 | A | 6/2021 |
| CN | 112970414 | A | 6/2021 |
| CN | 113039919 | A | 6/2021 |
| CN | 213306269 | U | 6/2021 |
| CN | 306604261 | | 6/2021 |
| CN | 113064419 | A | 7/2021 |
| CN | 113156928 | A | 7/2021 |
| CN | 113156929 | A | 7/2021 |
| CN | 213814000 | U | 7/2021 |
| CN | 306670241 | | 7/2021 |
| CN | 306680105 | | 7/2021 |
| CN | 306694791 | | 7/2021 |
| CN | 106300578 | B | 8/2021 |
| CN | 108781704 | B | 8/2021 |
| CN | 113311830 | A | 8/2021 |
| CN | 213850492 | U | 8/2021 |
| CN | 213921292 | U | 8/2021 |
| CN | 306745285 | | 8/2021 |
| CN | 306753239 | | 8/2021 |
| CN | 306768440 | | 8/2021 |
| CN | 113366964 | A | 9/2021 |
| CN | 113439526 | A | 9/2021 |
| CN | 113448259 | A | 9/2021 |
| CN | 214126036 | U | 9/2021 |

(56) References Cited

FOREIGN PATENT DOCUMENTS

| | | | | |
|---|---|---|---|---|
| CN | 214151499 | U | 9/2021 | |
| CN | 214178073 | U | 9/2021 | |
| CN | 214240309 | U | 9/2021 | |
| CN | 306824139 | | 9/2021 | |
| CN | 306839148 | | 9/2021 | |
| CN | 306846782 | | 9/2021 | |
| CN | 113455167 | A | 10/2021 | |
| CN | 113552873 | A | 10/2021 | |
| CN | 113552874 | A | 10/2021 | |
| CN | 214508006 | U | 10/2021 | |
| CN | 306880401 | | 10/2021 | |
| CN | 113721749 | A | 11/2021 | |
| CN | 214852822 | U | 11/2021 | |
| CN | 113759377 | A | 12/2021 | |
| CN | 113759886 | A | 12/2021 | |
| CN | 113771556 | A | 12/2021 | |
| CN | 113778084 | A | 12/2021 | |
| CN | 113805573 | A | 12/2021 | |
| CN | 113812251 | A | 12/2021 | |
| CN | 215011658 | U | 12/2021 | |
| CN | 215041875 | U | 12/2021 | |
| CN | 215073955 | U | 12/2021 | |
| CN | 215122126 | U | 12/2021 | |
| CN | 215223139 | U | 12/2021 | |
| CN | 215223140 | U | 12/2021 | |
| CN | 215244172 | U | 12/2021 | |
| CN | 215269503 | U | 12/2021 | |
| CN | 215321765 | U | 12/2021 | |
| CN | 307001745 | | 12/2021 | |
| CN | 307035324 | | 12/2021 | |
| CN | 113892332 | A | 1/2022 | |
| CN | 113970918 | A | 1/2022 | |
| CN | 307047963 | | 1/2022 | |
| CN | 307047966 | | 1/2022 | |
| CN | 114089423 | A | 2/2022 | |
| CN | 215774282 | U | 2/2022 | |
| CN | 215813854 | U | 2/2022 | |
| CN | 215911524 | U | 2/2022 | |
| CN | 307125064 | | 2/2022 | |
| CN | 114097400 | A | 3/2022 | |
| CN | 307168522 | | 3/2022 | |
| CN | 307168531 | | 3/2022 | |
| CN | 307168534 | | 3/2022 | |
| CN | 307168536 | | 3/2022 | |
| CN | 307202311 | | 3/2022 | |
| CN | 216153511 | U | 4/2022 | |
| CN | 216253986 | U | 4/2022 | |
| CN | 307222105 | | 4/2022 | |
| CN | 307243485 | | 4/2022 | |
| CN | 307265564 | | 4/2022 | |
| CN | 307265565 | | 4/2022 | |
| CN | 307278021 | | 4/2022 | |
| CN | 307278029 | | 4/2022 | |
| CN | 307301254 | | 4/2022 | |
| CN | 216507708 | U | 5/2022 | |
| CN | 216610752 | U | 5/2022 | |
| CN | 307325242 | | 5/2022 | |
| CN | 307337031 | | 5/2022 | |
| CN | 307347754 | | 5/2022 | |
| CN | 307347757 | | 5/2022 | |
| CN | 307369096 | | 5/2022 | |
| CN | 307369129 | | 5/2022 | |
| CN | 307376792 | | 5/2022 | |
| CN | 115666221 | A | 1/2023 | |
| DE | 7345220 | U | 6/1974 | |
| DE | 7345211 | U | 11/1974 | |
| DE | 2437756 | A1 | 3/1975 | |
| DE | 2448130 | A1 | 4/1976 | |
| DE | 7609000 | U1 | 9/1977 | |
| DE | 2612381 | A1 | 10/1977 | |
| DE | 19521067 | A1 | 12/1996 | |
| DE | 19644057 | A1 | 5/1998 | |
| DE | 29823263 | U1 | 4/1999 | |
| DE | 19933340 | A1 | 1/2001 | |
| DE | 20308046 | U1 | 7/2003 | |
| DE | 10302908 | A1 | 8/2004 | |
| DE | 102006038553 | A1 | 2/2008 | |
| DE | 102007053310 | A1 | 6/2009 | |
| DE | 102007060056 | A1 | 6/2009 | |
| DE | 102008011947 | A1 | 9/2009 | |
| DE | 202010007832 | U1 | 8/2010 | |
| DE | 402010004757-0001 | | 12/2010 | |
| DE | 102009027557 | A1 | 1/2011 | |
| DE | 202012011298 | U1 | 1/2013 | |
| DE | 202012009375 | U1 | 4/2013 | |
| DE | 102013202075 | A1 | 8/2014 | |
| DE | 102013203549 | A1 | 9/2014 | |
| DE | 102013203705 | A1 | 9/2014 | |
| DE | 202014005547 | U1 | 9/2014 | |
| DE | 202014102390 | U1 | 9/2014 | |
| DE | 102014211712 | A1 | 2/2015 | |
| DE | 102014112587 | A1 | 3/2015 | |
| DE | 102014208434 | A1 | 11/2015 | |
| DE | 102014210277 | A1 | 12/2015 | |
| DE | 102014212399 | A1 | 12/2015 | |
| DE | 102016205336 | A1 | 10/2017 | |
| DE | 102016219270 | A1 | 4/2018 | |
| DE | 102016222659 | A1 | 5/2018 | |
| DE | 202018100833 | U1 | 5/2018 | |
| DE | 202018100835 | U1 | 5/2018 | |
| DE | 202018100836 | U1 | 5/2018 | |
| DE | 102017204865 | A1 | 9/2018 | |
| DE | 102018206803 | A1 | 11/2019 | |
| DE | 202015009764 | U1 | 1/2020 | |
| DE | 102019206856 | A1 | 11/2020 | |
| DE | 102019214995 | A1 | 4/2021 | |
| DE | 102019215913 | A1 | 4/2021 | |
| DE | 102019220328 | A1 | 6/2021 | |
| DE | 102021100122 | A1 | 7/2021 | |
| DE | 102020202740 | A1 | 9/2021 | |
| EP | 1364571 | A2 | 11/2003 | |
| EP | 1709859 | A1 | 10/2006 | |
| EP | 1558069 | B1 | 12/2006 | |
| EP | 2006708 | A1 | 12/2008 | |
| EP | 2026161 | A1 | 2/2009 | |
| EP | 2163352 | A2 | 3/2010 | |
| EP | 2248409 | A1 | 11/2010 | |
| EP | 2269433 | A1 | 1/2011 | |
| EP | 2286653 | A2 | 2/2011 | |
| EP | 2296072 | A2 | 3/2011 | |
| EP | 2425700 | A2 | 3/2012 | |
| EP | 2586283 | A1 | 5/2013 | |
| EP | 2687077 | A2 | 1/2014 | |
| EP | 2693072 | A1 | 2/2014 | |
| EP | 2719548 | A1 * | 4/2014 | ............. A01D 34/82 |
| EP | 2798937 | A1 | 11/2014 | |
| EP | 2823936 | A2 | 1/2015 | |
| EP | 2851760 | A1 | 3/2015 | |
| EP | 2875712 | A1 | 5/2015 | |
| EP | 2717110 | B1 | 8/2015 | |
| EP | 2959764 | A1 | 12/2015 | |
| EP | 2960741 | A2 | 12/2015 | |
| EP | 2960742 | A1 | 12/2015 | |
| EP | 2783561 | B1 | 3/2016 | |
| EP | 2692220 | B1 | 4/2016 | |
| EP | 3047719 | A1 | 7/2016 | |
| EP | 3118016 | A1 | 1/2017 | |
| EP | 3165075 | A1 | 5/2017 | |
| EP | 3167699 | A1 | 5/2017 | |
| EP | 3167700 | A1 | 5/2017 | |
| EP | 3222132 | A2 | 9/2017 | |
| EP | 2883437 | B1 | 3/2018 | |
| EP | 3316067 | A1 | 5/2018 | |
| EP | 2743789 | B1 | 6/2018 | |
| EP | 3330824 | A1 | 6/2018 | |
| EP | 3366102 | A1 | 8/2018 | |
| EP | 3381258 | A1 | 10/2018 | |
| EP | 3384752 | A1 * | 10/2018 | ......... A01D 34/4166 |
| EP | 3479682 | A1 | 5/2019 | |
| EP | 2960100 | B1 | 8/2019 | |
| EP | 3520593 | A1 | 8/2019 | |
| EP | 3528213 | A1 | 8/2019 | |
| EP | 3534183 | A1 | 9/2019 | |
| EP | 3597090 | A1 | 1/2020 | |

(56) References Cited

FOREIGN PATENT DOCUMENTS

| | | | |
|---|---|---|---|
| EP | 3660618 | A1 | 6/2020 |
| EP | 3725146 | A1 | 10/2020 |
| EP | 3753387 | A1 | 12/2020 |
| EP | 3791708 | A1 | 3/2021 |
| EP | 3831544 | A1 | 6/2021 |
| EP | 3837944 | A1 | 6/2021 |
| EP | 3837945 | A1 | 6/2021 |
| EP | 3837946 | A1 | 6/2021 |
| EP | 3861911 | A2 | 8/2021 |
| ES | 199267 | U | 7/1975 |
| ES | 451339 | A1 | 12/1977 |
| FR | 2771141 | A1 | 5/1999 |
| FR | 3114537 | A1 | 4/2022 |
| GB | 1288108 | A | 3/1971 |
| GB | 1371959 | A | 10/1974 |
| GB | 1451896 | A | 10/1976 |
| GB | 1452308 | A | 10/1976 |
| GB | 1489373 | A | 10/1977 |
| GB | 1526519 | A | 9/1978 |
| GB | 1557379 | A | 12/1979 |
| GB | 2287170 | A | 9/1995 |
| GB | 2295304 | A | 5/1996 |
| GB | 2305840 | A | 4/1997 |
| GB | 2419430 | A | 4/2006 |
| GB | 2432922 | A | 6/2007 |
| GB | 2433791 | A | 7/2007 |
| GB | 90017056580001 | | 5/2010 |
| GB | 2500168 | A | 9/2013 |
| GB | 90024715400001 | | 8/2014 |
| GB | 2513960 | A | 11/2014 |
| GB | 2515556 | A | 12/2014 |
| GB | 2516370 | A | 1/2015 |
| GB | 90027012680001 | | 5/2015 |
| GB | 90027378900001 | | 10/2015 |
| GB | 90041329260001 | | 9/2017 |
| GB | 90029638920001 | | 3/2018 |
| GB | 90056318840001 | | 9/2018 |
| GB | 2563347 | A | 12/2018 |
| GB | 90040756950001 | | 6/2019 |
| GB | 90073918420006 | | 1/2020 |
| GB | 90080413210001 | | 8/2020 |
| GB | 2581956 | A | 9/2020 |
| GB | 90081876860001 | | 10/2020 |
| GB | 6195686 | | 5/2022 |
| IT | 201800007966 | A1 | 2/2020 |
| JP | 2006251883 | A | 9/2006 |
| JP | 2006268497 | A | 10/2006 |
| JP | 2011020615 | A | 2/2011 |
| JP | 2015149963 | A | 8/2015 |
| KR | 20100119313 | A | 11/2010 |
| KR | 20130044130 | A | 5/2013 |
| KR | 20150125305 | A | 11/2015 |
| SE | 538774 | C2 | 11/2016 |
| SE | 540834 | C2 | 11/2018 |
| SE | 542098 | C2 | 2/2020 |
| SE | 543019 | C2 | 9/2020 |
| SE | 543247 | C2 | 10/2020 |
| SE | 2150377 | A1 | 3/2021 |
| SE | 1951390 | A1 | 6/2021 |
| SE | 2150080 | A1 | 6/2021 |
| SE | 2050216 | A1 | 8/2021 |
| SE | 543941 | C2 | 9/2021 |
| SE | 543943 | C2 | 9/2021 |
| SE | 2150193 | A1 | 10/2021 |
| SE | 2150394 | A1 | 10/2021 |
| WO | WO9106435 | A1 | 5/1991 |
| WO | WO9749528 | A1 | 12/1997 |
| WO | WO0060921 | A1 | 10/2000 |
| WO | WO0074466 | A1 | 12/2000 |
| WO | WO03040846 | A1 | 5/2003 |
| WO | WO03103375 | A1 | 12/2003 |
| WO | WO2005002320 | A1 | 1/2005 |
| WO | WO2006094887 | A2 | 9/2006 |
| WO | WO2006094889 | A1 | 9/2006 |
| WO | WO2006102740 | A1 | 10/2006 |
| WO | WO2007091967 | A1 | 8/2007 |
| WO | WO2007140930 | A1 | 12/2007 |
| WO | WO2008015479 | A2 | 2/2008 |
| WO | WO2008060689 | A2 | 5/2008 |
| WO | WO2008068494 | A1 | 6/2008 |
| WO | WO2008095715 | A2 | 8/2008 |
| WO | WO2008144135 | A1 | 11/2008 |
| WO | WO2009036644 | A1 | 3/2009 |
| WO | WO2009071379 | A1 | 6/2009 |
| WO | WO2009077239 | A1 | 6/2009 |
| WO | WO2009083319 | A1 | 7/2009 |
| WO | WO2010077198 | A1 | 7/2010 |
| WO | WO2010130479 | A2 | 11/2010 |
| WO | WO2011115536 | A1 | 9/2011 |
| WO | WO2012047176 | A1 | 4/2012 |
| WO | WO2013010475 | A1 | 1/2013 |
| WO | WO2013011252 | A1 | 1/2013 |
| WO | WO2013025135 | A1 | 2/2013 |
| WO | WO2013064301 | A1 | 5/2013 |
| WO | WO2013081516 | A1 | 6/2013 |
| WO | WO2013083311 | A1 | 6/2013 |
| WO | WO2013102417 | A1 | 7/2013 |
| WO | WO2013107266 | A1 | 7/2013 |
| WO | WO2013107374 | A1 | 7/2013 |
| WO | WO2013125992 | A1 | 8/2013 |
| WO | WO2013185622 | A1 | 12/2013 |
| WO | WO2014007694 | A1 | 1/2014 |
| WO | WO2014056443 | A1 | 4/2014 |
| WO | WO2014071860 | A1 | 5/2014 |
| WO | WO2014079363 | A1 | 5/2014 |
| WO | WO2014079632 | A1 | 5/2014 |
| WO | WO2014086267 | A1 | 6/2014 |
| WO | WO2014173290 | A1 | 10/2014 |
| WO | WO2015010277 | A1 | 1/2015 |
| WO | WO2015053488 | A1 | 4/2015 |
| WO | WO2015144998 | A1 | 10/2015 |
| WO | WO2015154822 | A1 | 10/2015 |
| WO | WO2015161829 | A1 | 10/2015 |
| WO | WO2015169343 | A1 | 11/2015 |
| WO | WO2015172831 | A1 | 11/2015 |
| WO | WO2015182514 | A1 | 12/2015 |
| WO | WO2015192903 | A1 | 12/2015 |
| WO | WO2016038512 | A1 | 3/2016 |
| WO | WO2016097891 | A1 | 6/2016 |
| WO | WO2016097892 | A1 | 6/2016 |
| WO | WO2016097897 | A1 | 6/2016 |
| WO | WO2016103070 | A1 | 6/2016 |
| WO | WO2016108104 | A1 | 7/2016 |
| WO | WO2016109721 | A1 | 7/2016 |
| WO | WO2016119751 | A1 | 8/2016 |
| WO | WO2016127923 | A1 | 8/2016 |
| WO | WO2016131399 | A1 | 8/2016 |
| WO | WO2016184398 | A1 | 11/2016 |
| WO | WO2017101882 | A1 | 6/2017 |
| WO | WO2017123137 | A1 | 7/2017 |
| WO | WO2017129551 | A1 | 8/2017 |
| WO | WO2017133625 | A1 | 8/2017 |
| WO | WO2017148438 | A1 | 9/2017 |
| WO | WO2017167207 | A1 | 10/2017 |
| WO | WO2017181995 | A1 | 10/2017 |
| WO | WO2017186372 | A1 | 11/2017 |
| WO | WO2017190784 | A1 | 11/2017 |
| WO | WO2017198222 | A1 | 11/2017 |
| WO | WO2017206950 | A1 | 12/2017 |
| WO | WO2017211308 | A1 | 12/2017 |
| WO | WO2018001340 | A1 | 1/2018 |
| WO | WO2018010650 | A1 | 1/2018 |
| WO | WO2018028624 | A1 | 2/2018 |
| WO | WO2018057250 | A1 | 3/2018 |
| WO | WO2018057452 | A2 | 3/2018 |
| WO | WO2018057589 | A1 | 3/2018 |
| WO | WO2018059323 | A1 | 4/2018 |
| WO | WO2018103178 | A1 | 6/2018 |
| WO | WO2018117190 | A1 | 6/2018 |
| WO | WO2018125222 | A1 | 7/2018 |
| WO | WO2018127209 | A1 | 7/2018 |
| WO | WO2018146518 | A1 | 8/2018 |
| WO | WO2018153599 | A1 | 8/2018 |
| WO | WO2018174777 | A1 | 9/2018 |

(56) References Cited

FOREIGN PATENT DOCUMENTS

| | | |
|---|---|---|
| WO | WO2018185376 A1 | 10/2018 |
| WO | WO2018199829 A1 | 11/2018 |
| WO | WO2019034382 A1 | 2/2019 |
| WO | WO2019063012 A1 | 4/2019 |
| WO | WO2019080935 A1 | 5/2019 |
| WO | WO2019096052 A1 | 5/2019 |
| WO | WO2019096463 A1 | 5/2019 |
| WO | WO2019109982 A1 | 6/2019 |
| WO | WO2019110013 A1 | 6/2019 |
| WO | WO2019144916 A1 | 8/2019 |
| WO | WO2019157841 A1 | 8/2019 |
| WO | WO2019158090 A1 | 8/2019 |
| WO | WO2019158452 A1 | 8/2019 |
| WO | WO2019168069 A1 | 9/2019 |
| WO | WO2019170142 A1 | 9/2019 |
| WO | WO2019206274 A1 | 10/2019 |
| WO | WO2019238099 A1 | 12/2019 |
| WO | WO2020020652 A1 | 1/2020 |
| WO | WO2020063811 A1 | 4/2020 |
| WO | WO2020064087 A1 | 4/2020 |
| WO | WO2020093970 A1 | 5/2020 |
| WO | WO2020093992 A1 | 5/2020 |
| WO | WO2020098666 A1 | 5/2020 |
| WO | WO2020098670 A1 | 5/2020 |
| WO | WO2020103696 A1 | 5/2020 |
| WO | WO2020104242 A1 | 5/2020 |
| WO | WO2020107007 A1 | 5/2020 |
| WO | WO2020107772 A1 | 6/2020 |
| WO | WO2020108267 A1 | 6/2020 |
| WO | WO2020108550 A1 | 6/2020 |
| WO | WO2020114415 A1 | 6/2020 |
| WO | WO2020125450 A1 | 6/2020 |
| WO | WO2020134667 A1 | 7/2020 |
| WO | WO2020148138 A1 | 7/2020 |
| WO | WO2020155853 A1 | 8/2020 |
| WO | WO2020156519 A1 | 8/2020 |
| WO | WO2020156684 A1 | 8/2020 |
| WO | WO2020156851 A1 | 8/2020 |
| WO | WO2020161021 A1 | 8/2020 |
| WO | WO2020170933 A1 | 8/2020 |
| WO | WO2020193513 A1 | 10/2020 |
| WO | WO2020199055 A1 | 10/2020 |
| WO | WO2020218960 A1 | 10/2020 |
| WO | DM212022 | 12/2020 |
| WO | WO2020256619 A1 | 12/2020 |
| WO | WO2020259586 A1 | 12/2020 |
| WO | WO2021013173 A1 | 1/2021 |
| WO | WO2021023227 A1 | 2/2021 |
| WO | WO2021031418 A1 | 2/2021 |
| WO | WO2021031423 A1 | 2/2021 |
| WO | WO2021031451 A1 | 2/2021 |
| WO | WO2021036033 A1 | 3/2021 |
| WO | WO2021036077 A1 | 3/2021 |
| WO | WO2021047063 A1 | 3/2021 |
| WO | WO2021047068 A1 | 3/2021 |
| WO | WO2021047602 A1 | 3/2021 |
| WO | WO2021068370 A1 | 4/2021 |
| WO | WO2021068928 A1 | 4/2021 |
| WO | WO2021078220 A1 | 4/2021 |
| WO | WO2021082817 A1 | 5/2021 |
| WO | WO2021088551 A1 | 5/2021 |
| WO | WO2021088553 A1 | 5/2021 |
| WO | WO2021088558 A1 | 5/2021 |
| WO | WO2021093474 A1 | 5/2021 |
| WO | WO2021093526 A1 | 5/2021 |
| WO | WO2021093851 A1 | 5/2021 |
| WO | WO2021098382 A1 | 5/2021 |
| WO | WO2021103803 A1 | 6/2021 |
| WO | WO2021103804 A1 | 6/2021 |
| WO | WO2021110414 A1 | 6/2021 |
| WO | WO2021114988 A1 | 6/2021 |
| WO | WO2021115364 A1 | 6/2021 |
| WO | WO2021136234 A1 | 7/2021 |
| WO | WO2021139389 A1 | 7/2021 |
| WO | WO2021139683 A1 | 7/2021 |
| WO | WO2021139685 A1 | 7/2021 |
| WO | WO2021139809 A1 | 7/2021 |
| WO | WO2021147494 A1 | 7/2021 |
| WO | WO2021147792 A1 | 7/2021 |
| WO | WO2021164738 A1 | 8/2021 |
| WO | WO2021175331 A1 | 9/2021 |
| WO | WO2021180123 A1 | 9/2021 |
| WO | WO2021190627 A1 | 9/2021 |
| WO | DM217452 | 10/2021 |
| WO | WO2021208308 A1 | 10/2021 |
| WO | WO2021215980 A1 | 10/2021 |
| WO | WO2021225494 A1 | 11/2021 |
| WO | WO2021230791 A1 | 11/2021 |
| WO | WO2021233205 A1 | 11/2021 |
| WO | WO2022042362 A1 | 3/2022 |

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Matt et al. (withdrawn)
JP 2023525501 (Year: 2021).*
CN 206978043 (Year: 2018).*
Extended European Search Report for Application No. 23159876.4 dated Jul. 20, 2023 (7 pages).
Chinese Patent Office Action for Application No. 202310215611.7 dated Mar. 31, 2026 (17 pages including English translation).

* cited by examiner 420
394
356
362
380
346
354
390b
368
342
344a 394
356
368
380
346
354
390b
362
344a 358
394
356
368
380
346
362
354
390b 420
356
362
346
354
390b
368
344a

ROBOTIC GARDEN TOOL WITH QUICK CHANGE MECHANISM

CROSS-REFERENCE TO RELATED APPLICATIONS

This application claims priority to co-pending U.S. Provisional Patent Application No. 63/316,866, filed on Mar. 4, 2022, and to co-pending U.S. Provisional Patent Application No. 63/316,870, filed on Mar. 4, 2022, the entire contents of all of which are incorporated herein by reference.

BACKGROUND

The present disclosure relates to a garden tool, such as a robotic lawn mower having a removable blade.

SUMMARY

In one aspect, the disclosure provides a garden tool. The garden tool includes a drive shaft, a driven implement, and a locking cap configured to removably secure the drive shaft and the driven implement relative to each other. The locking cap is self-locking to inhibit loosening.

Alternatively or additionally, in any combination, the locking cap may be configured to rotate in a first direction to secure the drive shaft to the driven implement, and rotate in a second direction, opposite the first direction, to simultaneously 1) unlock the locking cap and 2) release the driven implement from the drive shaft; the locking cap may be self-locking by way of a ratchet mechanism; the ratchet mechanism may include a ratchet wheel, a pawl pivotable between a first pawl position and a second pawl position, and a slider slideable between a first slider position and a second slider position, wherein the slider is configured to unlock the pawl in the second slider position; the locking cap may include an actuator having a grip configured to provide actuating leverage, wherein the actuator is operably coupleable to the slider to move the slider towards the second slider position; the locking cap may be configured to thread onto the drive shaft by actuation in a first direction to secure the driven implement to the drive shaft, to thread off the drive shaft by actuation in a second direction opposite the first direction to allow removal of the driven implement from the drive shaft, wherein the locking cap is self-locking to inhibit rotation of the locking cap in the second direction when the locking cap is not being actuated, and wherein the locking cap is unlocked by actuation in the second direction; the locking cap may be configured to rotate relative to the drive shaft by actuation in a first direction to secure the driven implement to the drive shaft, to rotate relative to the drive shaft by actuation in a second direction opposite the first direction to allow removal of the driven implement from the drive shaft, wherein the locking cap is self-locking to inhibit rotation of the locking cap in the second direction when the locking cap is not being actuated, and wherein the locking cap is unlocked by actuation in the second direction; the drive shaft may include a drive shaft and the driven implement may include a blade module.

In another aspect, the disclosure provides a lawn mower. The lawn mower includes a deck, a blade module, a motor having a drive shaft configured to drive the blade module, and a locking cap configured to removably secure the blade module to the drive shaft. The locking cap is self-locking to inhibit loosening.

Alternatively or additionally, in any combination, the locking cap may be configured to rotate in a first direction to secure the blade module to the drive shaft, and rotate in a second direction, opposite the first direction, to simultaneously 1) unlock the locking cap and 2) release the blade module from the drive shaft; the locking cap may be self-locking by way of a ratchet mechanism; the ratchet mechanism may include a ratchet wheel, a pawl pivotable between a first pawl position and a second pawl position, and a slider slideable between a first slider position and a second slider position, wherein the slider is configured to unlock the pawl in the second slider position; the locking cap may include an actuator having a grip configured to provide actuating leverage, wherein the actuator is operably coupled to the slider to move the slider towards the second slider position; the locking cap may be configured to thread onto the drive shaft by actuation in a first direction to secure the blade module to the drive shaft, to thread off the drive shaft by actuation in a second direction opposite the first direction to allow removal of the blade module from the drive shaft, wherein the locking cap is self-locking to inhibit rotation of the locking cap in the second direction when the locking cap is not being actuated, and wherein the locking cap is unlocked by actuation in the second direction; the locking cap may be configured to rotate relative to the drive shaft by actuation in a first direction to secure the blade module to the drive shaft, to rotate relative to the drive shaft by actuation in a second direction opposite the first direction to allow removal of the blade module from the drive shaft, wherein the locking cap is self-locking to inhibit rotation of the locking cap in the second direction when the locking cap is not being actuated, and wherein the locking cap is unlocked by actuation in the second direction.

In yet another aspect, the disclosure provides a self-locking cap for a garden tool. The self-locking cap includes an actuator having a grip configured to provide actuating leverage, a carrier, a pawl pivotable with respect to the carrier between a locked pawl position and an unlocked pawl position, and a slider slideable relative to the carrier between a first slider position and a second slider position. The slider is configured to move the pawl to the unlocked pawl position in the second slider position.

Alternatively or additionally, in any combination, the slider may include a slider aperture, wherein the actuator includes a slide projection, and wherein the slide projection is receivable in the slider aperture; the self-locking cap may further include a first biasing member configured to bias the pawl towards the locked pawl position and a second biasing member configured to bias the slider towards the first slider position; the slider may be biased to the first slider position, wherein the actuator is rotatable about a rotation axis in a first direction and a second direction opposite the first direction, wherein actuation of the actuator in the first direction does not act against the bias of the slider, and wherein actuation of the actuator in the second direction acts against the bias of the slider to move the slider to the second slider position; the actuator may be rotatable about a rotation axis, wherein in the locked pawl position the pawl extends radially further inwards towards the rotation axis than in the unlocked pawl position.

In still another aspect, the disclosure provides a garden tool. The garden tool includes a blade holder and a blade removably coupled to the blade holder by way of a blade attachment mechanism. The blade attachment mechanism includes a spring movable between a first position in which the spring is configured to retain the blade and a second position in which the spring is configured to release the blade. The blade attachment mechanism also includes a seat and a shoulder configured to engage the seat. The seat and the shoulder, when engaged, are configured to provide a gap between the spring and the blade holder in which the blade can freely rotate about an axis.

Alternatively or additionally, in any combination, the blade attachment mechanism may include an actuation aperture disposed in the blade holder configured to allow a user to engage the spring through the blade holder; the blade attachment mechanism may include at least one alignment aperture configured to allow a user to see the blade through the blade holder; the blade attachment mechanism may include a spring catch configured to retain the spring with respect to the blade holder; a pin may define a blade axis about which the blade is configured to be freely rotatable; the blade holder may be rotatable about an axis of rotation; the blade axis may be transverse to the axis of rotation; an angle between the axis of rotation and the blade axis may be about 5 degrees.

Other aspects of the invention will become apparent by consideration of the detailed description and accompanying drawings.

DETAILED DESCRIPTION

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways. Also, it is to be understood that the phraseology and terminology used herein are for the purpose of description and should not be regarded as limiting. The terms “approximately”, “about”, “generally”, “substantially”, and the like should be understood to mean within standard tolerances, as would be understood by one of ordinary skill in the art.

Figure 1:
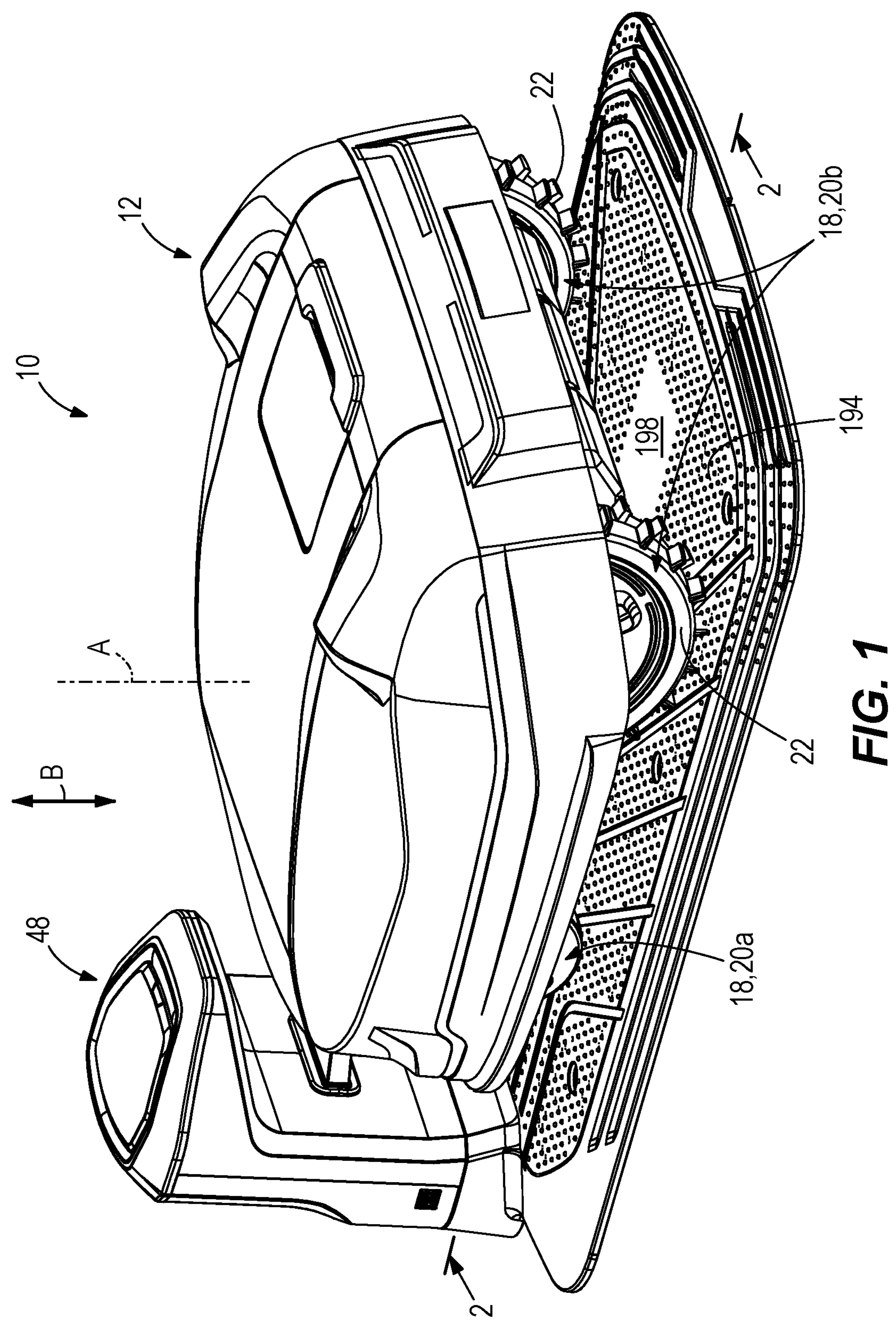
FIG. 1 is a top perspective view of a garden tool, such as an autonomous lawn mower, embodying the disclosure.
Figure 2:
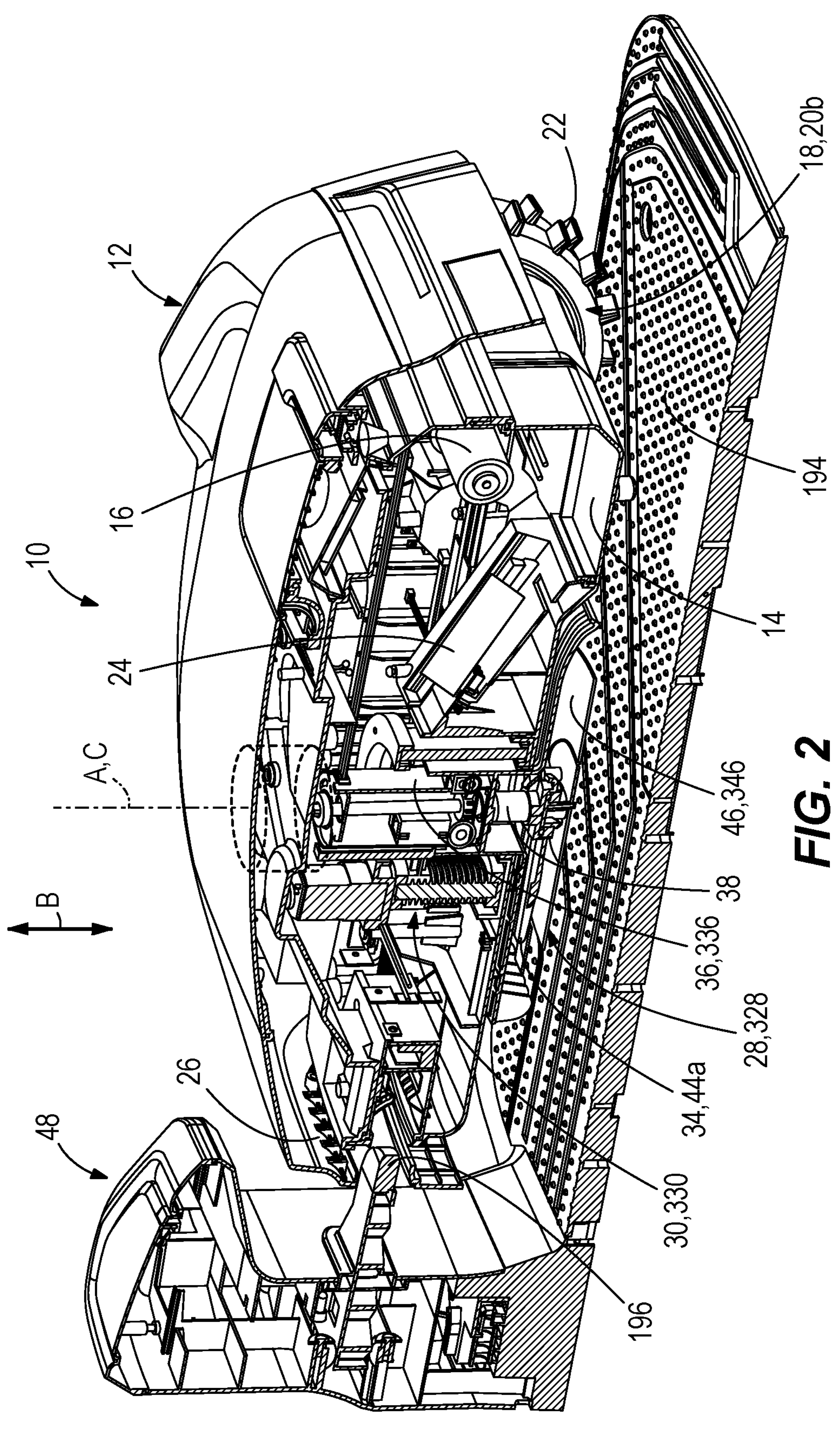
FIG. 2 is a cross-sectional view of the lawn mower of FIG. 1 taken through line 2-2 in FIG. 1.

FIGS. 1-2 illustrate a garden tool system 10. For example, the garden tool system 10 may include a garden tool 12, such as a lawn mower 12 (as shown), or in other implementations may include a tool for sweeping debris, vacuuming debris, clearing debris, collecting debris, moving debris, etc. Debris may include plants (such as grass, leaves, flowers, stems, weeds, twigs, branches, etc., and clippings thereof), dust, dirt, jobsite debris, snow, and/or the like. For example, other implementations of the garden tool 12 may include a vacuum cleaner, a trimmer, a string trimmer, a brush cutter, a hedge trimmer, a sweeper, a cutter, a plow, a debris blower, a snow blower, etc. In the illustrated implementation, the garden tool system 10 includes the lawn mower 12 and a charging station 48. The garden tool 12 may be autonomous, semi-autonomous, or not autonomous.

Figure 3:
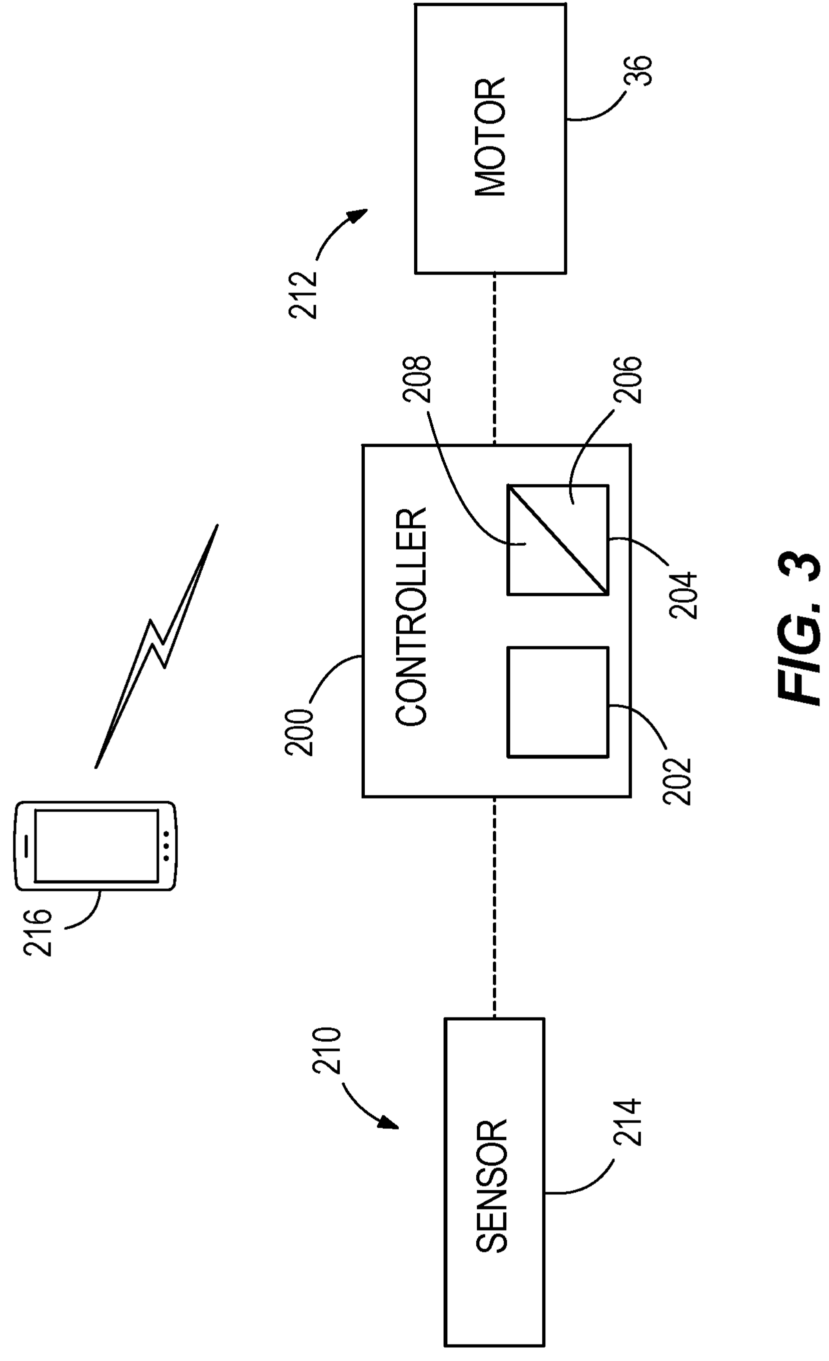
FIG. 3 is a schematic diagram illustrating a control system for the lawn mower of FIG. 1.

For example, as illustrated in FIG. 3, the lawn mower 12 may include a controller 200 having a programmable processor 202 (e.g., a microprocessor, a microcontroller, or another suitable programmable device), a memory 204, and a human-machine interface 216 (which may include a mobile device). The memory 204 may include, for example, a program storage area 206 and a data storage area 208. The program storage area 206 and the data storage area 208 can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, electronic memory devices, or other data structures. The controller 200 may also, or alternatively, include integrated circuits and/or analog devices, e.g., transistors, comparators, operational amplifiers, etc., to execute the logic and control signals described herein. The controller 200 includes a plurality of inputs 210 and outputs 212 to and from various components of the lawn mower 12. The controller 200 is configured to provide control signals to the outputs 212 and to receive data and/or signals (e.g., sensor data, user input signals, etc.) from the inputs 210. The inputs 210 and outputs 212 are in communication with the controller 200, e.g., by way of hard-wired and/or wireless communications such as by satellite, internet, mobile telecommunications technology, a frequency, a wavelength, Bluetooth®, or the like. The controller 200 may include a navigation system, which may include one or more of a global positioning system (GPS), beacons, sensors such as image sensors, ultrasonic sensors, wire sensors, and an algorithm for navigating an area to be mowed. However, in other implementations, the lawn mower 12 may be non-autonomous.

With reference to FIG. 2, the lawn mower 12 includes a deck 14 for supporting various components of the lawn mower 12, as will be described in greater detail below. The lawn mower 12 includes at least one prime mover 16 for providing tractive effort to move the lawn mower 12 across a support surface, such as the charging station 48 or a lawn to be mowed. The at least one prime mover 16 may be supported by the deck 14. For example, the at least one prime mover 16 may include one or more electric motors 16 in the illustrated implementation. However, in other implementations the prime mover 16 may include another type of motor, a gasoline engine, or the like, in any suitable quantity and combination.

The lawn mower 12 also includes a plurality of wheels 18 (FIG. 1), which may be supported by the deck (FIG. 2), for converting the tractive effort into motion of the lawn mower 12 on the support surface. Each of the plurality of wheels 18 supports a tire 22 in the illustrated implementation. However, the plurality of wheels 18 may support any combination of one or more of tires, continuous tracks, or the like in other implementations. The plurality of wheels 18 includes two front wheels 20*a* and two rear wheels 20*b*, but other quantities of wheels may be employed in other implementations. In the illustrated implementation, each of the two rear wheels 20*b* is operatively coupled to its own prime mover 16 (such as two electric motors, one for each respective rear wheel 20*b*) to apply torque thereto, and the two front wheels 20*a* are not driven. However, other torque-transmission arrangements can be used in other implementations with any quantity and combination of driven and non-driven wheels, any number of wheels being driven by a single prime mover, and any number of prime movers.

The lawn mower 12 includes a power source 24 (FIG. 2), such as a battery, for powering the at least one prime mover 16 such that the lawn mower 12 can perform a lawn mowing operation in a cordless fashion. The power source 24 may include one or more lithium-ion battery cells, and/or other battery chemistries. The power source 24 may be removable from the lawn mower 12. In other implementations, the at least one prime mover 16 may be powered by other power sources, such as solar panels, fuel cells, compressed fluid, fuel, or the like. The lawn mower 12 includes a battery charging contact 26 for receiving a charge from an external power source (not shown) for charging the power source 24.

With reference to FIGS. 1 and 2, the charging station 48 includes a docking pad 194 and a battery charging terminal 196. The docking pad 194 defines a generally planar surface 198, with "generally planar surface" being defined as providing enough of a portion of a planar surface, i.e., comprised of a single continuous surface or a plurality of separated (discontinuous) surfaces, for the lawn mower 12 to drive up onto and be supported by during a charging operation. The battery charging terminal 196 is configured to engage with the battery charging contact 26 on the lawn mower 12 to provide an electrical connection therebetween for charging the power source 24 (e.g., battery).

The lawn mower 12 includes a cutting module 30 (FIG. 2), which may be supported by the deck 14. The cutting module 30 includes a blade module 28 (which is one example herein of a driven implement) and a motor 36 configured to drive the blade module 28. In some implementations, the blade module 28 includes one or more blade tips 44, and the motor 36 drives the blade module 28 about an axis of rotation A. In other implementations, the blade module 28 includes a reciprocal trimming unit (not shown) having linearly reciprocating trimming blades, and the motor 36 drives the trimming blades of the trimming unit to move reciprocally. In yet other implementations, the blade module 28 includes a string (not shown), as in a string trimmer, and the motor 36 drives the string about the axis of rotation A. In yet other implementations, the blade module 28 includes a roller blade (not shown), such as a reel blade or squirrel cage blade, and the motor 36 drives the roller blade to roll or rotate about an axis that is generally parallel with the support surface (e.g., generally horizontal). In yet other implementations, the blade module 28 includes an auger (not shown), such as snow blower auger, and the motor 36 drives the auger to roll or rotate about an axis that is generally parallel with the support surface (e.g., generally horizontal). In yet other implementations, the blade module 28 includes a fan (not shown), such as a blower fan, and the motor 36 drives the fan in rotation. Other types of blades are also possible. Furthermore, other types of driven implements are also possible, including the blades above as well as other non-blade implements that are driven by the motor 36).

The motor 36 includes a rotatable drive shaft 38 operably coupled to the blade module 28 (or any other driven implement in accordance with any implementation of the disclosure). In the illustrated implementation, the drive shaft 38 is disposed coaxially with the axis of rotation A. In other implementations, the drive shaft 38 may be disposed parallel with (e.g., offset from) or transverse to the axis of rotation A. The axis of rotation A defines an axial direction B. The axial direction B is typically a vertical direction with respect to the support surface on which the lawn mower 12 rides, e.g., up and down with respect to gravity, when the lawn mower 12 is in use. However, in certain implementations, the axis of rotation A (and thus the axial direction B) may be tilted relative to the vertical direction, for example by 1 to 10 degrees, preferably by 3 to 8 degrees, and more preferably by 5 to 6 degrees. In certain implementations, the axis of rotation A may be tilted forward in the travelling direction relative to the vertical direction.

Figure 9:
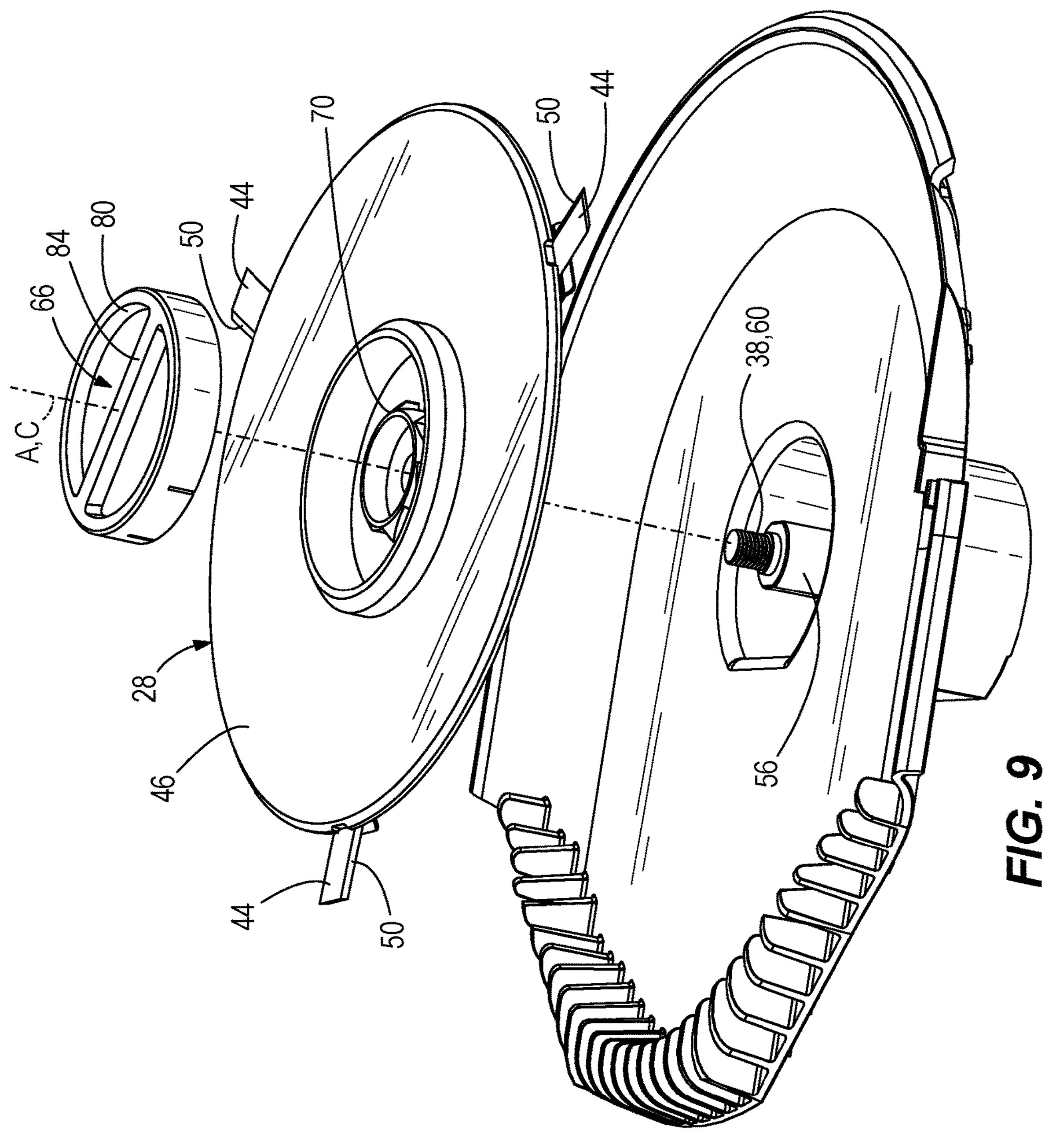
FIG. 9 is an exploded perspective view of the bottom of the blade module and the locking cap of FIG. 8.
Figure 10:
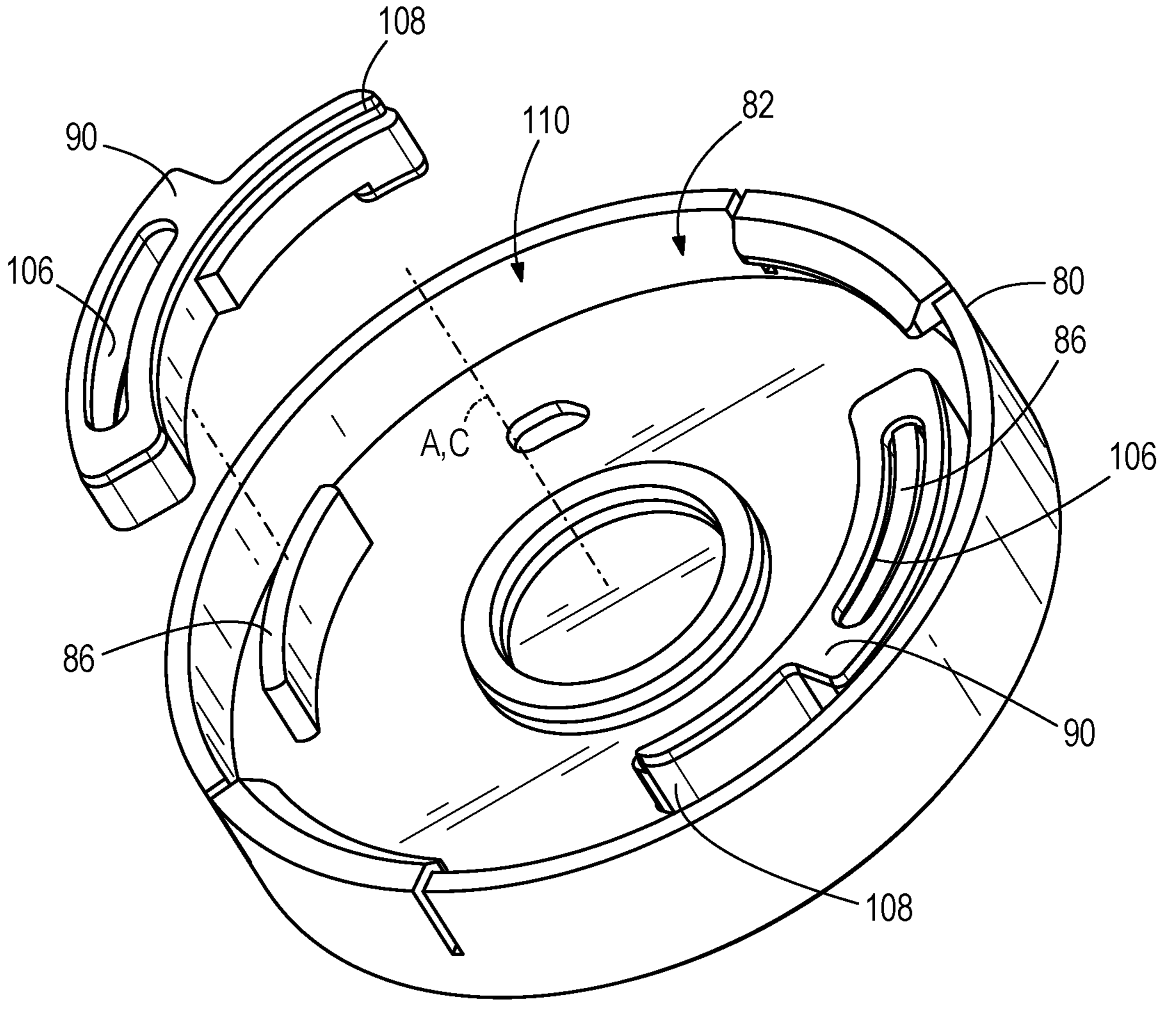
FIG. 10 is an exploded bottom perspective view of a portion of the locking cap of FIG. 9.
Figure 11:
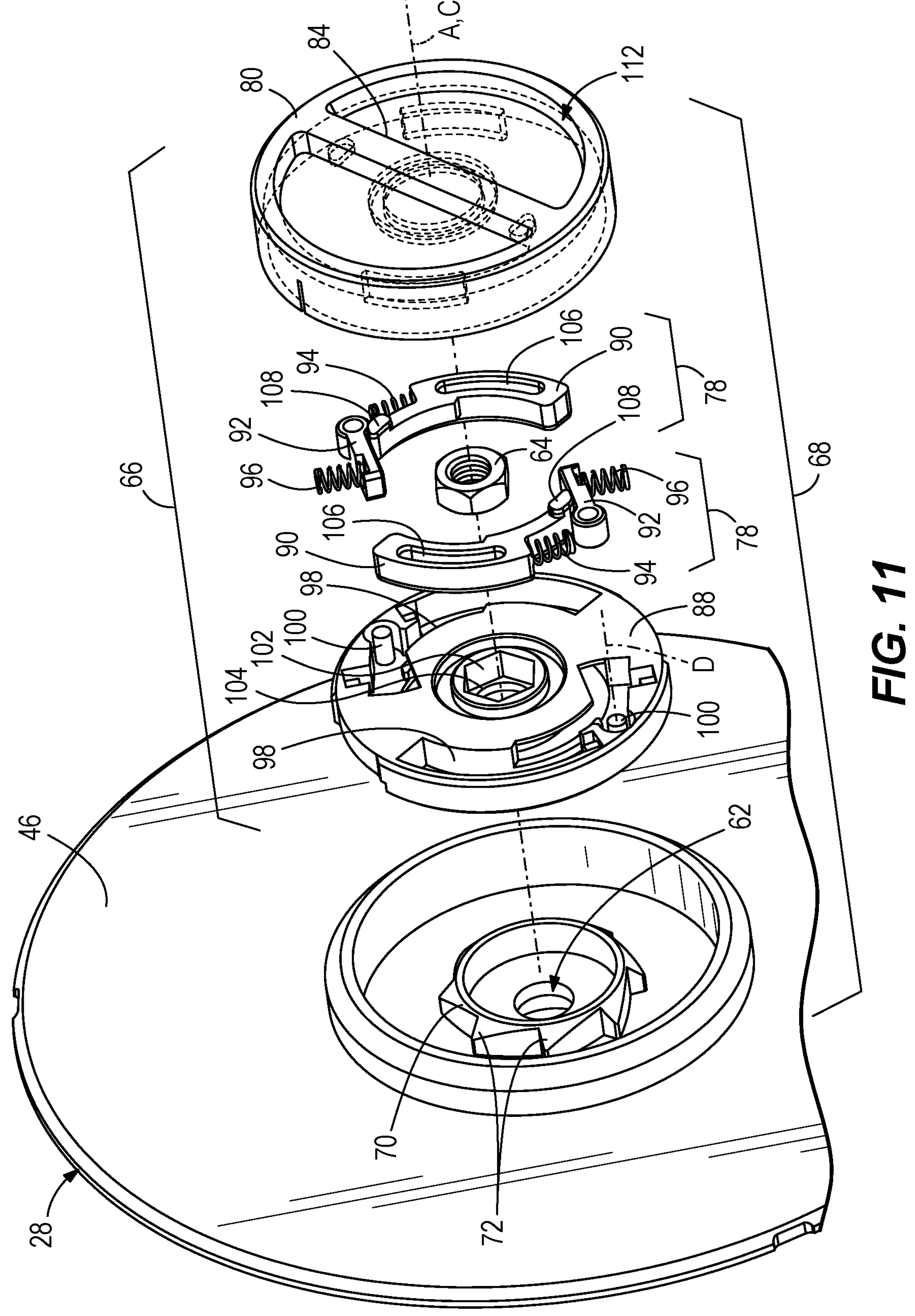
FIG. 11 is an exploded perspective view of the bottom of the blade module and the locking cap of FIG. 8.

The blade module 28 (FIGS. 4-14) may include the one or more blade tips 44 (best illustrated in FIG. 9) supported by a blade holder 46. In the illustrated implementation, the blade holder 46 has a disc-shape, but in other implementations may include a plurality of blade holder arms 52 (e.g., see FIG. 15) extending from a central hub 53, each blade barrier arm supporting one of the blade tips 44. For example, the blade holder 46 supports three blade tips 44. However, one, two, four, or more blade tips 44 may be employed in other implementations. Each of the blade tips 44 includes a knife edge 50 configured to cut vegetation, such as grass and other plants. In some implementations, each of the blade tips 44 includes a plurality of knife edges 50, such as on both sides of the blade tip 44 (e.g., two knife edges 50), and/or on the distal end of the blade tip 44 (e.g., three knife edges 50), or on any other surface of the blade tip 44. In some implementations, the blade holder 46 may support one or more strings or flailing blades for cutting vegetation. For example, the flailing blades may be made from a plastic material such as polycarbonate. In yet other implementations, the blade holder 46 may support any other type of cutter for cutting vegetation, such as a serrated cutter, a roller cutter, any of the cutters described above, or any other cutter. In yet other implementations, the blade holder 46 may support other types of blades, such as fan blades, an auger, etc. In yet other implementations, the blade holder 46 may be formed integrally with a blade or blades, a knife edge or edges, teeth, a string or strings, or any other cutter(s) in any combination. Thus, the blade holder 46 may support any type of garden tool implement and may be referred to as an implement holder 46.

Figure 4:
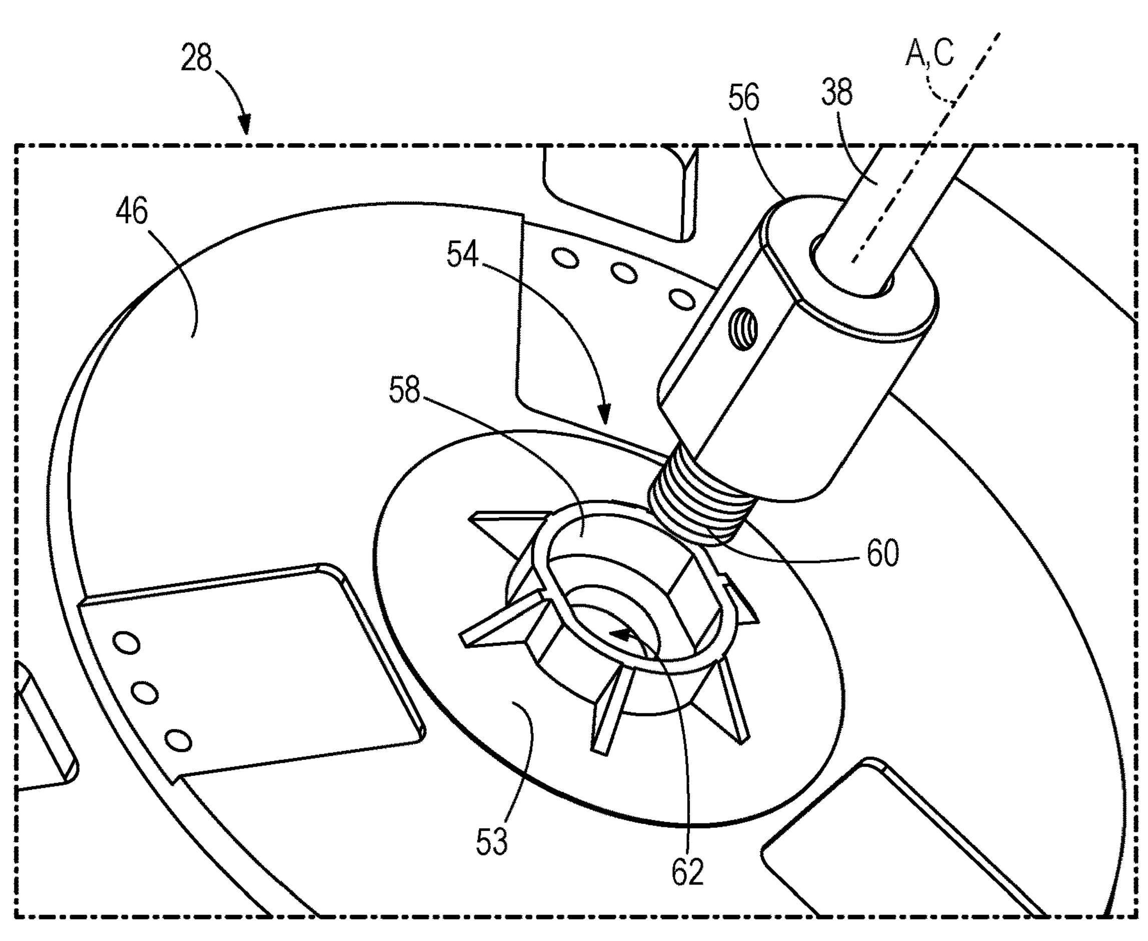
FIG. 4 is a perspective view of the top of a blade holder and drive shaft of the autonomous lawn mower of FIG. 1.
Figure 5:
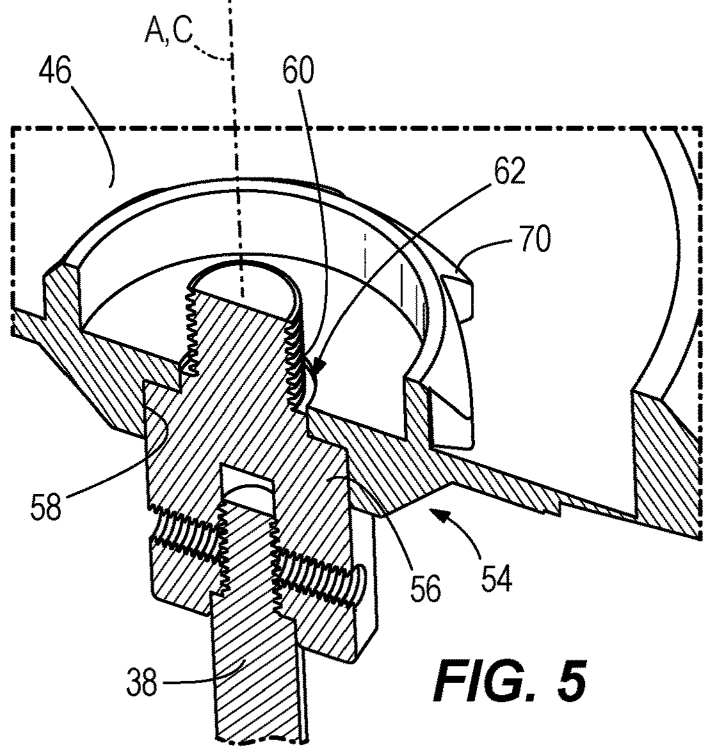
FIG. 5 is a perspective view of the bottom of the blade holder and drive shaft of FIG. 4.
Figures 6, 7:
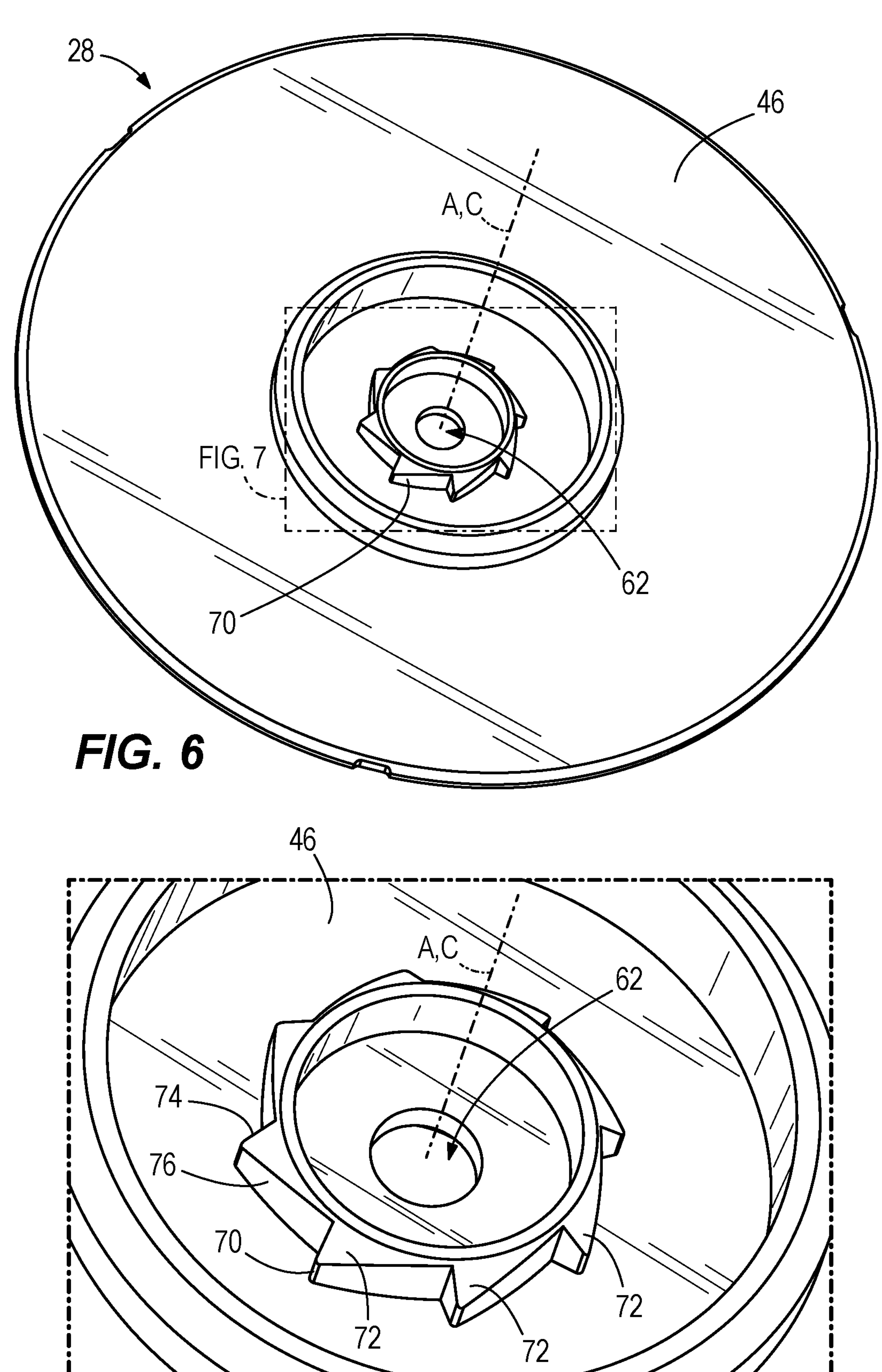
FIG. 6 is perspective view of the bottom of the blade holder of FIG. 4.
FIG. 7 is an enlarged view of the bottom of the blade holder of FIG. 6.
Figure 8:
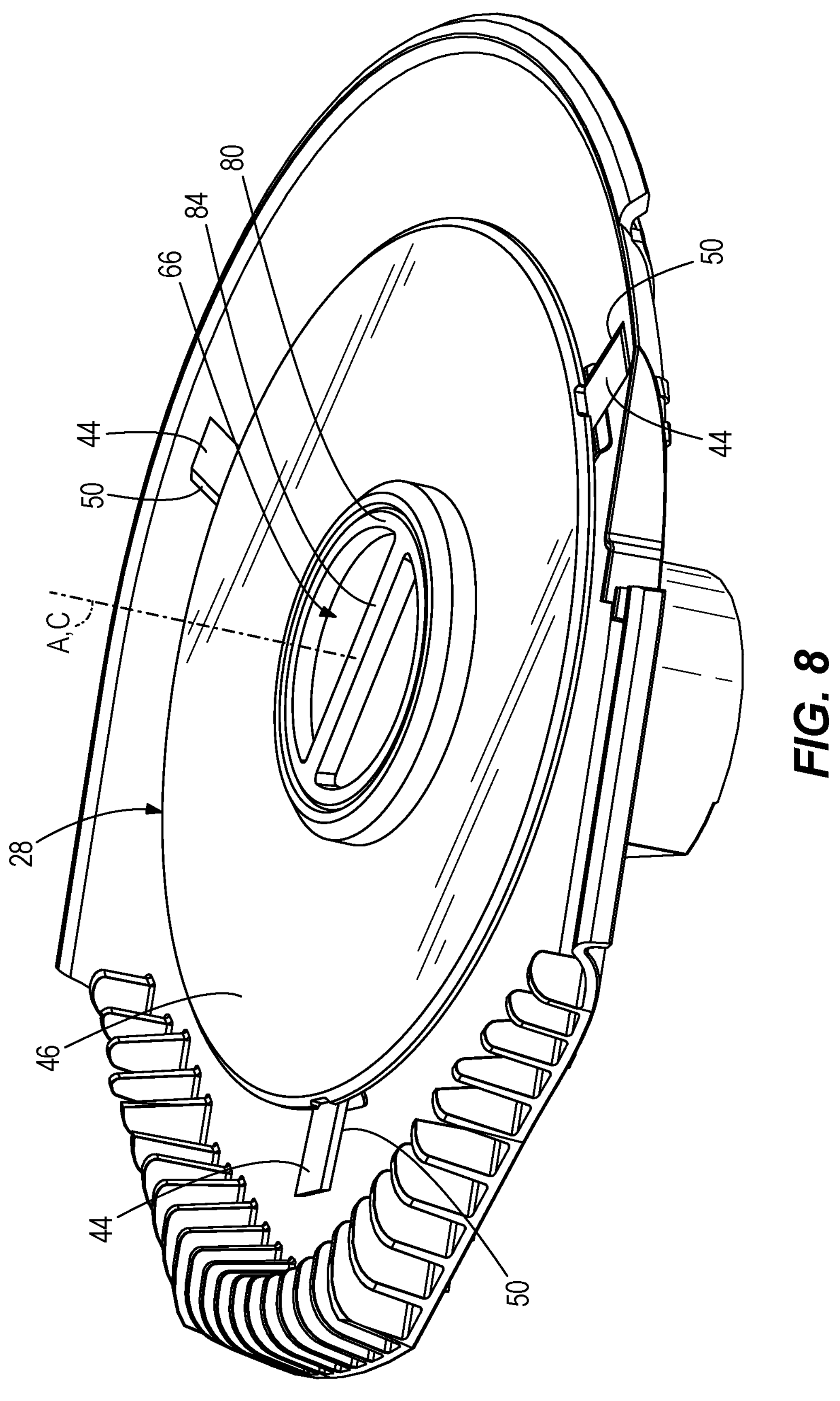
FIG. 8 is a perspective view of the bottom of a blade module and a locking cap of the lawn mower of FIG. 1.

With reference to FIGS. 4-5, the blade holder 46 is driven by the drive shaft 38 by way of a keyed joint 54 therebetween. The keyed joint 54 includes a keyway 56 (e.g., a portion of the drive shaft 38 shaped for torque transmission) and a keyseat 58 (e.g., a pocket defined in the blade holder 46). In other implementations, the keyway 56 may be defined on the blade holder 46 and the keyseat 58 may be defined on the drive shaft 38. The keyway 56 and the keyseat 58 have corresponding shapes and are fitted to each other to inhibit relative rotation and enable torque transmission between the drive shaft 38 and the blade holder 46. Any suitable shape of keyway 56 and keyseat 58 may be employed, such as a double D-shape (FIGS. 4 and 17), a D-shape (FIG. 18), a star-shape (FIG. 16), a C-shape, an I-shape, a slotted shape, a polygonal shape, or any other non-circular shape, etc. In other implementations, other suitable torque-transmitting joints may be employed. In the illustrated implementation, the drive shaft 38 includes external threads 60 and the blade holder 46 includes an aperture 62 disposed centrally within the blade holder 46. A nut 64 (FIGS. 11-14) is coupled to the external threads 60 to hold the blade holder 46 to the drive shaft 38. Thus, in the illustrated implementation, the blade holder 46 is removably coupled to the drive shaft 38. In yet other implementations, other types of connections between the drive shaft 38 and the blade holder 46 may be employed. The drive shaft 38 may also be threaded to the blade holder 46.

With reference to FIGS. 8-14, a locking cap 66 provides toolless locking of the blade holder 46 to the drive shaft 38. The locking cap 66 is rotatable about an axis C and is self-locking by way of a ratchet mechanism 68 to inhibit unintentional loosening (e.g., unscrewing or removal) of the blade holder 46 from the drive shaft 38 during operation of the lawn mower 12. In the illustrated implementation, the axis C coincides with the axis of rotation A; however, in other implementations, the axis C may be parallel to and offset from the axis of rotation A or may be transverse to the axis of rotation A. In the illustrated implementation, the ratchet mechanism 68 includes a ratchet wheel 70 (FIGS. 6-7) fixed to the blade holder 46. However, in other implementations (such as the implementation illustrated in FIGS. 15-19 and described in greater detail below), the ratchet wheel 70 may be formed on a separate piece. The ratchet wheel 70 includes a plurality of asymmetrical teeth 72 disposed circumferentially about the axis C. Each of the asymmetrical teeth 72 includes a steep side 74 and a shallow side 76. The ratchet mechanism 68 also includes a pawl assembly 78 (FIGS. 11-14) disposed in an actuator 80 of the locking cap 66. However, in other implementations, the ratchet wheel 70 and the pawl assembly 78 may be switched, e.g., the pawl assembly 78 may be coupled to the blade holder 46, or other ratchet configurations may be employed. While one configuration of the ratchet mechanism 68 is described below, it should be understood that the ratchet mechanism 68 may have other self-locking configurations that inhibit unintentional loosening of the blade holder 46 from the drive shaft 38 during operation of the lawn mower 12.

In the illustrated implementation, the pawl assembly 78 is coupled to the actuator 80, which is formed as a circular rotating cap. The actuator 80 defines a receptacle 82 on a first side 110 (FIG. 10) and a grip 84 on a second side 112 (FIG. 11) opposite the first side 110. The grip 84 is configured for an operator's hand to engage with the actuator 80 to actuate, e.g., rotate, the actuator 80 about the axis C, and the grip 84 may provide leverage to assist rotation thereof. A slide projection 86 (FIG. 10) extends axially with respect to the axis C from the first side 110 of the actuator into the receptacle 82. The slide projection 86 is arcuate having an arc center that coincides with the axis C of rotation of the locking cap 66. In the illustrated implementation, the actuator 80 includes two slide projections 86 disposed 180 degrees apart from each other about the axis C; however, one, three, four, or more slide projections 86 may be employed in other implementations. The receptacle 82 receives the pawl assembly 78.

With reference to FIGS. 11-14, the pawl assembly 78 includes a carrier 88, a slider 90, a pawl 92, a slider biasing member 94, and a pawl biasing member 96. The slider 90, the pawl 92, the slider biasing member 94, and the pawl biasing member 96 are received in a carrier pocket 98 defined in the carrier 88. The carrier 88 includes a pivot post 100 projecting into the carrier pocket 98. The pivot post 100 receives the pawl 92 thereabout and defines a pivot axis D (FIG. 11) about which the pawl 92 is pivotable within the carrier pocket 98. The pawl 92 is pivotable between a locked position (FIGS. 12-13) in which the pawl 92 is configured to engage the ratchet wheel 70 and an unlocked position (FIG. 14) in which the pawl 92 is radially clear of the asymmetrical teeth 72 of the ratchet wheel 70 (e.g., disposed radially outside the ratchet wheel 70). The pawl biasing member 96 (such as a spring or other suitable elastic member) biases the pawl 92 towards the locked position, radially inwards towards the axis C, into engagement with the ratchet wheel 70. The carrier 88 also includes a central aperture 102 configured to receive and carry the nut 64 in fixed relation to the carrier 88 during the screwing-on and screwing-off operations of the nut 64 relative to the drive shaft 38; however, in other implementations, the nut 64 may be formed integrally with the carrier 88. In other words, the carrier 88 may include internal threads for threading onto the external threads 60 of the drive shaft 38. In the illustrated implementation, the carrier 88 includes a flange 104 (FIG. 11) formed integrally therewith, the flange 104 extending radially inwards and having a diameter smaller than an exterior diameter of the nut 64 in order to retain the nut 64 in the locking cap 66. The flange 104 is disposed between the nut 64 and the blade holder 46.

The slider 90 includes an aperture 106 configured to receive the slide projection 86. The aperture 106 is arcuate having an arc center that coincides with the axis C of rotation of the locking cap 66. The slider 90 also includes a pawl-engagement portion 108 configured to engage the pawl 92, e.g., to move the pawl 92 towards the unlocked position against the bias of the pawl biasing member 96. The slider 90 is movable within the carrier pocket 98 between a first position (FIGS. 12-13) in which the slider 90 does not influence the position of the pawl 92 and a second position (FIG. 14) in which the slider 90 moves the pawl 92 towards the unlocked position. Specifically, the pawl-engagement portion 108 may engage the pawl 92 to move the pawl 92 towards the unlocked position. The slider biasing member 94 (such as a spring or other suitable elastic member) biases the slider 90 to the first position (FIGS. 12-13).

Figures 12, 13:
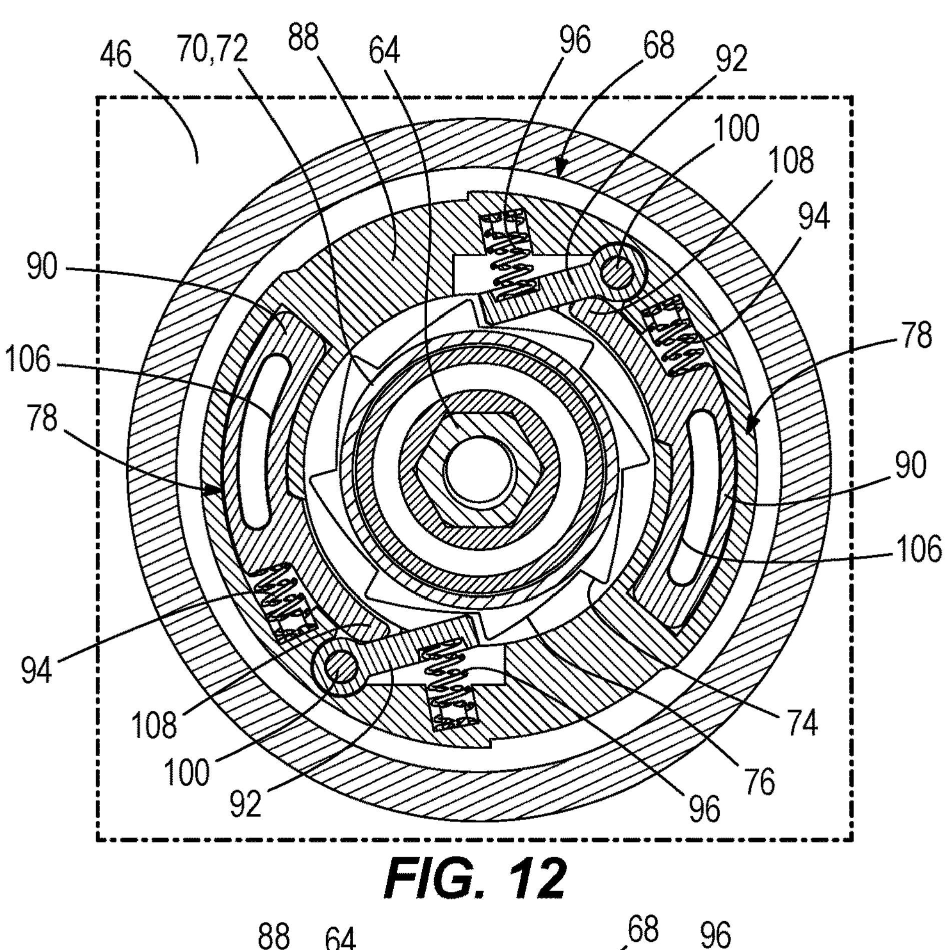
FIG. 12 is a bottom view of a portion of the blade module and the locking cap of FIG. 8 with an actuator of the locking cap hidden to show a ratchet mechanism in a first setting.
FIG. 13 is another view of the ratchet mechanism of FIG. 12 in the first setting, illustrating freewheeling.
Figure 14:
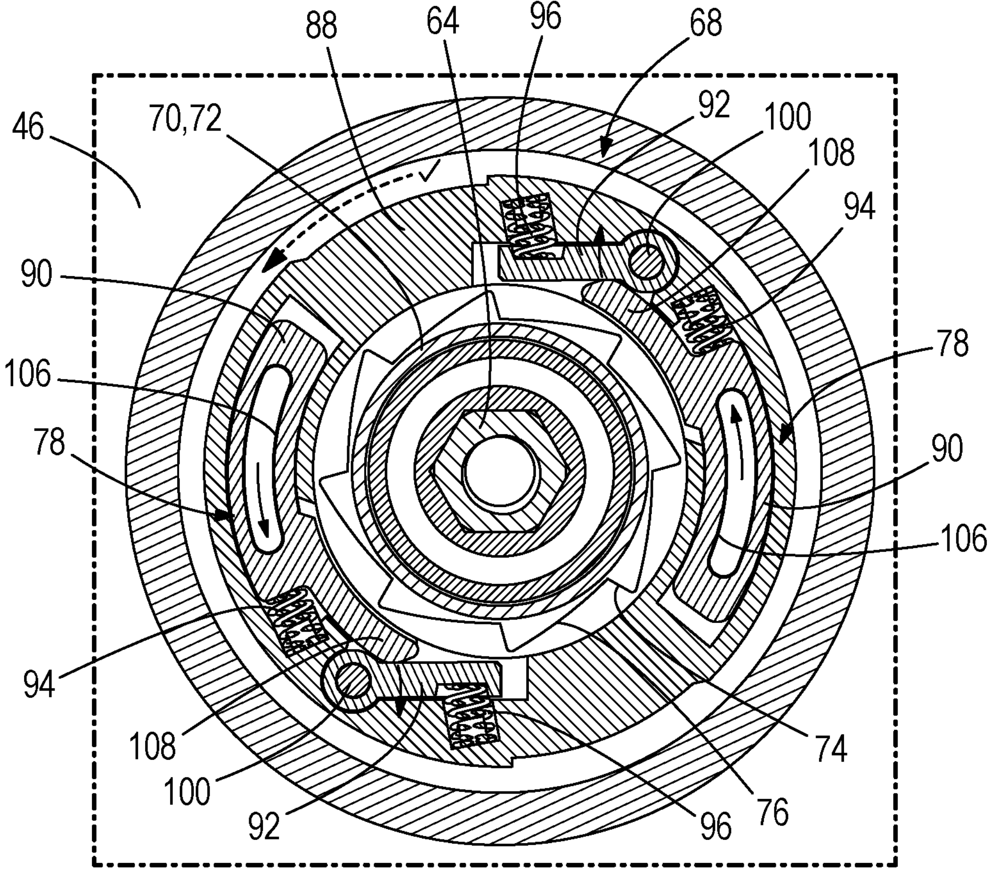
FIG. 14 is a view of the ratchet mechanism of FIG. 12 in a second setting.

A first setting of the locking cap 66 is shown in FIGS. 12-13 in which the pawl 92 is locked and therefore capable of freewheeling as a force is applied to rotate the locking cap 66 in a first direction (e.g., clockwise) and is locked as a first force is applied to rotate the locking cap 66 in a second direction opposite the first direction (e.g., counterclockwise). The first force may be a result of vibrations during operation of the lawn mower 12. The first and second directions may be any set of opposite directions. A second setting of the locking cap 66 is shown in FIG. 14 in which the pawl 92 is unlocked as a second force is applied to rotate the locking cap 66 in the second direction (e.g., counterclockwise), the second force being greater than the first force. The second force is sufficient to overcome the biasing force of the slider biasing member 94 to move the slider 90 and switch the locking cap 66 into the second setting.

In the illustrated implementation, the ratchet mechanism 68 includes two pawl assemblies 78 and two carrier pockets 98. The two pawl assemblies 78 are disposed 180 degrees apart about the axis C, and the two carrier pockets 98 are disposed 180 degrees apart about the axis C. However, in other implementations, the ratchet mechanism 68 may include one, three, four, or more of the pawl assemblies 78 and a corresponding number of the carrier pockets 98, and may be evenly spaced from each other about the axis C, or not evenly spaced from each other about the axis C in other implementations.

In other implementations, the ratchet mechanism 68 may employ a linear rack (not shown) instead of a ratchet wheel 70, and the actuator 80 may be configured as a linear slider instead of a circular rotating cap.

In the illustrated implementation, the drive shaft 38 is a first part and the blade module 28 (or at least the blade holder 46) is a second part (which may also be referred to herein as a driven implement). In other implementations, the locking cap 66 may be employed to lock first and second parts of other garden tools together to inhibit unwanted separation thereof. The first and second parts may be removably secured to each other similarly to the blade holder 46 and the drive shaft 38 as described above and may also have a driving engagement similarly to the blade holder 46 and the drive shaft 38 as described above. However, in other implementations, the first and second parts may be any parts of any garden tool.

In operation, the operator attaches the blade module 28 to the drive shaft 38 by passing the blade module 28 over the external threads 60 of the drive shaft 38 such that the keyway 56 engages the keyseat 58. Then, the operator screws the locking cap 66 (and thus the nut 64 included in the locking cap 66) onto the external threads 60 of the drive shaft 38 by engaging the grip 84 and rotating the locking cap 66 in the first direction (e.g., clockwise as shown in FIG. 13). In the first direction, the locking cap 66 freewheels with respect to the ratchet wheel 70 as the pawl 92 slides over the shallow sides 76 of the asymmetrical teeth 72 (as illustrated in FIGS. 12-13), which allows the nut 64 (or any internal threads) to thread onto the drive shaft 38. The locking cap 66 is inhibited from loosening (e.g., moving in the second direction, such as counterclockwise, opposite the first direction) during operation of the lawn mower 12 by the pawl 92 engaging the steep side 74 of one of the asymmetrical teeth 72. The locking cap 66 thus secures the blade module 28 to the drive shaft 38 and locks the blade module 28 to the drive shaft 38 by inhibiting loosening of the locking cap 66 during operation of the lawn mower 12. To remove the blade module 28, the operator rotates the locking cap 66 in the second direction (e.g., counterclockwise) as shown in FIG. 14 by engaging and twisting the grip 84 in the second direction. In the second direction, the slide projection 86 pushes the slider 90 against the bias of the slider biasing member 94, which pushes the slider 90 into engagement with the pawl 92, which moves the pawl 92 into the unlocked position. In the unlocked position, the pawl 92 is clear of the ratchet wheel 70 and does not engage with the ratchet wheel 70. Therefore, the self-locking mechanism (e.g., the ratchet mechanism 68) is immediately released as the operator turns the locking cap 66 in the second direction and, simultaneously, the nut 64 is (i.e., the internal threads are) unthreaded from the drive shaft 38 as the operator turns the locking cap 66 in the second direction. As such, a single user action (e.g., rotation of the locking cap 66 in the second direction) both releases the self-locking mechanism (e.g., the ratchet mechanism 68) and unscrews the nut 64 (i.e., the internal threads) from the drive shaft 38 to release the blade module 28 from the drive shaft 38. Thus, the user may remove and replace the blade module 28 with a different blade module 28, e.g., a new blade module 28 with sharper blade tips 44, without the need for tools and without the need for an additional user action such as releasing/actuating a separate lock feature in addition to rotating the locking cap 66.

FIGS. 15-19 illustrate another implementation of a garden tool 12' such as a brush trimmer. The garden tool 12' includes a handle shaft 120, an implement guard 122, an implement holder 124, and a drive shaft 126. The handle shaft 120 may be a hand-held wand supporting an implement 125 at a distal end thereof. The implement holder 124 may support a blade, a string, or any other implement such as the other implements discussed herein as well as other implements not discussed herein. The drive shaft 126 protrudes from a motor (not shown), such as the motor 36 applied to the garden tool 12 above, and may be configured to drive the implement 125 in the same manner as discussed above.

Figure 19:
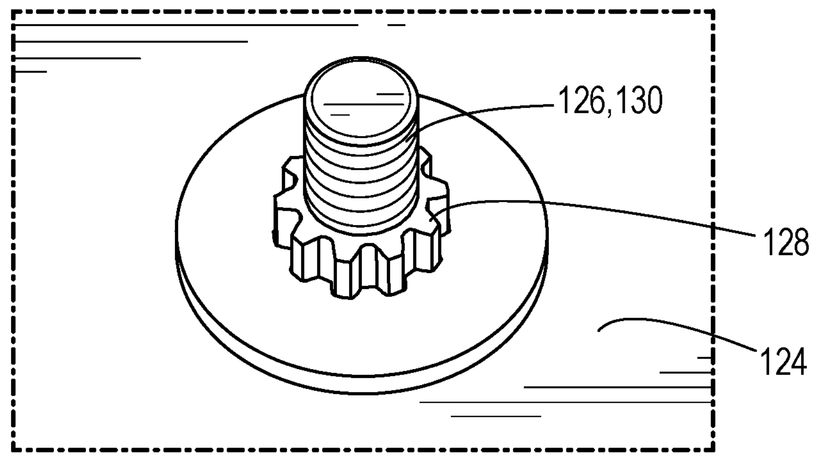
FIG. 19 is an enlarged view of a portion of the garden tool of FIG. 15.

With reference to FIG. 19, the drive shaft 126 includes a keyway 128 (e.g., a portion of the drive shaft 126 shaped for torque transmission) and external threads 130. The keyway 128 mates with the implement holder 124 in a driving engagement for torque transmission. In the illustrated implementation, the keyway 128 has a star-shape for torque transmission; however, any suitable shape may be employed, such as double-D shaped, D-shaped, I-shaped, C-shaped, a slotted shape, a polygonal shape, or any other non-circular shape, etc.

Returning to FIG. 15, a ratchet wheel washer 132 is formed as a separate piece from the implement 125. In other implementations, the ratchet wheel washer 132 may be formed as one piece with a portion of the implement 125. For example, in such other implementations, the ratchet wheel washer 132 may be formed as one piece with the implement holder 124 (as shown in the implementation of FIGS. 4-14), or any other part of the implement 125.

The ratchet wheel washer 132 includes a washer portion 134, a washer aperture 136 disposed generally centrally on the washer portion 134, and a ratchet wheel 138 formed as one piece with the washer portion 134 and protruding therefrom. However, in other implementations, the ratchet wheel 138 may be formed as a separate piece from the washer portion 134 and fixed thereto. The ratchet wheel 138 is generally centered around the washer aperture 136. The ratchet wheel 138 includes a plurality of asymmetrical teeth 140 disposed circumferentially about the washer aperture 136. Each of the asymmetrical teeth 140 includes a steep side 142 and a shallow side 144.

Figure 15:
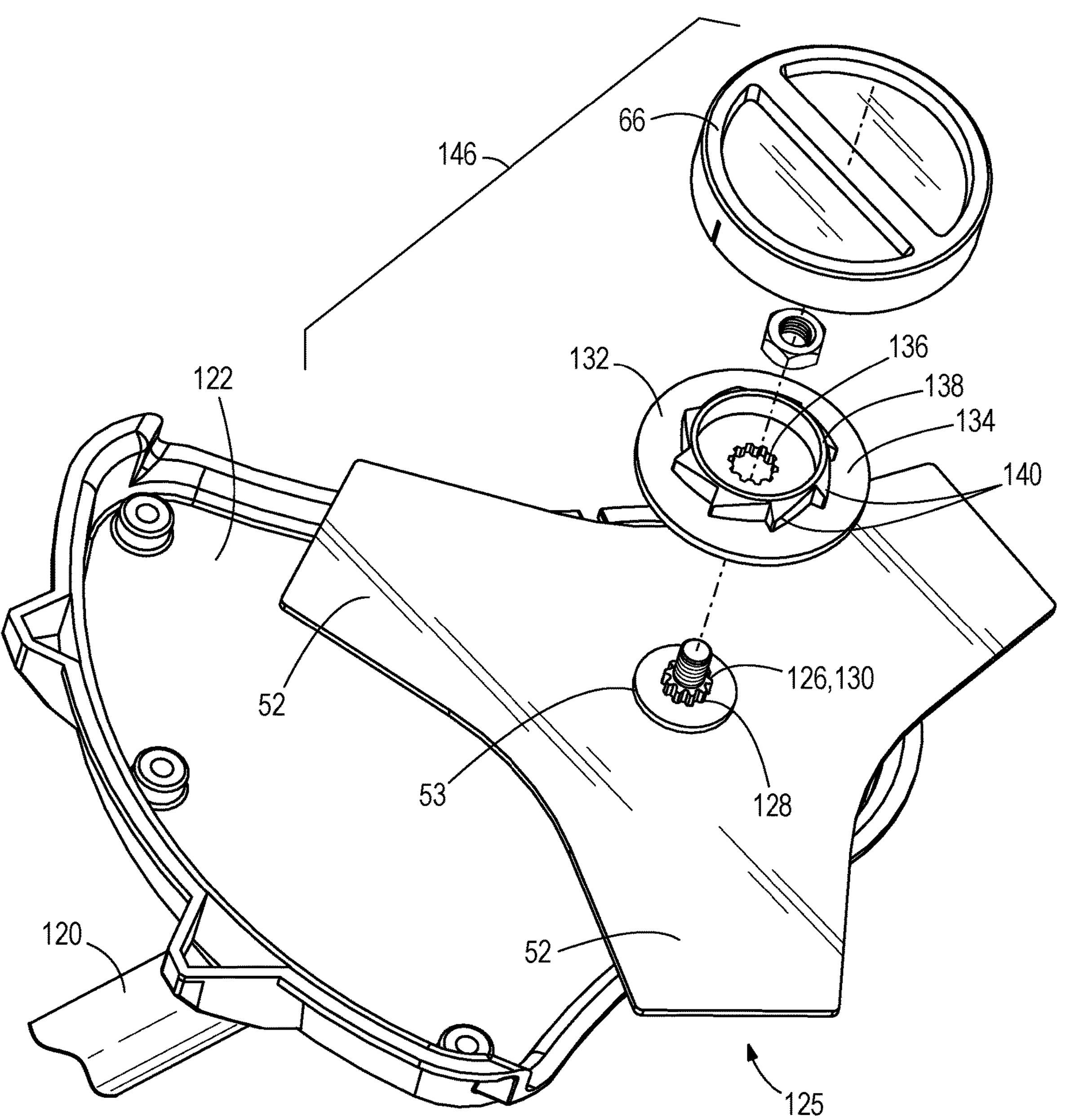
FIG. 15 is a bottom perspective view of another garden tool, such as a brush trimmer, employing the locking cap of FIG. 11.
Figures 16, 17, 18:
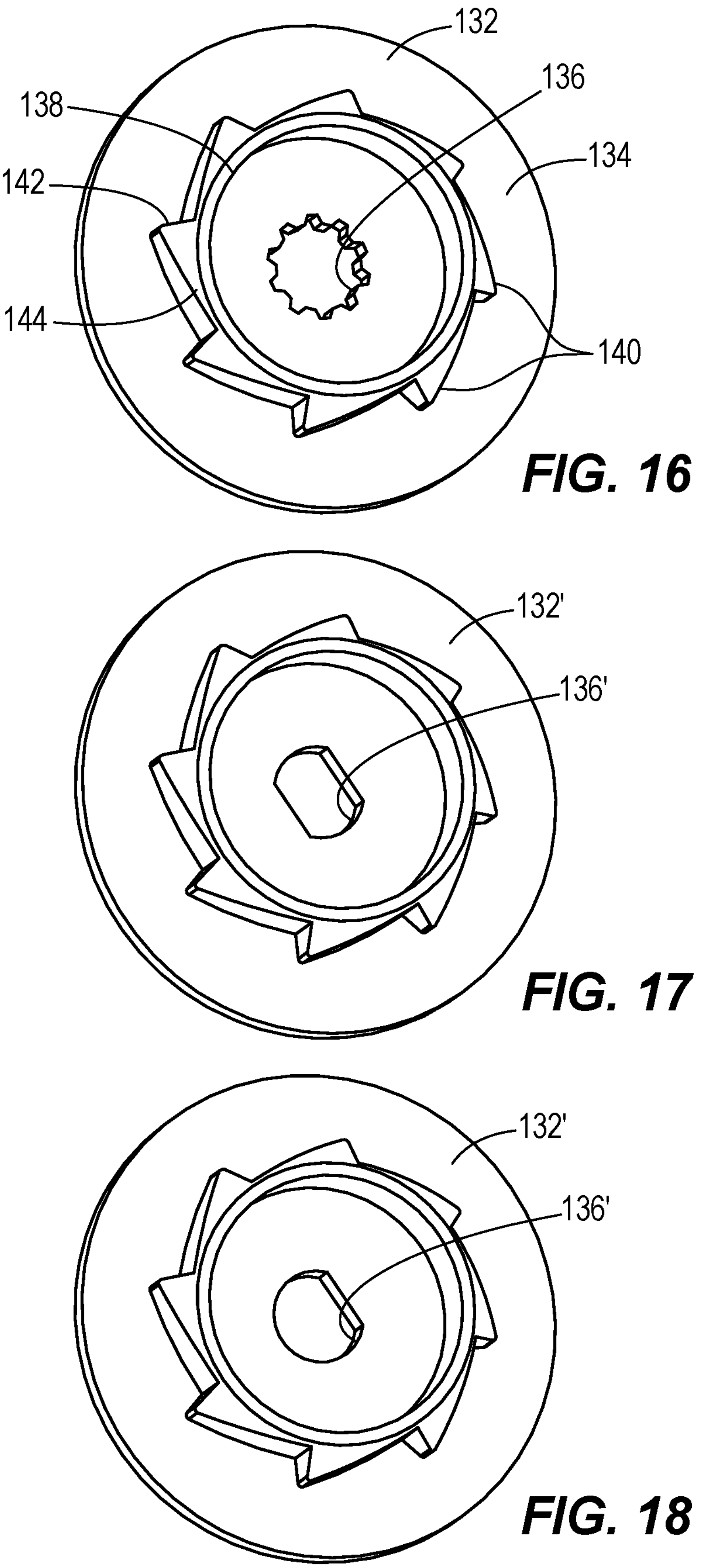
FIG. 16 is a perspective view of a rachet wheel washer of the locking cap of FIG. 15.
FIG. 17 is a perspective view of another implementation of a rachet wheel washer of the locking cap of FIG. 15.
FIG. 18 is a perspective view of yet another implementation of a rachet wheel washer of the locking cap of FIG. 15.

The washer aperture 136 has a non-circular cross-section, such as a star shape in the illustrated implementation of FIGS. 15-16. An alternative implementation of a ratchet wheel washer 132' is illustrated in FIG. 17 and includes a double-D cut washer aperture 136'. Another alternative implementation of a ratchet wheel washer 132" is illustrated in FIG. 18 and includes a D-cut washer aperture 136". In other implementations, any suitable shape may be employed, such as I-shaped, C-shaped, a slotted shape, a polygonal shape, or any other non-circular shape, etc. for torque transmission.

In operation, with the drive shaft 126 inserted through the implement 125, the user may attach the ratchet wheel washer 132 to the implement 125 such that the washer aperture 136 mates with the keyway 128 of the drive shaft 126. The ratchet wheel 138 faces away from the implement 125. Then, the user may thread the locking cap 66 (as described above with respect to FIGS. 4-14) onto the external threads 130 of the drive shaft 126 towards the ratchet wheel 138, in the same manner as discussed above with respect to FIGS. 4-14. The locking cap 66 self locks to the ratchet wheel 138, and is releasable from the ratchet wheel 138, in the same manner as discussed above with respect to FIGS. 4-14.

A combination kit 146 includes the locking cap 66 and the ratchet wheel washer 132. The combination kit 146 allows the locking cap 66 to be applied to garden tools without a specially configured implement. Thus, using the combination kit 146, a wide range of garden tools may be adapted to be used with the locking cap 66 in order to have toollessly removable, interchangeable, and replaceable implements.

Although the disclosure has been described in detail with reference to preferred implementations, variations and modifications exist within the scope and spirit of one or more independent aspects of the disclosure as described.

Thus, the disclosure provides, among other things, a garden tool 12 having a locking cap 66 for securing a drive shaft 38 to a driven implement 28 and self-locking to inhibit loosening. The locking cap 66 is releasable simply by rotation (i.e., the same act of rotation that simultaneously uncouples the locking cap 66 from the drive shaft 38), without the need for an additional user action such as releasing/actuating a separate lock feature in addition to rotating the locking cap 66. The locking cap 66 is self-locking without the need for the separate lock feature.

Additionally or alternatively, a second implementation of a blade module 328 for the lawn mower 12 is described below.

The lawn mower 12 includes a cutting module 30 (FIG. 2), which may be supported by the deck 14. The cutting module 30 includes a blade module 328 (which is one example herein of a driven implement) and a motor 336 configured to drive the blade module 328. In the illustrated implementation, the blade module 328 includes one or more blades **344*a*-344*c*, and the motor 336 drives the blade module 328 about an axis of rotation A. In other implementations, the blade module 328 includes a reciprocal trimming unit (not shown) having linearly reciprocating trimming blades, and the motor 336 drives the trimming blades of the trimming unit to move reciprocally. In yet other implementations, the blade module 328 includes a string (not shown), as in a string trimmer, and the motor 336 drives the string about the axis of rotation A. In yet other implementations, the blade module 328 includes a roller blade (not shown), such as a reel blade or squirrel cage blade, and the motor 336 drives the roller blade to roll or rotate about an axis that is generally parallel with the support surface (e.g., generally horizontal). In yet other implementations, the blade module 328 includes an auger (not shown), such as snow blower auger, and the motor 336 drives the auger to roll or rotate about an axis that is generally parallel with the support surface (e.g., generally horizontal). In yet other implementations, the blade module 328 includes a fan (not shown), such as a blower fan, and the motor 336 drives the fan in rotation. Other types of blades are possible in addition to the examples given above. Furthermore, other types of driven implements are also possible, including the blades above as well as other non-blade implements that are driven by the motor 336**.

The motor 336 includes a rotatable drive shaft 338 operably coupled to the blade module 328 (or any other driven implement in accordance with any implementation of the disclosure). In the illustrated implementation, the drive shaft 338 is disposed coaxially with the axis of rotation A. In other implementations, the drive shaft 338 may be disposed parallel with (e.g., offset from) or transverse to the axis of rotation A. The axis of rotation A defines an axial direction B. The axial direction B is typically a vertical direction with respect to the support surface on which the lawn mower 12 rides, e.g., up and down with respect to gravity, when the lawn mower 12 is in use. However, in certain implementations, the axis of rotation A (and thus the axial direction B) may be tilted relative to the vertical direction, for example by 1 to 10 degrees, preferably by 3 to 8 degrees, and more preferably by 5 to 6 degrees. In certain implementations, the axis of rotation A may be tilted forward in the travelling direction relative to the vertical direction.

Figure 20:
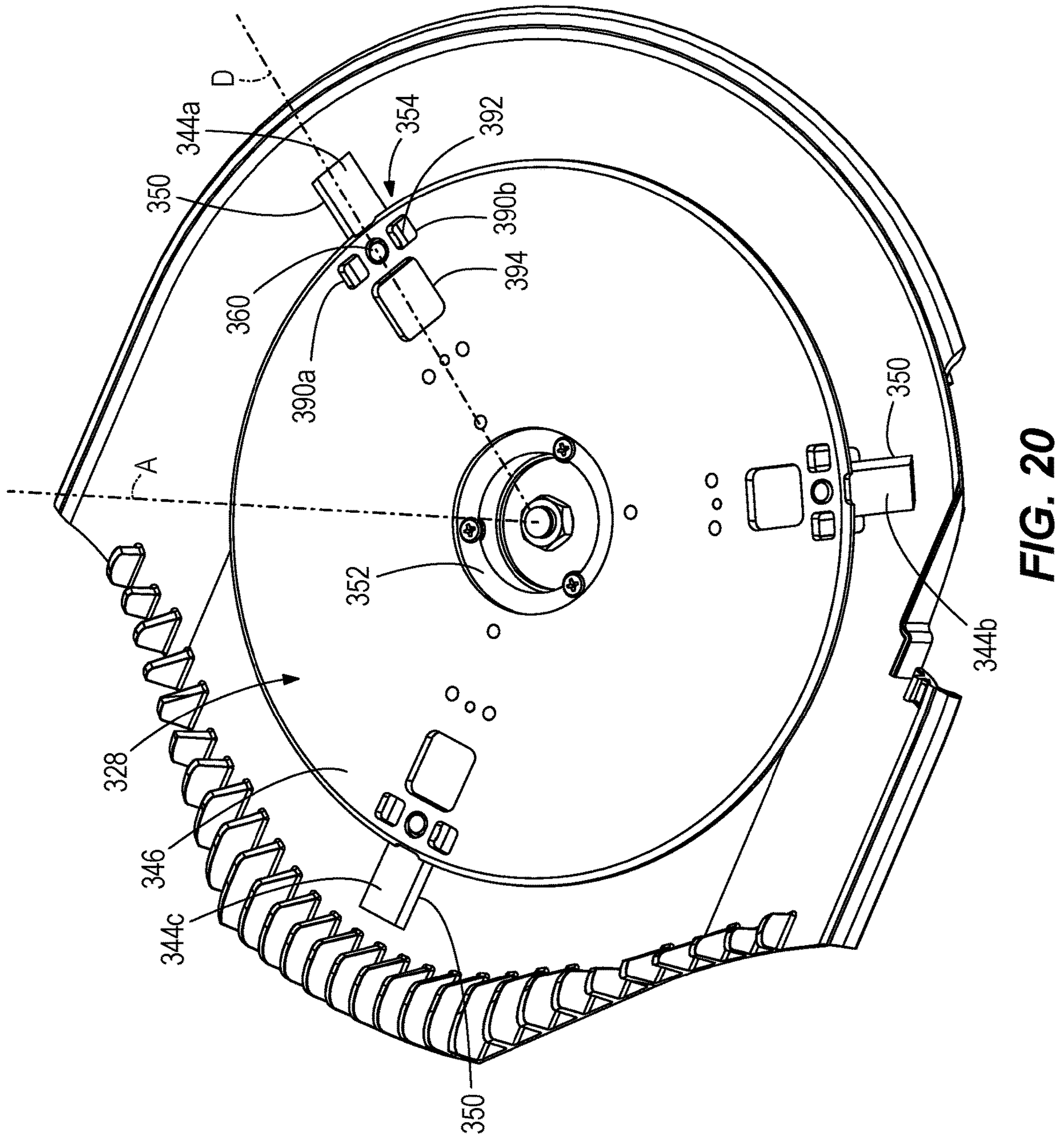
FIG. 20 is a bottom perspective view of a second implementation of the disclosure illustrating a blade holder with blade attachment mechanism of the autonomous lawn mower of FIG. 1.
Figure 21:
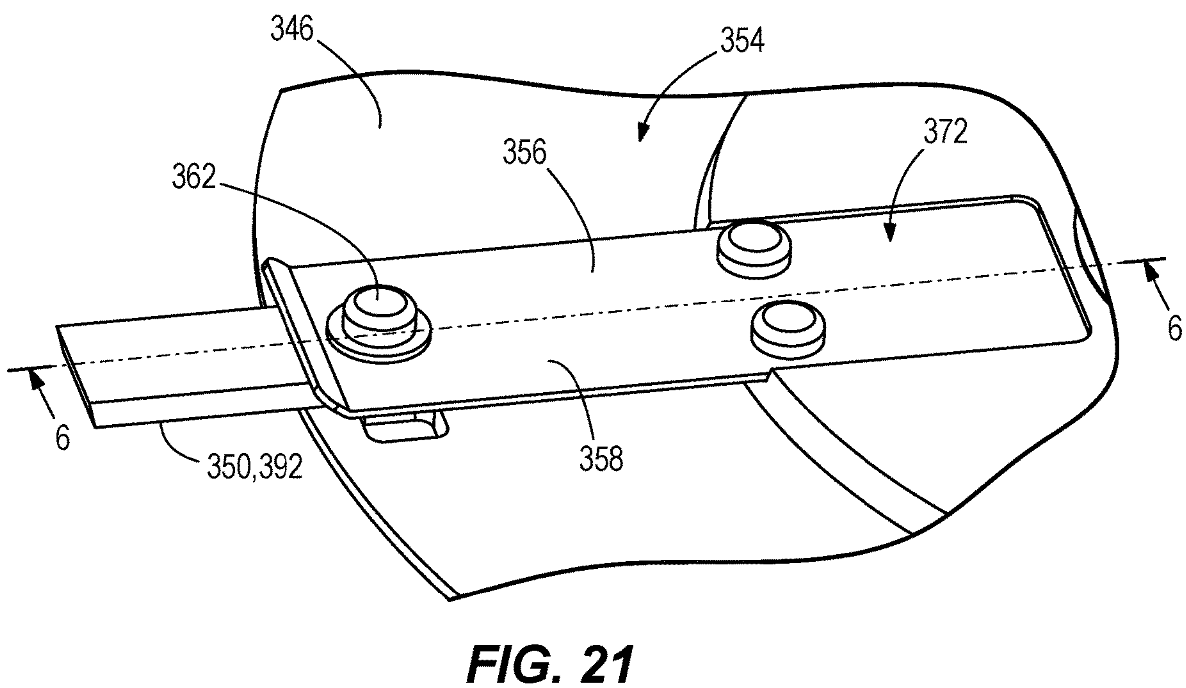
FIG. 21 is a top perspective view of a portion of the blade holder with blade attachment mechanism of FIG. 20.
Figure 22:
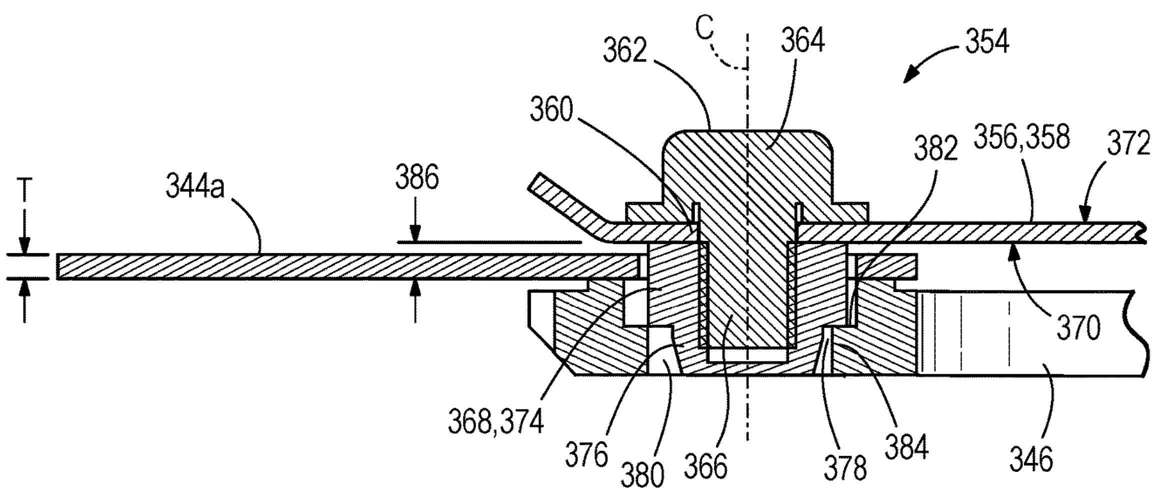
FIG. 22 is a cross-sectional view of the blade holder with blade attachment mechanism taken along line 22-22 in FIG. 21.

The blade module 328 (of FIGS. 20-29C) may include the one or more blades **344*a*-344*c* (which are best illustrated in FIG. 20) supported by a blade holder 346. In other implementations, the blade module 328 may include two or more blade holders 346 each supporting one or more blades 344*a*-344*c*. In the illustrated implementation, the blade holder 346 has a disc-shape with a central hub 352, but in other implementations may include a plurality of blade holder arms (not shown) extending from the central hub 352, each blade holder arm supporting one of the one or more blades 344*a*-344*c*. For example, the blade holder 346 supports three of the one or more blades 344*a*-344*c*. However, one, two, four, or more of the one or more blades 344*a*-344*c* may be employed in other implementations. In the illustrated implementation, each of the one or more blades 344*a*-344*c* includes a knife edge 350 configured to cut vegetation, such as grass and other plants. In some implementations, one or more of the blades 344*a*-344*c* may include two knife edges 350 on opposite sides. In some implementations, each of the blades 344***a*-344*c* may include one or more strings for cutting vegetation. In yet other implementations, the blade holder 346 may support any other type of blade for cutting vegetation, such as a flailing blade, a serrated cutter, a roller cutter, any of the cutters described above, or any other cutter. In yet other implementations, the blade holder 346 may support other types of blades, such as fan blades, an auger, etc. In yet other implementations, the blade holder 346 may be formed integrally with a blade or blades, a knife edge or edges, teeth, a string or strings, or any other cutter(s) in any combination.

Each of the one or more blades 344*a*-344*c* is removably attached to the blade holder 346 by way of a blade attachment mechanism 354. The blade attachment mechanism 354 for one blade 344*a* of the one of more blades 344*a*-344*c* will be described below, but it should be understood that each of the one or more blades 344*a*-344*c* is removably attached in the same manner. Thus, there is one blade attachment mechanism 354 for each of the one or more blades 344*a*-344*c*. The blade attachment mechanism 354 includes a spring 356 fixedly attached to the blade holder 346. The spring 356 includes a cantilevered portion 358. The spring 356 may be generally planar, e.g., may be formed from a plate and referred to as a spring plate. However, in other implementations, other types of springs such as leaf-springs, coil springs, cup springs, torsion springs, wire springs, etc., may be employed and the spring 356 may include other shapes such as curved, coiled, bent, wavy, helical, conical, disc-shaped, cup-shaped, frusto-conical-shaped, leaf-shaped, wire-shaped, etc. The spring 356 is formed from a flexible material, such as metal, that flexes in response to a force applied to the cantilevered portion 358 (FIGS. 25B-25C) and returns to a home position (FIGS. 25A and 25D) when the force is removed. The cantilevered portion 358 of the spring 356 is biased towards the blade holder 346, e.g., towards the home position. The cantilevered portion 358 of the spring 356 includes a fastener aperture 360 receiving a fastener 362, such as a screw or other suitable fastener. The fastener 362 includes a head 364 and a shaft 366 defining a longitudinal axis C, which may be a central axis in the shaft 366. The shaft 366 may be threaded. A pin 368 is fastened to the shaft 366 of the fastener 362, opposite the head 364 of the fastener 362, and may be coaxial with the shaft 366 of the fastener 362, e.g., coaxial with the longitudinal axis C. The pin 368 and the head 364 protrude from opposite sides of the spring 356. For example, the pin 368 protrudes from a first side 370 of the spring 356 and the head 364 protrudes from a second side 372 of the spring 356. The first and second sides 370, 372 are generally planar and parallel to each other. The first side 370 faces the blade holder 346 and the second side 372 faces away from the blade holder 346. The pin 368 includes a first portion 374 and a second portion 376 stepped from the first portion 374 defining a shoulder 378 facing the blade holder 346. A diameter of the second portion 376 is less than a diameter of the first portion 374.

The blade holder 346 includes an aperture 380 aligned axially with the shaft 366 of the fastener 362 and the pin 368, e.g., coaxial with the longitudinal axis C. The blade holder 346 includes a seat 382 disposed in the aperture 380 and defined by a smaller-diameter stepped portion 384. The seat 382 faces the spring 356. More specifically, the seat 382 faces the shoulder 378 of the pin 368. The pin 368 is received in the aperture 380 when the spring 356 is in the home position. In the home position of the spring 356, illustrated in FIGS. 22, 25A, and 25D, the shoulder 378 of the pin 368 engages the seat 382 to limit the movement of the spring 356 towards the blade holder 346. In the home position, with the shoulder 378 engaging the pin 368, a gap 386 for receiving the blade 344*a* is defined between the cantilevered portion 358 and the blade holder 346. The gap 386 may be defined as a distance between the spring 356 and the blade holder 346 in a direction normal to the first side 370 of the spring 356, and within a volume 388 (see FIG. 23) in which the blade 344*a* may be disposed when attached to the blade holder 346. In the illustrated implementation, the blade 344*a* may spin 360 degrees freely about the longitudinal axis C. In some implementations, the gap 386 may be defined as the shortest distance between the cantilevered portion 358 and the blade holder 346 that is within the volume 388. In the illustrated implementation, the gap 386 (FIG. 6) has a measurement of about 0.06 (+/−0.02) inches (about 1.5 mm). In other implementations, the gap 386 may be between about 0.03 and about 0.09 inches (about 0.76 and about 2.29 mm), or between about 0.02 and about 0.1 inches (about 0.5 and about 2.54 mm), or between about 0.02 and about 0.2 inches (about 0.5 and about 5 mm), or any other suitable measurement for accommodating any desired blade thickness. Thus, the measurement of the gap 386 is equal to or greater than a thickness T of the blade 344*a*. In other implementations, the seat 382 and the shoulder 378 may be switched such that the seat 382 is attached to (or defined by) the spring 356 and the shoulder 378 is attached to (or defined by) the blade holder 346.

In the illustrated implementation, the spring 356 has an elongated shape defining a spring longitudinal axis D. In the illustrated implementation, the elongated shape includes a generally rectangular shape, but the elongated shape may have other shapes in other implementations. In the illustrated implementation, the spring 356 is coupled to the blade holder 346 such that the spring longitudinal axis D is generally radial with respect to the axis of rotation A. Thus, the spring longitudinal axis D intersects, or nearly intersects, the axis of rotation A, or at least intersects the central hub 352 of the blade holder 346. The fastener aperture 360 may be intersected by the spring longitudinal axis D, and may be centered on the longitudinal axis D; however, in other implementations, the fastener aperture 360 may be disposed not intersecting the longitudinal axis D.

The blade holder 346 includes first and second alignment apertures 390*a*, 390*b* disposed on opposite sides of the spring longitudinal axis D when the spring 356 is coupled to the blade holder 346. The first and second alignment apertures 390*a*, 390*b* are aligned with the aperture 380 along a generally straight path that is perpendicular to the longitudinal axis D with the aperture 380 being disposed between the first and second alignment apertures 390*a*, 390*b*, but may be disposed elsewhere in other implementations. The first and second alignment apertures 390*a*, 390*b* are positioned such that viewing of the blade 344*a* through the blade holder 346 is made possible, and such that one or both side edges 392 of the blade 344*a* is visible through the blade holder 346. The ability for the user to view at least a portion of the blade 344*a* through the blade holder 346 facilitates alignment of the blade 344*a* during blade-change operations. However, in other implementations, the first and second alignment apertures 390*a*, 390*b* may be disposed in other locations that allow viewing of at least a portion of the blade 344*a* through the blade holder 346. In yet other implementations, the blade holder 346 may be formed from a transparent or semi-transparent material that allows viewing of the blade 344*a* through the blade holder 346.

With reference to FIG. 20, the blade holder 346 also includes an actuation aperture 394 disposed along the longitudinal axis D and configured as a through-hole to allow the user to engage the spring 356 through the actuation aperture 394, e.g., to push the spring 356 from the home position to the flexed position for blade removal/insertion. The actuation aperture 394 is disposed between the aperture 380 and the central hub 352 of the blade holder 346, all of which are generally aligned along the longitudinal axis D.

Figures 23, 24:
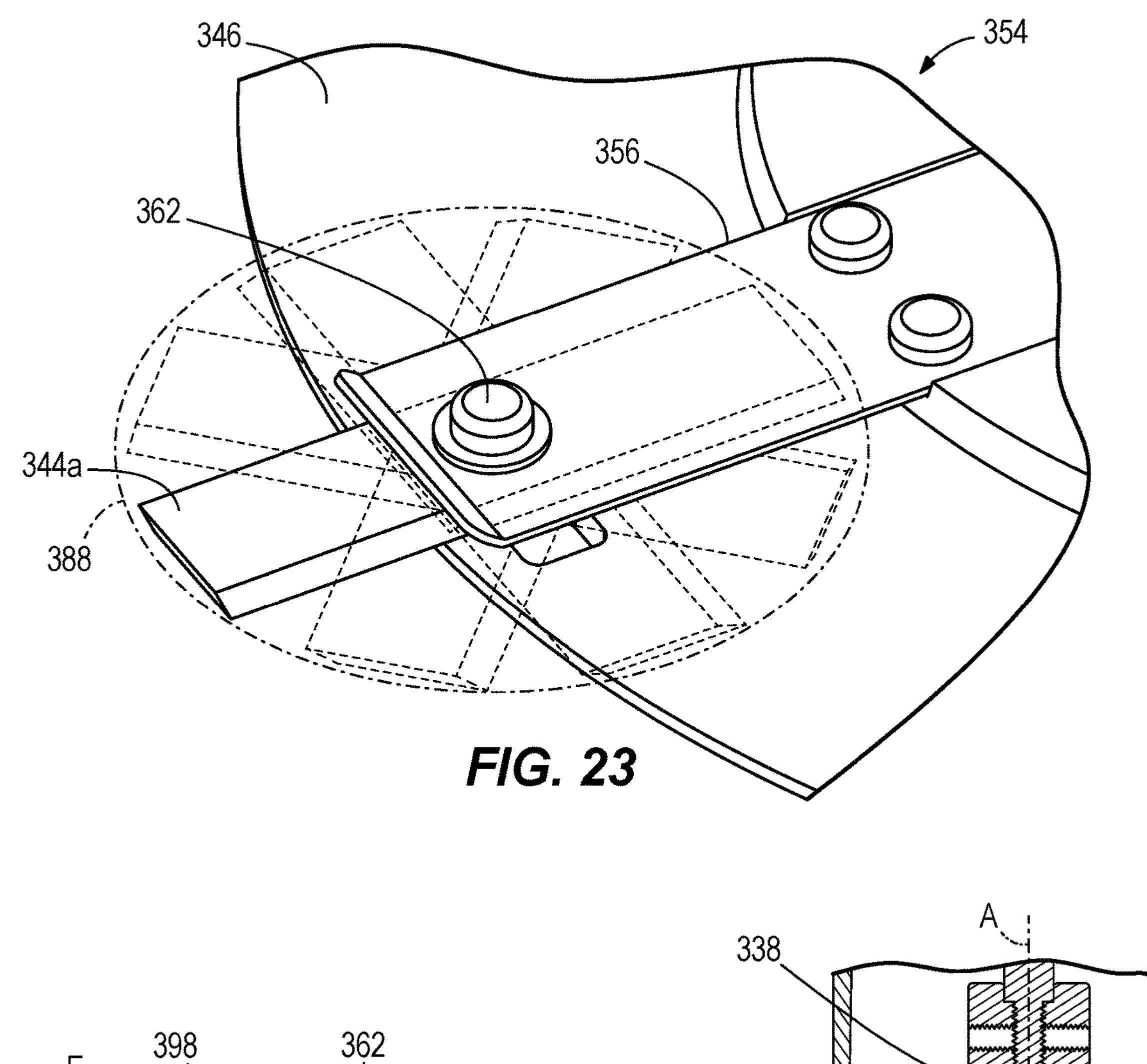
FIG. 23 is another view of the portion of the blade holder with blade attachment mechanism of FIG. 21 with the spring being shown transparent to illustrate movement of the blade.
FIG. 24 is a cross-sectional view of the blade holder with blade attachment mechanism of FIG. 20.

The blade 344a includes a blade aperture 342 therein for receiving the pin 368. With reference to FIG. 24, the blade 344a may be attached to the blade holder 346 at an angle E defined between a first plane 396 defined by the blade 344a and a second plane 398 defined perpendicular to the axis of rotation A. In other words, the first plane 396 is transverse to the second plane 398. The angle E represents a blade tilt such that the blade 344a cuts at a downward angle towards the support surface. In the illustrated implementation, the angle E is about 5 degrees (+/−1 degree); however, in other implementations, the angle E may be between 3 and 7 degrees, between 2 and 8 degrees, or between 5 and 10 degrees in other implementations. In the illustrated implementation, the angle E is achieved by forming the blade holder 346 in a frusto-conical shape (rather than a planar disc-shape). Thus, the longitudinal axis C of the fastener shaft 366 is angled with respect to the axis of rotation A by the same amount (i.e., by a corresponding angle having the same value as the angle E). In other words, the longitudinal axis C is transverse to the axis of rotation A.

Another implementation of a blade attachment mechanism 354' is illustrated in FIGS. 26-29C. The blade attachment mechanism 354' includes all of the same features as described above with respect to the blade attachment mechanism 354 and also includes additional features that will be described below. Only the additional features will be described below, and all of the description of the blade attachment mechanism 354 herein is incorporated by reference into the description of the blade attachment mechanism 354'.

The blade attachment mechanism 354' includes a retention mechanism 400 for selectively retaining the spring 356 in the home position. The retention mechanism 400 is movable between a locked configuration (FIG. 29A) and an unlocked configuration (FIGS. 29B-29C). In the locked configuration, the retention mechanism 400 retains, or locks, the spring 356 in the home position such that the retention mechanism 400 inhibits the spring 356 from moving away from the blade holder 346. For example, the retention mechanism 400 inhibits vibrations, or the user, from moving the spring 356 from the home position towards the flexed position. In the unlocked configuration, the retention mechanism 400 allows the user to push the spring 356 from the home position to the flexed position.

Figures 26, 27:
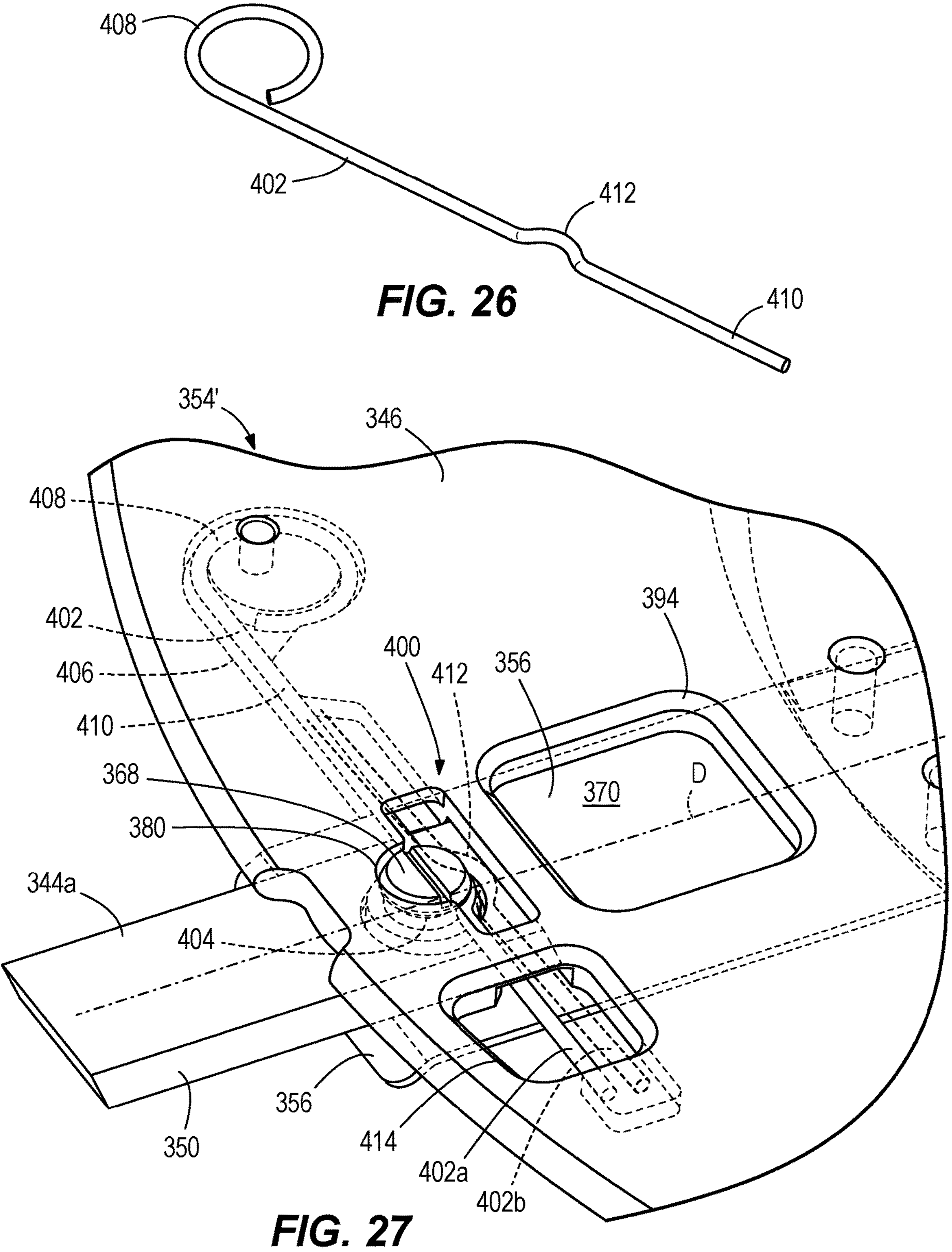
FIG. 26 is a bottom perspective view of a blade holder with blade attachment mechanism according to an alternative implementation of the disclosure for the lawn mower of FIG. 1.
FIG. 27 is a bottom perspective view of a spring catch of the blade attachment mechanism of FIG. 26.

The retention mechanism 400 includes a spring catch 402 and a groove 404 in the pin 368 that receives the spring catch 402 in the locked configuration. The groove 404 is at least partially circumferential on the pin 368 with respect to the longitudinal axis C. In the illustrated implementation, the spring catch 402 includes a spring wire (FIG. 27); however, in other implementations, other spring catches, such as spring plates, leaf-springs, coil springs, cup springs, torsion springs, and other springs having any other shape such as curved, coiled, bent, wavy, helical, conical, disc-shaped, cup-shaped, frusto-conic al-shaped, leaf-shaped, etc., may be employed. With reference to FIG. 26, the spring catch 402 is shown in a locked position 402a (corresponding to the locked configuration of the retention mechanism 400) and an unlocked position 402b (corresponding to the unlocked configuration of the retention mechanism 400). In the locked position 402a, the spring catch 402 is received in the groove 304 in the pin 368 to inhibit movement of the pin 368 (and in turn the spring 356) with respect to the blade holder 346. In the unlocked position 402b, the spring catch 402 is disengaged from the pin 368 to allow movement of the pin 368 (and in turn the spring 356) with respect to the blade holder 346.

The spring catch 402 is disposed in a recess 406 in the blade holder 346 and is movable between the locked position 402a and the unlocked position 402b with respect to the blade holder 346. For example, the spring catch 402 includes an anchor catch portion 408 and a cantilevered catch portion. The anchor catch portion is attached to the blade holder 346 and the cantilevered catch portion 410 flexes between the locked position 402a and the unlocked position 402b. The cantilevered catch portion 410 may be biased to the locked position 402a. The cantilevered catch portion 410 may include a notch 412 shaped to correspond with the groove 404, the notch 412 being received in the groove 404 in the locked position 402a. The blade holder 346 may include an unlocking aperture 414 through which the user may engage the spring catch 402 to move the spring catch 402 from the locked position 402a to the unlocked position 402b. The unlocking aperture 414 may also act as the alignment aperture 390a to allow the user to view one of the side edges 392 of the blade 344a to facilitate alignment of the blade 344a during installation.

Figure 28:
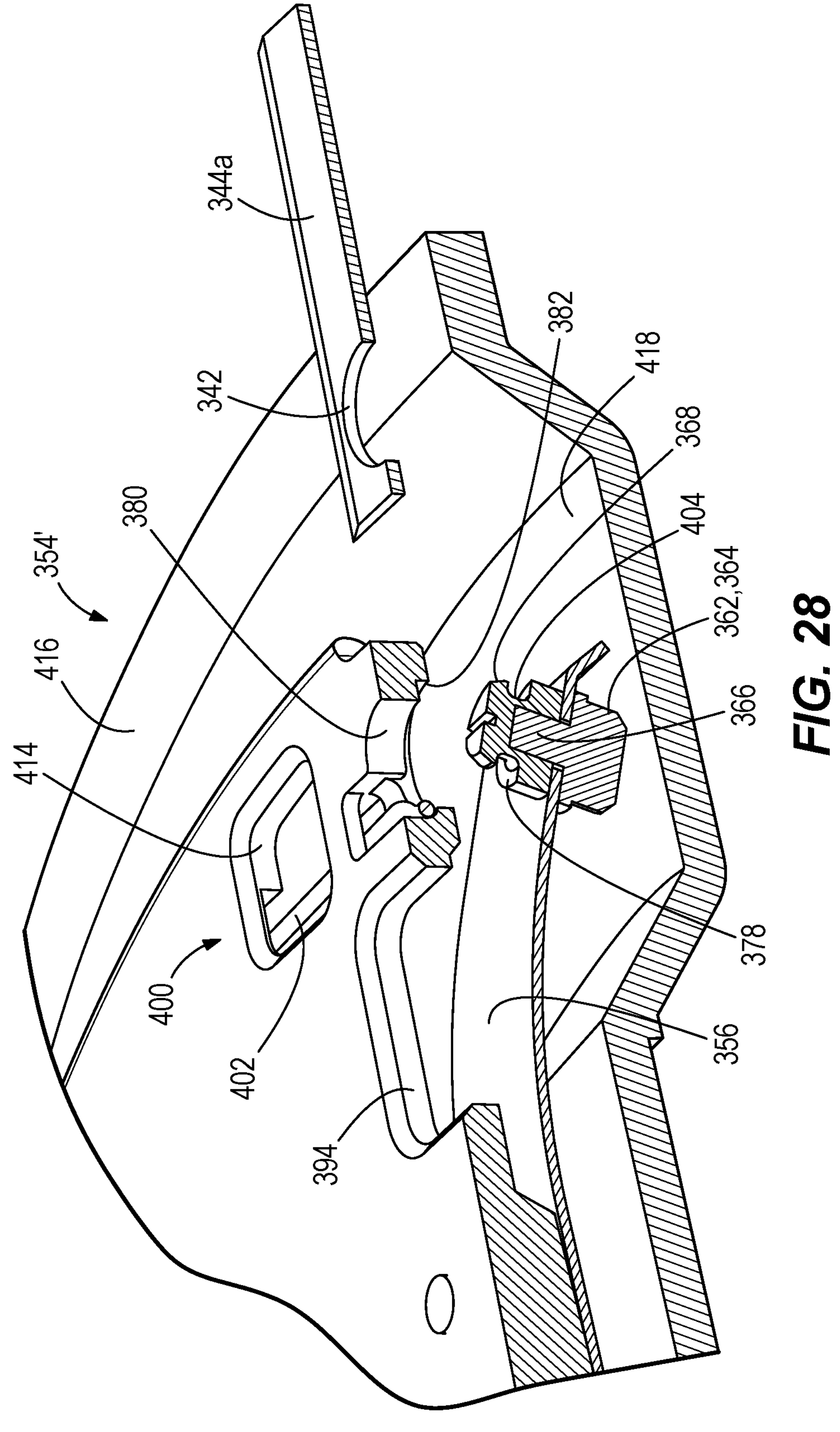
FIG. 28 is a bottom perspective view of the blade holder with blade attachment mechanism of FIG. 26 with a shroud.

As illustrated in FIG. 28, the blade module 328 may include a blade shroud 416 having a recessed pocket 418 for accommodating movement of the spring 356 between the home position and the flexed position. The recessed pocket 418, for example, may be annular with respect to the axis of rotation A, but may have other shapes in other implementations, and may include a through-hole in other implementations.

Figures 25A, 25B, 25C, 25D:
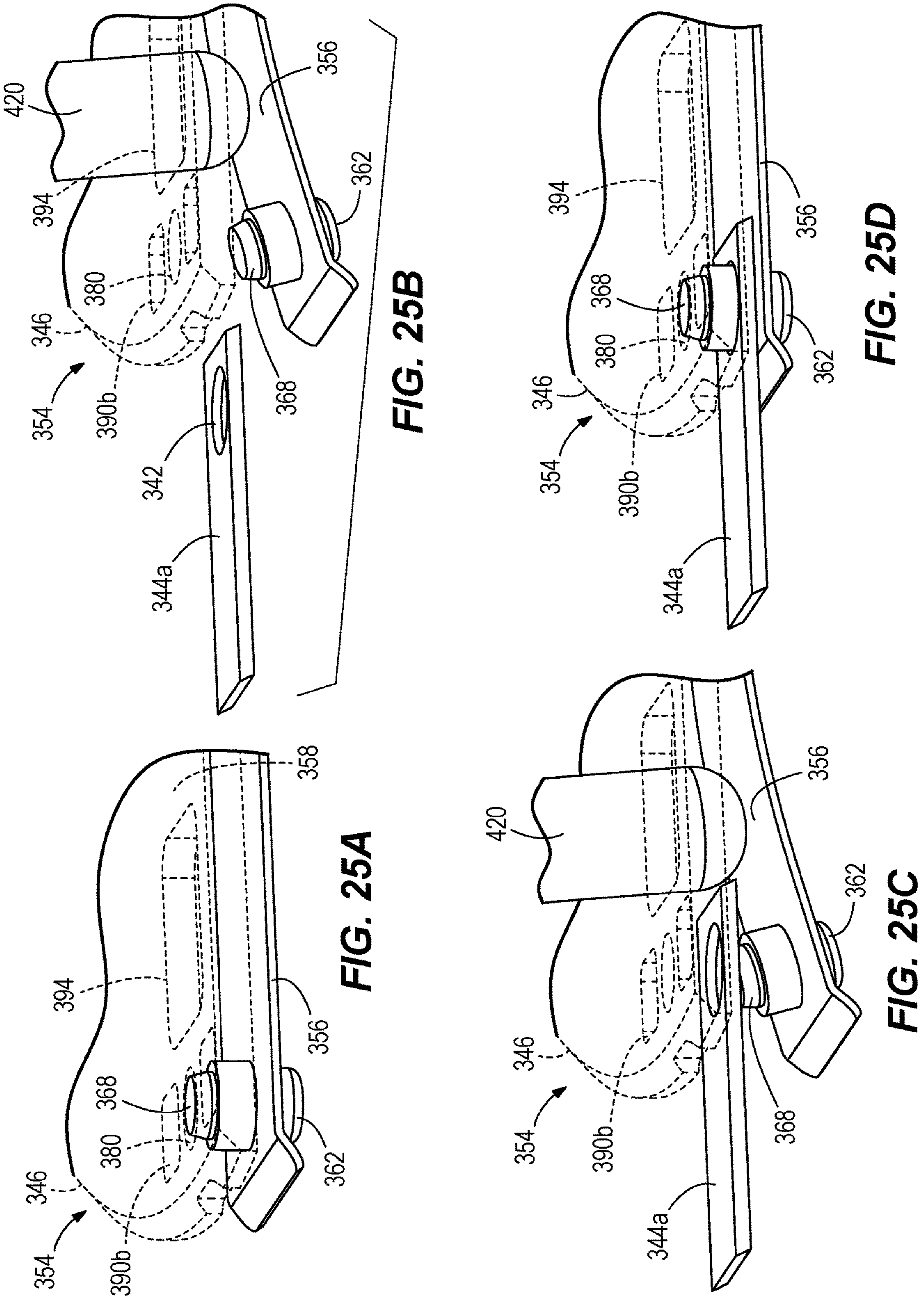
FIGS. 25A-25D illustrate the blade holder with blade attachment mechanism of FIG. 20 in operation with the blade being inserted.

In operation, with reference to FIGS. 25A-25D, the operator may remove and replace the blade 344a using the blade attachment mechanism 354. As shown in FIG. 25A, the spring 356 is in the home position with no blade attached to the blade holder 346. In FIG. 25B, the user 420 (e.g., the user's finger) is shown engaging and displacing the spring 356 to the flexed position in which the cantilevered portion 358 is displaced away from the blade holder 346. The user 420 engages the spring 356 through the actuation aperture 394. From FIGS. 25B to 25C, the blade 344a is shown being inserted into the blade holder 346 by aligning the blade aperture 342 with the aperture 380 in the blade holder 346 and the pin 368 (e.g., aligning the blade aperture 342 with the longitudinal axis C). To aid in alignment, the user may view the blade 344a, and specifically the side edges 392 of the blade 344a, through the first and second alignment apertures 390a, 390b. As illustrated in FIG. 25D, the user releases, or disengages, the spring 356 such that the spring 356 returns to the home position with the blade 344a attached to the blade holder 346. The pin 368 passes through the blade aperture 342 and engages the seat 382 in the blade holder 346. Specifically, the shoulder 378 engages the seat 382. Thus, the blade 344a is secured to the blade holder 346 in a manner such that the blade 344a can freely rotate about the longitudinal axis C within the volume 388 shown in FIG. 23. The gap 386 provided by the shoulder 378 engaging the seat 382 provides for the free movement of the blade 344a about the longitudinal axis C. The spring force of the spring 356 provides secure engagement of the shoulder 378 and the seat 382. To remove the blade 344a, the user performs the steps above in reverse, i.e., as shown from FIG. 25D to FIG. 25C to FIG. 25B to FIG. 25A.

Figure 29A:
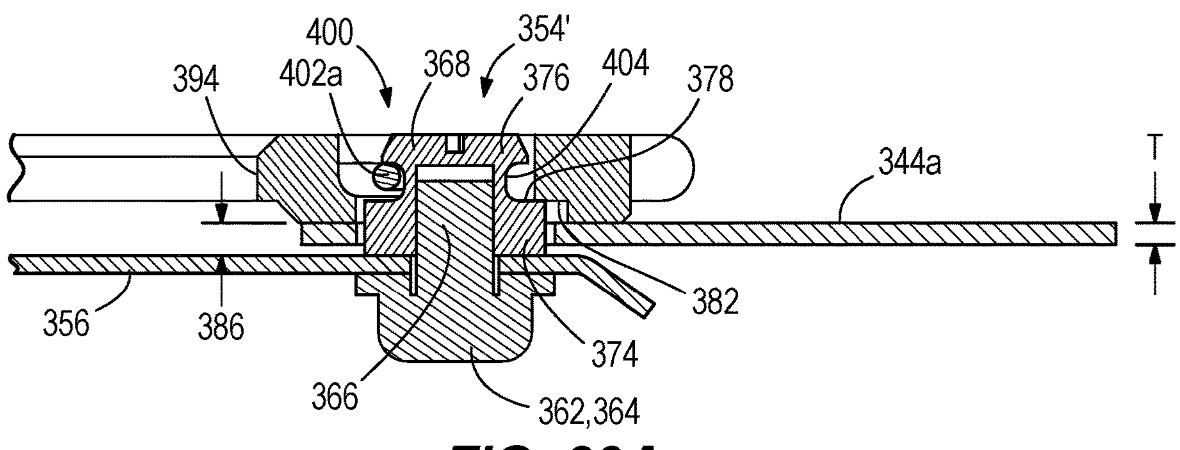
FIGS. 29A-29C illustrate the blade holder with blade attachment mechanism of FIG. 26 in operation with the blade being removed.
Figure 29B:
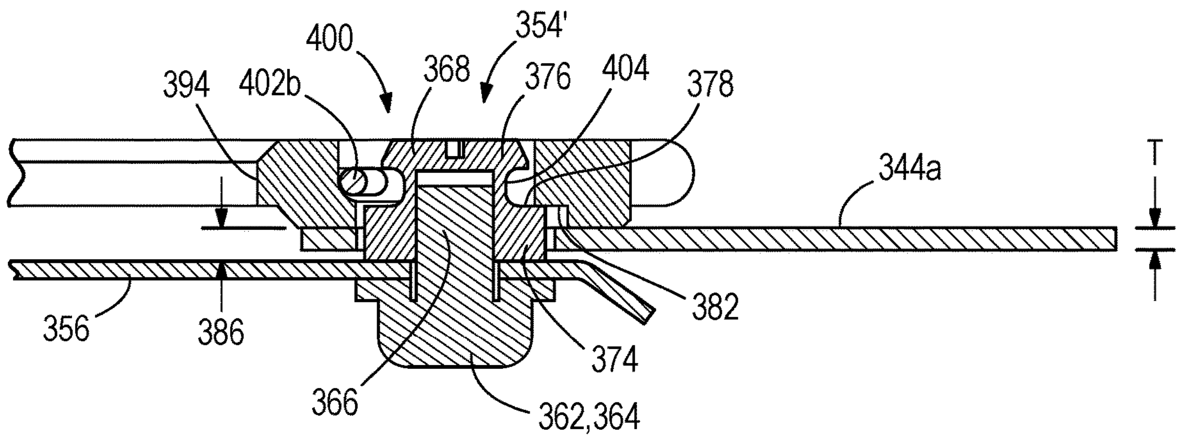
Figure 29C:
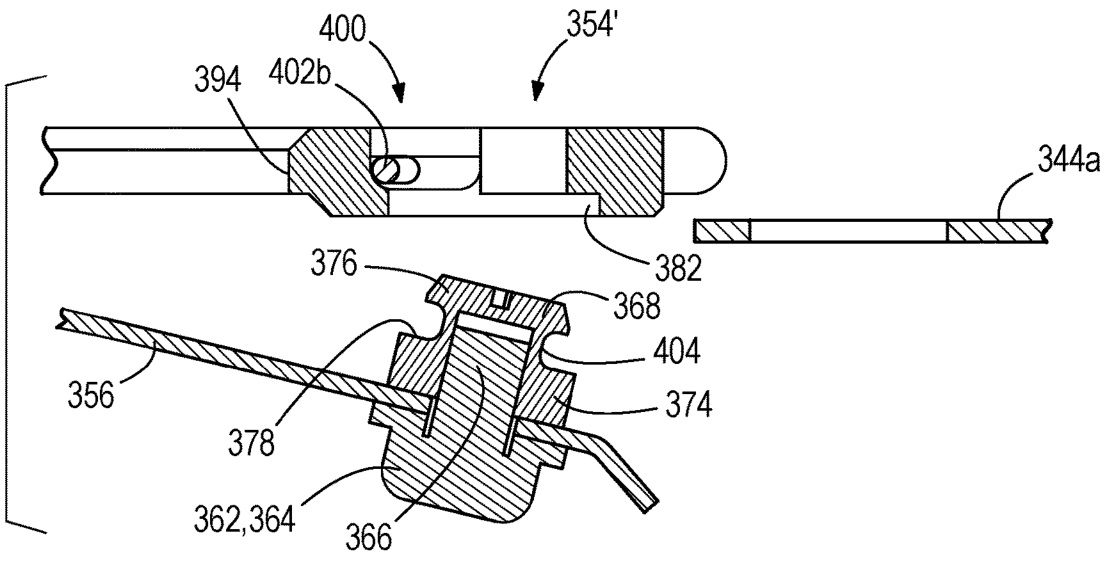

In operation, with reference to FIGS. 29A-29C, the operator may remove and replace the blade 344*a* using the blade attachment mechanism 354'. As illustrated in FIG. 29A, the spring 356 is in the home position with the blade 344*a* attached to the blade holder 346. The retention mechanism 400 is locked by the spring catch 402 being received in the groove 404 and engaging the pin 368 such that the user cannot push the spring 356 away from the blade holder 346. In FIG. 29B, the user has engaged and moved the spring catch 402 against its biasing force from the locked position 402*a* to the unlocked position 402*b* in order to change the retention mechanism 400 from the locked condition to the unlocked condition. The user may engage the spring catch 402 through the unlocking aperture 414 in the blade holder 346. As illustrated in FIG. 29B, the spring catch 402 is no longer received in the groove 404 (and no longer in engagement with the pin 368) in the unlocked position, allowing the user to move the spring 356 to the flexed position illustrated in FIG. 29C. The user moves the spring 356 to the flexed position in the same way discussed above and illustrated with respect to FIGS. 29B-29C. The user may remove and insert the blade 344*a* (or another replacement blade similar to the blade 344*a*) when the spring 356 is in the flexed position. For example, the blade 344*a* may be inserted into the blade holder 346 by aligning the blade aperture 342 with the aperture 380 in the blade holder 346 and the pin 368 (e.g., aligning the blade aperture 342 with the longitudinal axis C). To aid in alignment, the user may view the blade 344*a*, and specifically the side edges 392 of the blade 344*a*, through the first and second alignment apertures 29*a*, 29*b*. The user releases, or disengages, the spring 356 such that the spring 356 returns to the home position with the blade 344*a* attached to the blade holder 346. The pin 368 passes through the blade aperture 342 and engages the seat 382 in the blade holder 346. Specifically, the shoulder 378 engages the seat 382. Furthermore, the spring catch 402 reseats itself in the groove 404 in engagement with the pin 368 to lock the spring 356 with respect to the blade holder 346. Thus, the blade 344*a* is secured to the blade holder 346 in a manner such that the blade 344*a* can freely rotate about the longitudinal axis C within the volume 388 shown in FIG. 23, and such that the spring 356 is inhibited from moving away from the blade holder 346. The gap 386 provided by the shoulder 378 engaging the seat 382 provides for the free movement of the blade 344*a* about the longitudinal axis C.

FIGS. 30-34 each illustrate an alternative implementation of the blade attachment mechanism 354, 354'. Only the differences will be described below, and the remaining description above is incorporated by reference into the description of the alternative blade attachment mechanisms in FIGS. 30-34. Any of the alternative blade attachment mechanisms described below with respect to FIGS. 30-34 each may be included in the garden tool 12 described herein.

Figures 30, 31, 32, 33, 34:
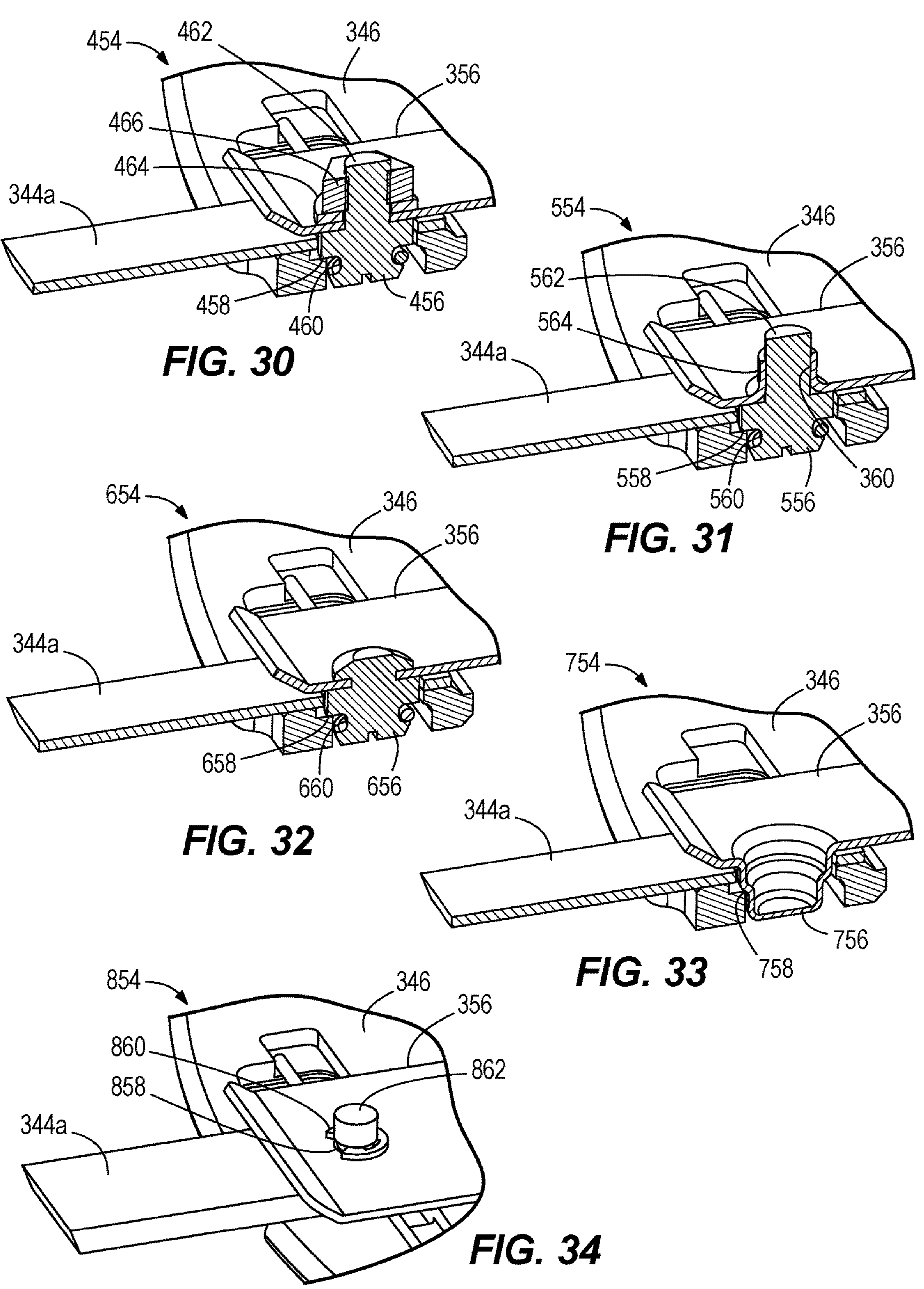
FIGS. 30-34 each illustrate an alternative implementation of the blade attachment mechanism of FIG. 26.

FIG. 30 illustrates a blade attachment mechanism 454. The blade attachment mechanism 454 includes a fastener pin 456. The fastener pin 456 is essentially an integration of the pin 368 and the shaft 366 described above, i.e., being formed as one piece. The fastener pin 456 includes a shoulder 458 (corresponding to the shoulder 378 described above, which need not be described again) and a groove 460 (corresponding to the groove 404 described above, which need not be described again). Reference is made to the descriptions above of the shoulder 378 and the groove 460. The fastener pin 456 also includes a shaft 462. The shaft 462 may be threaded externally. A washer 464 and a nut 466, which may have internal threads, are threadedly fastened to the shaft 462 to secure the fastener pin 456 to the spring 356.

FIG. 31 illustrates a blade attachment mechanism 554. The blade attachment mechanism 554 includes a fastener pin 556. The fastener pin 556 is essentially an integration of the pin 368 and the shaft 366 described above, i.e., being formed as one piece. The fastener pin 556 includes a shoulder 558 (corresponding to the shoulder 378 described above, which need not be described again) and a groove 560 (corresponding to the groove 404 described above, which need not be described again). Reference is made to the descriptions above of the shoulder 378 and the groove 460. The fastener pin 556 also includes a shaft 562. The shaft 562 may be threaded externally. The spring 356 is modified to include a cylindrical protrusion 564 having internal threads. The fastener aperture 360 may be formed through the cylindrical protrusion 564. The cylindrical protrusion 564 may be formed as one piece with the spring 356, or formed separately and fixed to the spring 356. The shaft 562 of the fastener pin 556 threadedly couples with the cylindrical protrusion 564 to secure the fastener pin 556 to the spring 356.

FIG. 32 illustrates a blade attachment mechanism 654. The blade attachment mechanism 654 includes a bonded pin 656. The bonded pin 656 is essentially an integration of the pin 368 and the fastener 362 described above, i.e., being formed as one piece and bonded to the spring 356, e.g., by welding, mechanical deformation (such as, but not limited to, riveting), adhesive bonding, brazing, or the like. The bonded pin 656 includes a shoulder 658 (corresponding to the shoulder 378 described above, which need not be described again) and a groove 660 (corresponding to the groove 404 described above, which need not be described again). Reference is made to the descriptions above of the shoulder 378 and the groove 460.

FIG. 33 illustrates a blade attachment mechanism 754. The blade attachment mechanism 754 includes an integrated pin 756. The integrated pin 756 is essentially an integration of the pin 368 and the spring 356 described above, i.e., the pin 368 being formed as one piece with the spring 356. In the illustrated implementation, the integrated pin 756 is stamped into the material of the spring 356. However, in other implementations, the integrated pin 756 may be formed into the material of the spring 356 in other ways, such as other forms of mechanical deformation. In some implementations, a combination of mechanical deformation techniques may be employed. In yet other implementations, the integrated pin 756 may be formed separately using mechanical deformation techniques and fixed to the spring 356. The integrated pin 756 includes a shoulder 758 (corresponding to the shoulder 378 described above, which need not be described again). In other implementations, the integrated pin 756 may also include a groove (not shown, but corresponding to the groove 404 described above, which need not be described again). Reference is made to the descriptions above of the shoulder 378 and the groove 460.

FIG. 34 illustrates a blade attachment mechanism 854, which is an alternate implementation of the blade attachment mechanism 554 of FIG. 30 with only the differences being described below. The fastener pin 856 is the same as the fastener pin 456 but also includes a retaining groove 858 in the shaft 862. A retaining ring 860 is received in the retaining groove 858 to secure the fastener pin 856 to the spring 356. Thus, the shaft 862 need not be threaded externally.

Although the disclosure has been described in detail with reference to preferred implementations, variations and modifications exist within the scope and spirit of one or more independent aspects of the disclosure as described.

Thus, the disclosure provides, among other things, a garden tool 12 having a blade holder 346 and a blade **344*a* removably coupled to the blade holder 346 by way of a blade attachment mechanism 354, 354', 454, 554, 654, 754, 854. The blade attachment mechanism 354, 354', 454, 554, 654, 754, 854 includes a seat 382 and a shoulder 378 configured to engage the seat 382 and to provide a gap 386 between the spring 356 and the blade holder 346 in which the blade 344*a* can freely rotate about the pin 368** with reduced friction.

What is claimed is:

1. A garden tool, comprising:

a drive shaft;

a driven implement; and a locking cap configured to removably secure the drive shaft and the driven implement relative to each other, wherein the locking cap is self-locking, by way of a ratchet mechanism, to inhibit loosening;

wherein the ratchet mechanism includes a ratchet wheel, a pawl pivotable between a first pawl position and a second pawl position, and a slider slideable between a first slider position and a second slider position, wherein the slider is configured to unlock the pawl in the second slider position.

2. The garden tool of claim 1, wherein the locking cap is configured to rotate in a first direction to secure the drive shaft to the driven implement, and rotate in a second direction, opposite the first direction, to simultaneously 1) unlock the locking cap and 2) release the driven implement from the drive shaft.

3. The garden tool of claim 1, wherein the locking cap includes an actuator having a grip configured to provide actuating leverage, wherein the actuator is operably coupleable to the slider to move the slider towards the second slider position.

4. The garden tool of claim 1, wherein the locking cap is configured to thread onto the drive shaft by actuation in a first direction to secure the driven implement to the drive shaft, to thread off the drive shaft by actuation in a second direction opposite the first direction to allow removal of the driven implement from the drive shaft, wherein the locking cap is self-locking to inhibit rotation of the locking cap in the second direction when the locking cap is not being actuated, and wherein the locking cap is unlocked by actuation in the second direction.

5. The garden tool of claim 1, wherein the locking cap is configured to rotate relative to the drive shaft by actuation in a first direction to secure the driven implement to the drive shaft, to rotate relative to the drive shaft by actuation in a second direction opposite the first direction to allow removal of the driven implement from the drive shaft, wherein the locking cap is self-locking to inhibit rotation of the locking cap in the second direction when the locking cap is not being actuated, and wherein the locking cap is unlocked by actuation in the second direction.

6. The garden tool of claim 1, wherein the driven implement includes a blade module.

7. A lawn mower comprising:

a deck;

a blade module;

a motor having a drive shaft configured to drive the blade module; and a locking cap configured to removably secure the blade module to the drive shaft, wherein the locking cap is self-locking, by way of a ratchet mechanism, to inhibit loosening;

wherein the ratchet mechanism includes a ratchet wheel, a pawl pivotable between a first pawl position and a second pawl position, and a slider slideable between a first slider position and a second slider position, wherein the slider is configured to unlock the pawl in the second slider position.

8. The lawn mower of claim 7, wherein the locking cap is configured to rotate in a first direction to secure the blade module to the drive shaft, and rotate in a second direction, opposite the first direction, to simultaneously 1) unlock the locking cap and 2) release the blade module from the drive shaft.

9. The garden tool of claim 7, wherein the locking cap includes an actuator having a grip configured to provide actuating leverage, wherein the actuator is operably coupled to the slider to move the slider towards the second slider position.

10. The lawn mower of claim 7, wherein the locking cap is configured to thread onto the drive shaft by actuation in a first direction to secure the blade module to the drive shaft, to thread off the drive shaft by actuation in a second direction opposite the first direction to allow removal of the blade module from the drive shaft, wherein the locking cap is self-locking to inhibit rotation of the locking cap in the second direction when the locking cap is not being actuated, and wherein the locking cap is unlocked by actuation in the second direction.

11. The garden tool of claim 7, wherein the locking cap is configured to rotate relative to the drive shaft by actuation in a first direction to secure the blade module to the drive shaft, to rotate relative to the drive shaft by actuation in a second direction opposite the first direction to allow removal of the blade module from the drive shaft, wherein the locking cap is self-locking to inhibit rotation of the locking cap in the second direction when the locking cap is not being actuated, and wherein the locking cap is unlocked by actuation in the second direction.

12. A self-locking cap for a garden tool, the self-locking cap comprising:

an actuator having a grip configured to provide actuating leverage;

a carrier;

a pawl pivotable with respect to the carrier between a locked pawl position and an unlocked pawl position; and a slider slideable relative to the carrier between a first slider position and a second slider position, wherein the slider is configured to move the pawl to the unlocked pawl position in the second slider position;

wherein the self-locking cap is configured to thread onto a drive shaft of the garden tool by actuation in a first direction and configured to thread off the drive shaft by actuation in a second direction opposite the first direction.

13. The self-locking cap of claim 12, wherein the slider includes a slider aperture, wherein the actuator includes a slide projection, and wherein the slide projection is receivable in the slider aperture.

14. The self-locking cap of claim 12, further comprising a first biasing member configured to bias the pawl towards the locked pawl position and a second biasing member configured to bias the slider towards the first slider position.

15. The self-locking cap of claim 12, wherein the slider is biased to the first slider position, wherein the actuator is rotatable about a rotation axis in a first direction and a second direction opposite the first direction, wherein actuation of the actuator in the first direction does not act against the bias of the slider, and wherein actuation of the actuator in the second direction acts against the bias of the slider to move the slider to the second slider position.

16. The self-locking cap of claim 12, wherein the actuator is rotatable about a rotation axis, and wherein in the locked pawl position the pawl extends radially further inwards towards the rotation axis than in the unlocked pawl position.

* * * * *